United States Patent

Suzuki et al.

[11] Patent Number: 5,316,214
[45] Date of Patent: May 31, 1994

[54] AIR CONDITIONER FOR RAILWAY VEHICLES

[75] Inventors: Takane Suzuki; Sakuo Sugawara, both of Kamakura; Nobuyoshi Hamazaki, Nagasaki; Ken-ichi Ito, Nagasaki; Koichiro Tsutsumi, Nagasaki; Osamu Sakai, Nagasaki, all of Japan

[73] Assignee: Mitsubishi Denki Kabushiki Kaisha, Tokyo, Japan

[21] Appl. No.: 856,953

[22] PCT Filed: Sep. 13, 1991

[86] PCT No.: PCT/JP91/01219

§ 371 Date: May 18, 1992

§ 102(e) Date: May 18, 1992

[87] PCT Pub. No.: WO92/05058

PCT Pub. Date: Apr. 2, 1992

[30] Foreign Application Priority Data

Sep. 18, 1990 [JP] Japan ................................ 2-248225
Sep. 18, 1990 [JP] Japan ................................ 2-248226
Sep. 18, 1990 [JP] Japan ................................ 2-248227

[51] Int. Cl.⁵ ............................................. G05D 23/00
[52] U.S. Cl. ................................ 236/78 B; 236/1 R; 236/91 C
[58] Field of Search ................ 236/1 R, 91 C, 78 B

[56] References Cited

U.S. PATENT DOCUMENTS

4,891,953 1/1990 Isono .................. 236/78 B
5,209,079 5/1993 Kajino ................ 236/91 C

FOREIGN PATENT DOCUMENTS

| 2-41037 | of 0000 | Japan . | |
| 0021911 | 2/1981 | Japan | 236/1 R |
| 56-21911 | 2/1981 | Japan . | |
| 0028941 | 2/1982 | Japan | 236/78 B |
| 57-144165 | 9/1982 | Japan . | |
| 58-136866 | 9/1983 | Japan . | |
| 60-174310 | 9/1985 | Japan . | |
| 0159043 | 7/1986 | Japan | 236/1 R |
| 61-44901 | 12/1986 | Japan . | |
| 0169952 | 7/1987 | Japan | 236/1 R |
| 63-131942 | 6/1988 | Japan . | |
| 63-207766 | 8/1988 | Japan . | |
| 2-7117 | 1/1990 | Japan . | |
| 2-219941 | 9/1990 | Japan . | |

Primary Examiner—William E. Wayner
Attorney, Agent, or Firm—Oblon, Spivak, McClelland, Maier & Neustadt

[57] ABSTRACT

An air conditioner for railway vehicles controlled in accordance with the air temperature in the car and data on at least one selected from the group consisting of underfoot temperature, radiant heat, air flow, humidity, outside air temperature, number of passengers and door opening operation. In this way, environment conditions which momentarily change are detected so as to prevent excessive cooling or heating in the car.

8 Claims, 57 Drawing Sheets

|  | | VERTICAL TEMPERATURE DIFFERENCE | | |
|---|---|---|---|---|
|  | | LARGE | MEDIUM | SMALL |
| QUANTITY OF RADIANT HEAT | SMALL | COLD | COLD | MEDIUM |
|  | MEDIUM | COLD | MEDIUM | HOT |
|  | LARGE | MEDIUM | HOT | HOT |

|  | VERTICAL TEMPERATURE DIFFERENCE | | |
|---|---|---|---|
|  | LARGE | MEDIUM | SMALL |
| VELOCITY OF AIR CURRENT — HIGH | COLD | COLD | MEDIUM |
| VELOCITY OF AIR CURRENT — MEDIUM | COLD | MEDIUM | HOT |
| VELOCITY OF AIR CURRENT — LOW | MEDIUM | HOT | HOT |

AIR CONDITIONER FOR RAILWAY VEHICLES

BACKGROUND OF THE INVENTION

1. Field of the Invention

The present invention relates to the control of an air conditioner for railway vehicles for maintaining an optimum temperature within the vehicles.

2. Description of the Related Art

Examples of air-cooling railway vehicles using conventional air conditioners will be explained with reference to FIG. 64 schematically showing a train car, the circuit diagrams in FIGS. 65 and 67, the flowcharts of the controlling operation in FIGS. 66 and 68, and FIGS. 69 to 71 schematically showing the concepts of the controlling operation.

FIG. 64 is a schematic view of the structure of a train car equipped with a conventional air conditioner and the flow of data therewithin. This is similar to the structure of a train car equipped with an air conditioner and the flow of data therewithin described in Japanese Utility Model Laid-Open No. Hei 2-41037. In FIG. 64, the reference numeral 1 denotes a train car, 2 an air conditioner mounted on the upper part of the train car 1, 3 a heating/cooling power controller for controlling the heating/cooling power by varying the power of a compressor provided in the air conditioner 2, 4 an air conditioner control unit having a means for determining the heating/cooling power, 5 a control switch portion by which a train operator selects the heating or cooling operation, ON or OFF and sets the target temperature in the car, 6 a temperature detector which is composed of a thermistor or the like so as to detect the temperature of the air returned from the car, 7 a heated/cooled air supply opening and 8 a suction opening for sucking the air from the car.

FIG. 65 is a circuit diagram of the air conditioner 4. The air conditioner 4 is composed of an input circuit 41, a CPU 42, a memory 43 and an output circuit 44. An output from the control switch portion 5 in the train operator's compartment and an output from the temperature detector 6 are input to the input circuit 41. The heating/cooling power controller 3 controls the power of the compressor in accordance with the output of the output circuit 44. The CPU 42 calculates the optimum heating/cooling power, and the result of the calculation is supplied to the output circuit 44.

The operation of the air conditioner 4 will now be explained with reference to FIG. 66. A conventional air cooling device of this type controls the air temperature so as to be the target temperature or in the vicinity thereof while calculating the optimum cooling power from the difference between the temperature of the air to be controlled and the target temperature. This control method is generally called proportional control.

The proportional control method will be explained in the following with reference to the flowchart in FIG. 66. At step F1, the air conditioner 4 of the train is first turned ON by a train operator, and the target temperature T0 is set at step F2. At step F3, a preset time for measuring the temperature is allowed to pass, and the air temperature Tn in the car is detected at step F4. The temperature difference dT between the target temperature T0 and the air temperature Ta in the car is obtained at step F5. At step F6, the optimum cooling power is newly calculated from the temperature difference dT, in accordance with the cooling power chart shown in FIG. 69. When the optimum cooling power is obtained in this way, the cooling power for the current cooling operation is changed at step F7, and the cooling operation is continued at the newly changed cooling power at step F8.

In such proportional control, however, since the cooling operation is conducted at the cooling power determined by the temperature difference between the temperature of the air to be controlled and the target temperature, it is difficult to reach the target temperature depending upon the condition of the load, as shown in FIG. 70 which shows the concept of the controlling operation. For example, even if the cooling power is reduced, the air temperature in the car is sometimes lowered to a temperature lower than the target temperature after the time t1.

To solve this problem, PID control is disclosed in Japanese Utility Model Laid-Open No. Hei 2-41037. In PID control, not only is the temperature difference between the temperature of the air to be controlled and the target temperature detected, but also the precedent temperature difference is stored, and the optimum cooling power is calculated from the detected temperature difference and the precedent temperature difference. Therefore, the air temperature in the car does not remain at a different temperature from the target temperature for a long time but is easily controlled to be the target temperature. However, the air temperature in the car is susceptible to a change in the load such as the outside air temperature and the number of passengers, and it is difficult to follow the change in the load which occurs in a short time such as the increase in the amount of ventilating air due to the opening and closing of the doors and the passengers getting on and off. In addition, PID control is disadvantageous in that the calculation is complicated and in that a large memory capacity is required.

In the control method shown by the circuit diagram in FIG. 67 and the flowchart shown in FIG. 68, a fuzzy theory is applied to the control of the air conditioner so as to enable simple control and the attainment of the target temperature. The electric circuit shown in FIG. 67 has a region 431 of the memory 43 for storing a previously measured temperature difference dT.

This control method will be explained with reference to the flowchart in FIG. 68. The air conditioner of the train is first turned on by a train operator or the like at step F11, and the target temperature is set at step F12. At step F13, a preset time for measuring the temperature is allowed to pass, and the air temperature in the car is detected at step F14. The temperature difference dT between the target temperature and the air temperature in the car is obtained at step F15. At step F16, judgement is made as to whether or not the current measurement is a first measurement. If this is a first measurement, this temperature difference is stored in the memory 43 as a precedent temperature difference dTs. On the other hand, if this is a second or later measurement, the variance St of temperature difference with time, which is the difference between the precedent temperature difference dTs and the current temperature difference dT, is obtained at step F17. It is possible to determine whether the temperature in the car is stable or has changed in a short time from the variance of temperature difference with time. At step F18, the optimum cooling power is calculated by applying the fuzzy theory. FIG. 71 shows the image of the fuzzy rule. As shown in FIG. 71, the optimum cooling power for making the temperature in the car equal to the target temperature is inferred from the temperature difference dT between the air temperature in the car and the target temperature, and the variance St of temperature difference with time. For example, if the temperature in the car is lower than both the target temperature and the previously measured temperature, it is judged that the air-cooling is excessive, and the cooling power is reduced. On the other hand, if the temperature in the car is higher than both the target temperature and the previously measured temperature, it is judged that the air-cooling is insufficient, and the cooling power is increased. If there is no temperature difference between the air temperature in the car and the target temperature and there is no difference in the current temperature change and the precedent temperature change, it is judged that the air temperature in the car is being maintained in a good state and the cooling power is maintained as it is. When a correction value for the cooling power is obtained in this way, the cooling power for the current cooling operation is corrected by the correction value at step F18, and the cooling operation is continued at the newly changed cooling power at step F20. The temperature difference dT between the target temperature and the air temperature in the car is stored in the memory 43 as a precedent temperature difference dTs, and there is then a pause until the next temperature detection takes place.

Since the cooling operation is conducted while determining the correction value in accordance with the temperature in the car and the temperature change in this way, the temperature in the car is never maintained at a different temperature from the target temperature for very long and it is possible to follow well the change in the load. In addition, since the amount of data stored in the memory 43 need only be a precedent temperature difference, it is possible to control the cooling power relatively simply.

As explained in the related art, in a conventional air conditioner, the heating/cooling operation is conducted while changing the heating/cooling power to the optimum value using the correction value inferred from the temperature difference between the temperature in the car and the target temperature and the variance of temperature difference with time in accordance with the fuzzy rule so that the temperature in the car is constantly comfortable for the passengers. One of the important factors to be taken into consideration in determining the heating/cooling power is the load of the heating/cooling system. The load of the heating/cooling system thermally influences the space being heated or cooled. It is, for example, the outside air temperature which influences the air temperature in the car due to ventilation or by heat transferred from the wall, and passengers who evolve heat in the car. In the case of railway vehicles which run a long distance, the outside air temperature changes momentarily. In the case of subways, the platforms of some stations are air-conditioned, and the outside air temperature is different when traveling through tunnels than while stopping at stations. Since the railway vehicles have a number of large windows, the influence of solar radiation through the windows is large in all vehicles except subway trains, and its influence changes greatly according to the direction of travel and when vehicles run through tunnels. In addition, a great many passengers get off and on every time a train reaches a station, and sometimes, a car is heavily crowded in a certain section while there are few passengers in other next sections.

Since the heat evolved by the passengers greatly influences the heating/cooling operation, if the number of passengers is rapidly reduced, the temperature in the car is lowered, while if the number of passengers is rapidly increased, the temperature in the car is raised, Simultaneously with passengers getting off and on, a large amount of air ventilates, and the air temperature in the car changes due to the influence of the outside air temperature. It can be said that a typical characteristic of the air-conditioning in railway vehicles is that the load constantly changes in this way. When the load is large, even if the temperature change and the difference between the temperature difference and the precedent temperature difference are the same as in the case of a small load, it cannot be said that the temperature in the car will be changed in the same way by the same correction value for the cooling power. The outside air temperature will be cited as an example of the load of the cooling system. When the outside temperature is high, since a large amount of heat transfers to the inside of the car through the wall and hot air enters the inside of the car due to drafts or by ventilation, the temperature in the car is difficult to lower by increasing the cooling power in the same way as in the case of a lower outside air temperature and, if the cooling power is reduced, the temperature in the car rises in a short time. On the other hand, if the outside air temperature is low, even with a little increase in the cooling power, the temperature in the car is easily lowered and, even if the cooling power is reduced, the temperature in the car is not raised so much. The same may be said of the amount of radiant heat by solar radiation or the like and the number of passengers. In this way, the state of the ambient load exerts great influence on the operation of the air conditioner. In such cases, it is impossible to calculate the correction value with due consideration of the load by a conventional calculation method. As a result, it is impossible to follow the change in the load and the temperature in the car disadvantageously becomes too low or too high.

In the above-described control methods, control is carried out on the assumption that the temperature in the car is kept constant. The human thermesthesia, however, is not determined merely by the air temperature but it is determined by the amount of heat produced within the human body and the amount of heat dissipated to the outside of the human body. If the amount of dissipated heat is large, a human being feels cold, while if it is small, he feels hot. The amount of dissipated heat is determined by temperature, radiation, air flow, humidity, etc. For example, if the outside air temperature is high, the amount of heat dissipated to the outside of the human body is reduced, and the human being feels hot, while if the outside air temperature is low, the amount of heat dissipated to the outside of the human body is increased, and the human being feels cold. As to radiation, if there is warm heat radiation, the amount of heat dissipated to the outside of the human body is reduced, while if there is cold heat radiation, the amount of heat dissipated to the outside of the human body is increased. As to air flow, if a large amount of wind blows against the human body, the heat on the surface of the human body is lost and the amount of heat dissipated to the outside of the human body is increased, while if the amount of wind is small, the amount of dissipated heat is reduced. In dissipating heat, a human being dissipates water out of the human body. If the balance between the amount of heat produced in the human body and the amount of dissipated heat is lost, the human being perspires in order to dissipate more heat. When the perspiration is evaporated, the heat on the surface of the human body is lost, thereby increasing the amount of dissipated heat and controlling the body temperature. However, if the ambient humidity is high, perspiration is unlikely to evaporate, and the amount of heat dissipated from the human body is reduced, so that the human being feels hot. In this way, temperature, radiation, air flow, humidity, etc. play an important role in the human thermesthesia. In heating or cooling a certain space, the temperature difference between the upper portion and the lower portion must be particularly take into consideration. The human thermesthesia is said to be determined by the temperature at his feet. Even if the temperature at the upper half of the body is high, if the temperature at his feet is low, the human being feels cold. On the other hand, even if the temperature at the upper half of the body is comparatively low, if the temperature at his feet is high, the human being feels warm. In heating or cooling a car, since the doors are opened when the train reaches a station and a large amount of ventilating air flows, the temperature in the car is unlikely to become stable. When a great number of passengers are in the car as in a commuter train, the air is unlikely to flow vertically in the car. For these reasons, a temperature difference is apt to arise between the upper portion and the lower portion. It is therefore important to heat or cool the car in due consideration of the temperature difference between the upper portion and the lower portion of the car.

In conventional control methods, however, the heating/cooling operation is carried out so that the temperature in the car is kept constant, so that the human thermesthesia changes with a change in the radiation, air flow or the temperature change between the upper portion and the lower portion of the car. The passengers therefore feel unfavorably hot or cold in spite of the target temperature.

SUMMARY OF THE INVENTION

Accordingly, it is an object of the present invention to solve the above-described problems in the related art and to provide an air conditioner for railway vehicles which is capable of controlling the temperature in the car in accordance with information on the outside air temperature, the number of passengers, opening or closing of the doors, radiation, air flow, humidity and temperature difference between the upper portion and the lower portion of the car so as to constantly provide a comfortable environment for the passengers and prevent an excessive heating/cooling operation so as to reduce the energy consumption.

To achieve this end, in a first aspect of the present invention, there is provided an air conditioner for railway vehicles comprising:

(a) a warm/cool air current generator for generating a warm air current in the heating operation and a cool air current in the cooling operation;

(b) a car temperature detector provided in the vicinity of the ceiling of the car so as to detect the air temperature in the car;

(c) an underfoot temperature detector provided in the vicinity of the floor of the car so as to detect the air temperature in the vicinity of the passengers' feet;

(d) a target temperature correcting means for inferring the thermesthesia of the passengers on the basis of the output of the car temperature detector and the output of the underfoot temperature detector and correcting the target temperature in accordance with the result of the inference;

(e) an optimum heating/cooling power calculator for calculating the optimum heating/cooling power on the basis of the temperature difference between the corrected target temperature and the air temperature in the car; and (f) a heating/cooling power controller for controlling the warm/cool air current generator in accordance with the output of the optimum heating/cooling power calculator;

wherein the target temperature correcting means infers the thermesthesia of the passengers such as "hot" and "cold" on the basis of the temperature difference between the upper portion and the lower portion of the car obtained from the output of the car temperature detector and the output of the underfoot temperature detector, and corrects the target temperature in accordance with the result of the level of thermesthesia so that the target temperature is lowered when the result of the inference is "the passengers feel hot" while the target temperature is raised when the result of the inference is "the passengers feel cold".

In a second aspect of the present invention, there is provided an air conditioner for railway vehicles comprising: the above-described elements (a) to (f); and a radiant heat quantity detector provided at an appropriate location in the car so as to detect the quantity of radiant heat;

wherein the target temperature correcting means infers the thermesthesia of the passengers such as "hot" and "cold" from the temperature difference between the upper portion and the lower portion of the car obtained from the output of the car temperature detector and the output of the underfoot temperature detector and on the basis of the output of the radiant heat quantity detector, and corrects the target temperature in accordance with the result of the level of the thermesthesia so that the target temperature is lowered when the result of the inference is "the passengers feel hot" while the target temperature is raised when the result of the inference is "the passengers feel cold".

In a third aspect of the present invention, there is provided an air conditioner for railway vehicles comprising: the above-described elements (a) to (f); and an anemometer provided at an appropriate location in the car so as to detect the velocity of the air current in the car;

wherein the target temperature correcting means infers the thermesthesia of the passengers such as "hot" and "cold" from the temperature difference between the upper portion and the lower portion of the car obtained from the output of the car temperature detector and the output of the underfoot temperature detector and on the basis of the output of the anemometer, and corrects the target temperature in accordance with the result of the level of the thermesthesia so that the target temperature is lowered when the result of the inference is "the passengers feel hot" while the target temperature is raised when the result of the inference is "the passengers feel cold".

In a fourth aspect of the present invention, there is provided an air conditioner for railway vehicles comprising: the above-described elements (a) to (f);

a radiant heat quantity detector provided at an appropriate location in the car so as to detect the quantity of radiant heat; and a hygrometer provided at an appropriate location in the car so as to detect the reltaive humidity in the car;

wherein the target temperature correcting means infers the thermesthesia of the passengers such as "hot" and "cold" from the temperature difference between the upper portion and the lower portion of the car obtained from the output of the car temperature detector and the output of the underfoot temperature detector and on the basis of the output of the radiant heat quantity detector, and corrects the target temperature in accordance with the result of the level of the thermesthesia so that the target temperature is lowered then the result of the inference is "the passengers feel hot" while the target temperature is raised when the result of the inference is "the passengers feel cold", and further corrects the target temperature in accordance with the output of the hygrometer so that the target temperature is lowered when the humidity is high while the target temperature is raised when the humidity is low.

In a fifth aspect of the present invention, there is provided an air conditioner for railway vehicles comprising: the above-described elements (a) to (f);

an anemometer provided at an appropriate location in the car so as to detect the velocity of the air current in the car; and a hygrometer provided at an appropriate location in the car so as to detect the reltaive humidity in the car;

wherein the target temperature correcting means infers the thermesthesia of the passengers such as "hot" and "cold" from the temperature difference between the upper portion and the lower portion of the car obtained from the output of the car temperature detector and the output of the underfoot temperature detector and on the basis of the output of the anemometer, and corrects the target temperature in accordance with the result of the level of the thermesthesia so that the target temperature is lowered when the result of the inference is "the passengers feel hot" while the target temperature is raised when the result of the inference is "the passengers feel cold", and further corrects the target temperature in accordance with the output of the hygrometer so that the target temperature is lowered when the humidity is high while the target temperature is raised when the humidity is low.

In a sixth aspect of the present invention, there is provided an air conditioner for railway vehicles comprising:

(a) a warm/cool air current generator for generating a warm air current in the heating operation and a cool air current in the cooling operation;

(b) a car temperature detector provided in the vicinity of the ceiling of the car so as to detect the air temperature in the car;

(c) a heating/cooling power correction value data detector provided at a predetermined location in the car;

(d) a target temperature correcting means for inferring the thermesthesia of the passengers on the basis of the output of the car temperature detector and the output of an underfoot temperature detector and correcting the target temperature in accordance with the result of the inference;

(e) an optimum heating/cooling power calculator for calculating the optimum heating/cooling power on the basis of the temperature difference between the corrected target temperature and the air temperature in the car; and (f) a heating/cooling power controller for controlling the warm/cool air current generator in accordance with the output of the optimum heating/cooling power calculator.

In a seventh aspect of the present invention, there is provided an air conditioner for railway vehicles comprising the above-described elements (a) to (f) of the air conditioner provided in the sixth aspect of the present invention;

and a heating/cooling power correcting means;

wherein the heating/cooling power correction value data detector (c) is a radiant heat detector for detecting radiant heat and, on the basis of the output of the radiant heat detector, the heating/cooling correcting means corrects the output of the optimum heating/cooling power calculator (e) in the cooling operation so that when the output of the optimum heating/cooling power calculator (e) indicates that the cooling power is increased, the cooling power is slightly increased to a slightly larger value than the calculated value if the quantity of radiant heat is large, while the cooling power is increased to a smaller value than the calculated value if the quantity of radiant heat is small, and on the other hand, when the output of the optimum heating/cooling power calculator (e) indicates that the cooling power is reduced, the cooling power is reduced to a slightly smaller value than the calculated value if the quantity of radiant heat is large, while the cooling power is reduced to a slightly larger value than the calculated value if the quantity of radiant heat is small, and corrects the output of the optimum heating/cooling power calculator (e) in the heating operation so that when the output of the optimum heating/cooling power calculator (e) indicates that the heating power is increased, the heating power is increased to a slightly smaller value if the quantity of radiant heat is large, while the heating power is increased to a slightly larger value than the calculated value if the radiant heat is low, and on the other hand, when the output of the optimum heating/cooling power calculator (e) indicates that the heating power is reduced, the heating power is reduced to a slightly larger value than the calculated value if the quantity of radiant heat is large, while the heating power is reduced to a slightly smaller value than the calculated value if the quantity of radiant heat is small.

In an eighth aspect of the present invention, there is provided an air conditioner for railway vehicles comprising the above-described elements (a) to (f) of the air conditioner provided in the sixth aspect of the present invention, and a heating/cooling power correcting means, wherein the heating/cooling power correction value data detector (c) is an outside air temperature detector for detecting the temperature of the outside air and, on the basis of the output of the outside air temperature detector, the heating/cooling correcting means corrects the output of the optimum heating/cooling power calculator (e) in the cooling operation so that when the output of the optimum heating/cooling power calculator (e) indicates that the cooling power is increased, the cooling power is increased to a slightly larger value than the calculated value if the outside air temperature is high, while the cooling power is increased to a slightly smaller value if the outside air temperature is low, and on the other hand, when the output of the optimum heating/cooling power calculator (e) indicates that the cooling power is reduced, the cooling power is reduced to a slightly smaller value than the calculated value if the temperature of the outside air is high, while the cooling power is reduced to a slightly larger value than the calculated value if the temperature of the outside is low, and corrects the output of the optimum heating/cooling power calculator (e) in the heating operation so that when the output of the optimum heating/cooling power calculator (e) indicates that the heating power is increased, the heating power is increased to a slightly smaller value than the calculated value if the temperature of the outside air is high, while the heating power is increased to a slightly larger value than the calculated value if the temperature of the outside air is low, and on the other hand, when the output of the optimum heating/cooling power calculator (e) indicates that the heating power is reduced, the heating power is reduced to a slightly larger value than the calculated value if the temperature of the outside air is high, while the heating power is reduced to a slightly smaller value than the calculated value if the temperature of the outside air is low.

In a ninth aspect of the present invention, there is provided an air conditioner for railway vehicles comprising the above-described elements (a) to (f) of the air conditioner provided in the sixth aspect of the present invention;

and a heating/cooling power correcting means; wherein the heating/cooling power correction value data detector (c) is a passenger number detector for detecting the number of passengers in the car and, on the basis of the output of the passenger number detector, the heating/cooling correcting means corrects the output of the optimum heating/cooling power calculator (e) in the cooling operation so that when the output of the optimum heating/cooling power calculator (e) indicates that the cooling power is increased, the cooling power is increased to a slightly larger value than the calculated value if the number of passengers is large, while the cooling power is increased to a slightly smaller value than the calculated value if the number of passengers is small, and on the other hand, when the output of the optimum heating/cooling power calculator (e) indicates that the cooling power is reduced, the cooling power is reduced to a slightly smaller value than the calculated value if the number of passengers is large, while the cooling power is reduced to a slightly larger value than the calculated value if the number of passengers is small, and corrects the output of the optimum heating/cooling power calculator (e) in the heating operation so that when the output of the optimum heating/cooling power calculator (e) indicates that the heating power is increased, the heating power is increased to a slightly smaller value than the calculated value if the number of passengers is large, while the heating power is increased to a slightly larger value than the calculated value if the number of passengers is low, and on the other hand, when the output of the optimum heating/cooling power calculator (e) indicates that the heating power is reduced, the heating power is reduced to a slightly larger value than the calculated value if the number of passengers is large, while the heating power is reduced to a slightly smaller value than the calculated value if the number of passengers is low.

In a tenth aspect of the present invention, there is provided an air conditioner for railway vehicles comprising the above-described elements (a) to (f) of the air conditioner provided in the sixth aspect of the present invention;

and a heating/cooling power correcting means; wherein the heating/cooling power correction value data detector (c) includes an outside air temperature detector attached to the outside of the car so as to detect the temperature of the outside air and a passenger number detector for detecting the number of passengers in the car, and the heating/cooling correcting means infers the degree of the load of the air-conditioning system from the output of the outside air temperature detector and the output of the passenger number detector and corrects the output of the optimum heating/cooling power calculator (e) so that when the output of the optimum heating/cooling power calculator (e) indicates that the heating/cooling power is increased, the heating/cooling power is increased to a slightly larger value than the calculated value if the load of the air-conditioning system is large, while the heating/cooling power is increased to a slightly smaller value than the calculated value if the load of the air-conditioning system is small, and on the other hand, when the output of the optimum heating/cooling power calculator (e) indicates that the heating/cooling power is reduced, the heating/cooling power is reduced to a slightly smaller value than the calculated value if the load is large, while the heating/cooling power is reduced to a slightly larger value than the calculated value if the load is small.

In an eleventh aspect of the present invention, there is provided an air conditioner for railway vehicles comprising the above-described elements (a) to (f) of the air conditioner provided in the sixth aspect of the present invention, wherein the heating/cooling power correction value data detector (c) is a door opening information detector for transmitting a signal indicating that the doors are open to a control unit of the air conditioner through a control switch, and the optimum heating/cooling power output from the optimum heating/cooling power calculator (e) is increased.

In a twelfth aspect of the present invention, there is provided an air conditioner for railway vehicles comprising the above-described elements the air conditioner provided in any of the first to fifth aspects of the present invention; and a memory for storing the temperature difference between the temperature of the air in the car and the corrected target temperature;

wherein the temperature difference between the temperature of the air in the car and the corrected target temperature is calculated at predetermined time intervals, the heating/cooling power is calculated from the temperature difference between the calculated temperature difference and the precedent temperature difference stored in the memory, and the precedent temperature difference stored in the memory is replaced by the newly calculated temperature difference.

In a thirtieth aspect of the present invention, there is provided an air conditioner for railway vehicles comprising the above-described elements the air conditioner provided in any of the sixth to eleventh aspects of the present invention; and a memory for storing the temperature difference between the air temperature in the car and the corrected target temperature;

wherein the temperature difference between the air temperature in the car and the corrected target temperature is calculated at predetermined time intervals, the heating/cooling power is calculated from the temperature difference between the calculated temperature difference and the precedent temperature difference stored in the memory, and the precedent temperature difference stored in the memory is replaced by the newly calculated temperature difference.

The above and other objects, features and advantages of the present invention will become clear from the following description of the preferred embodiments thereof, taken in conjunction with the accompanying drawings.

BRIEF DESCRIPTION OF THE DRAWINGS

FIGS. 70(A) and 70 (B) show the concept of a conventional controlling operation;

DESCRIPTION OF THE PREFERRED EMBODIMENTS

First Embodiment

Figure 1:
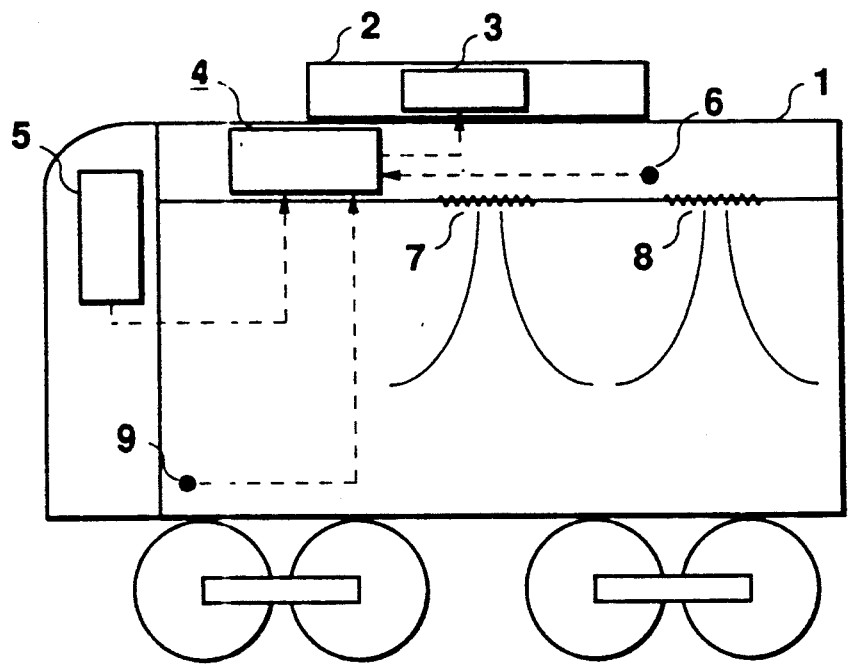
FIG. 1 schematically shows an embodiment of an air conditioner for railway vehicles according to the present invention.

A first embodiment of the present invention will be explained with reference to FIG. 1 schematically showing a train car, a circuit diagram in FIG. 2 and a flowchart in FIG. 3. FIG. 1 schematically shows the structure of a train car and the flow of data. In FIG. 1, the reference numeral 5 represents a control switch portion by which a train operator turns ON/OFF the air conditioner and sets the target temperature in the car, 4 a control unit for controlling the air conditioner including a heating/cooling power correcting means, 6 a temperature detector for detecting the air temperature in the car, and 9 an underfoot temperature detector provided in the vicinity of the floor of the car so as to detect the temperature in the vicinity of the feet of the passengers there. The data on ON/OFF of the air conditioner and the target temperature which has been set by the control switch portion 5, the output of the temperature detector 6, the output of the underfoot temperature detector 9, etc. are supplied to the control unit 4.

Figure 2:
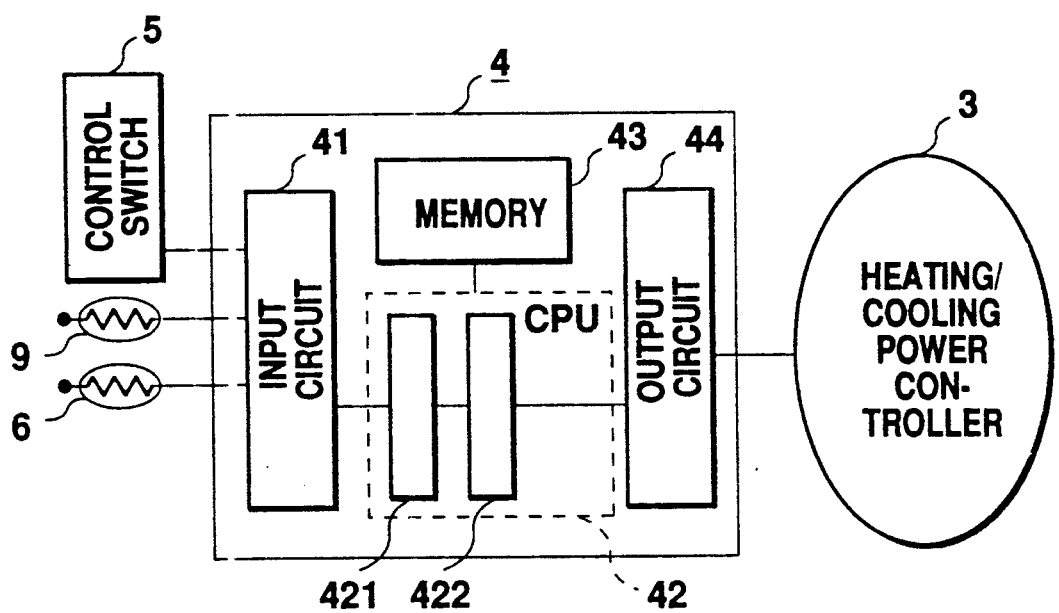
FIG. 2 is a block diagram of an example of control unit of an air conditioner for railway vehicles according to the present invention.
Figure 3:
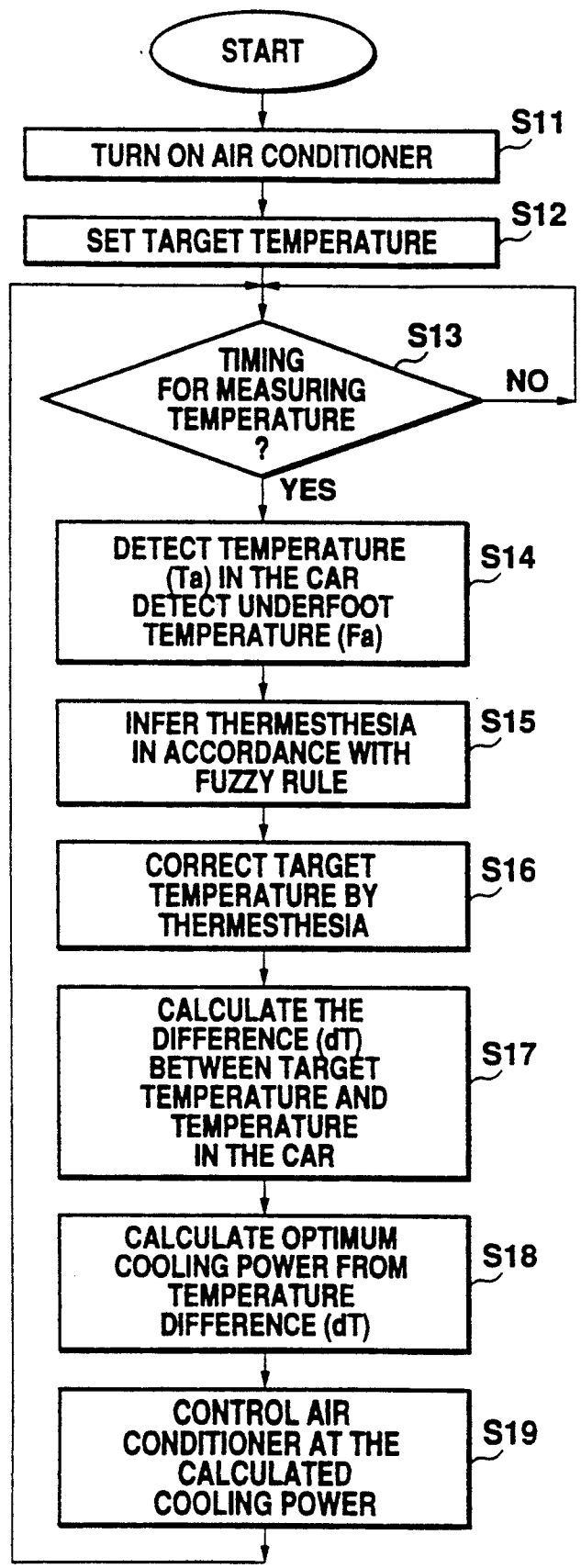
FIG. 3 is a flowchart of an example of the controlling operation of an air conditioner for railway vehicles according to the present invention.

FIG. 2 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The operation program of the heating/cooling power correcting means is stored in the memory 43 and calculated by the CPU 42. The output of the control switch portion 5 provided in a train operator's compartment, the output of the temperature detector 6 and the output of the underfoot temperature detector 9 are input to the input circuit 41. A heating/cooling power controller 3 controls the power of the compressor in accordance with the output of the output circuit 44.

The operation of the air conditioner will be explained with reference to the flowchart in FIG. 3. At step S11, the air conditioner of the train is first turned ON by a train operator or the like, and the target temperature is set at step S12. At step S13, a preset time for measuring the temperature is allowed pass, and the temperature Ta of the air in the car and the underfoot temperature Fa are detected at step S14. At step S15, the thermesthesia of the passengers is inferred from the vertical temperature difference fdT between the air temperature Ta in the car and the underfoot temperature Fa. For example, when the vertical temperature difference is large, it is inferred that the passengers feel cold, while when the vertical temperature difference is small, it is inferred that the passengers feel hot. The target temperature is corrected from the result of the inference of the thermesthesia at step S16. The correction value for the target temperature is calculated so that the target temperature is lowered when the result of the inference of the thermesthesia is "hot", while the target temperature is raised when the result is "cold", and the target temperature is not changed when the result is "medium". At step S17, the temperature difference dT between the air temperature in the car and the newly calculated target temperature, and at step S18, the optimum cooling power is calculated from the temperature difference dT. At step S19, the cooling operation is continued at the newly calculated cooling power.

In this way, the thermesthesia of the passengers is inferred from the temperature difference between in the upper portion and the lower portion of the car, and the correction value for the target temperature is calculated so that the target temperature is lowered when the result of the inference shows that the passenger feel hot while the target temperature is raised when the result of the inference shows that the passenger feel cold. Since the cooling operation is carried out while correcting the target temperature, it is possible to constantly provide a comfortable environment for the passengers.

Second Embodiment

Figure 4:
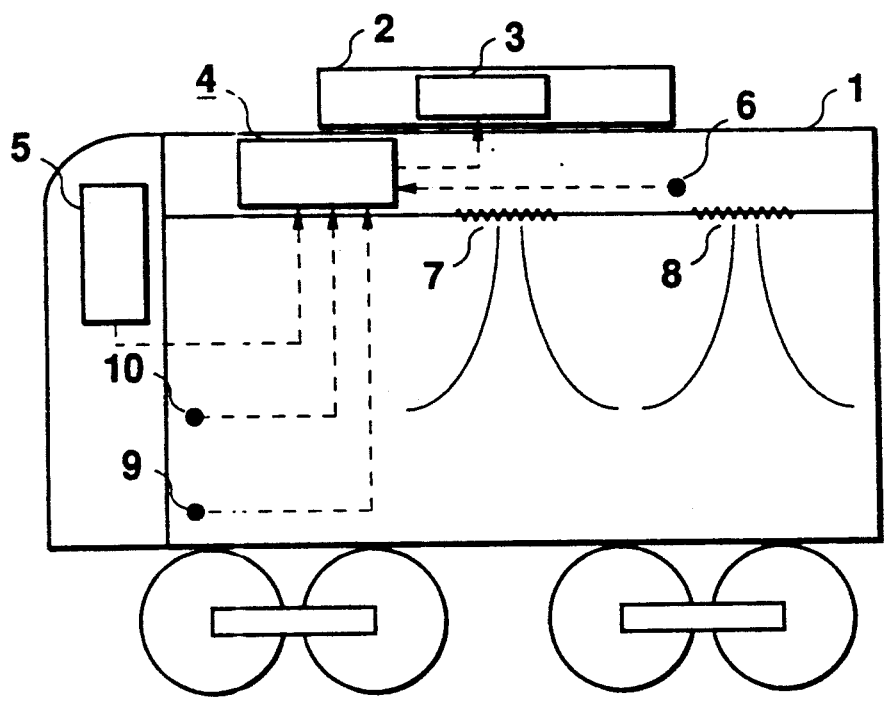
FIG. 4 schematically shows another embodiment of an air conditioner for railway vehicles according to the present invention.
Figure 5:
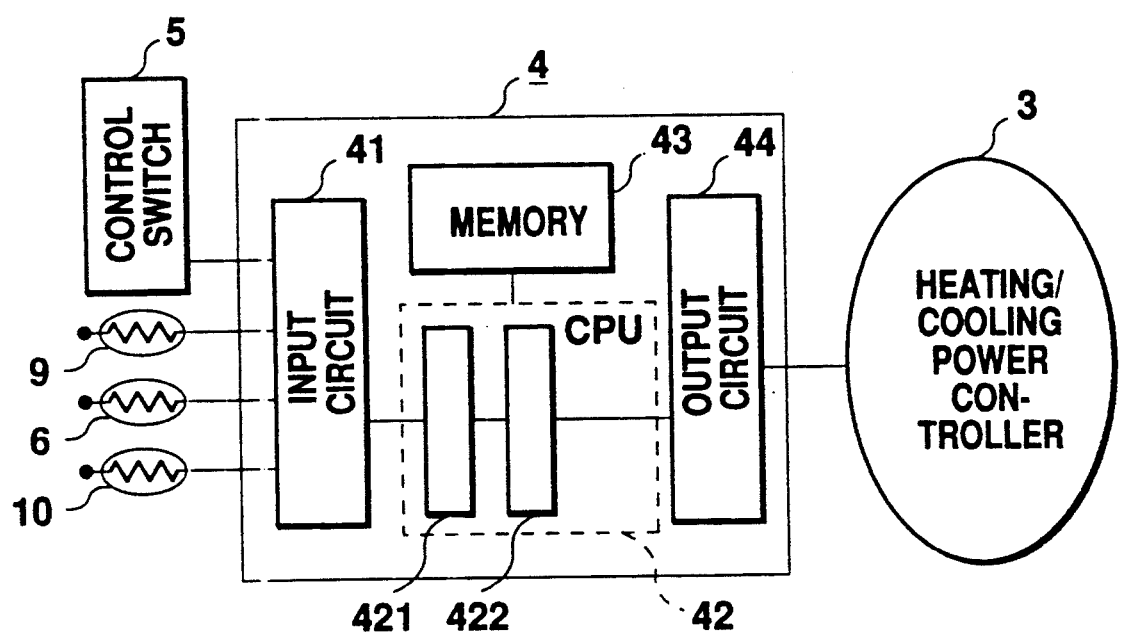
FIG. 5 is a block diagram of another example of control unit of an air conditioner for railway vehicles according to the present invention.
Figure 6:
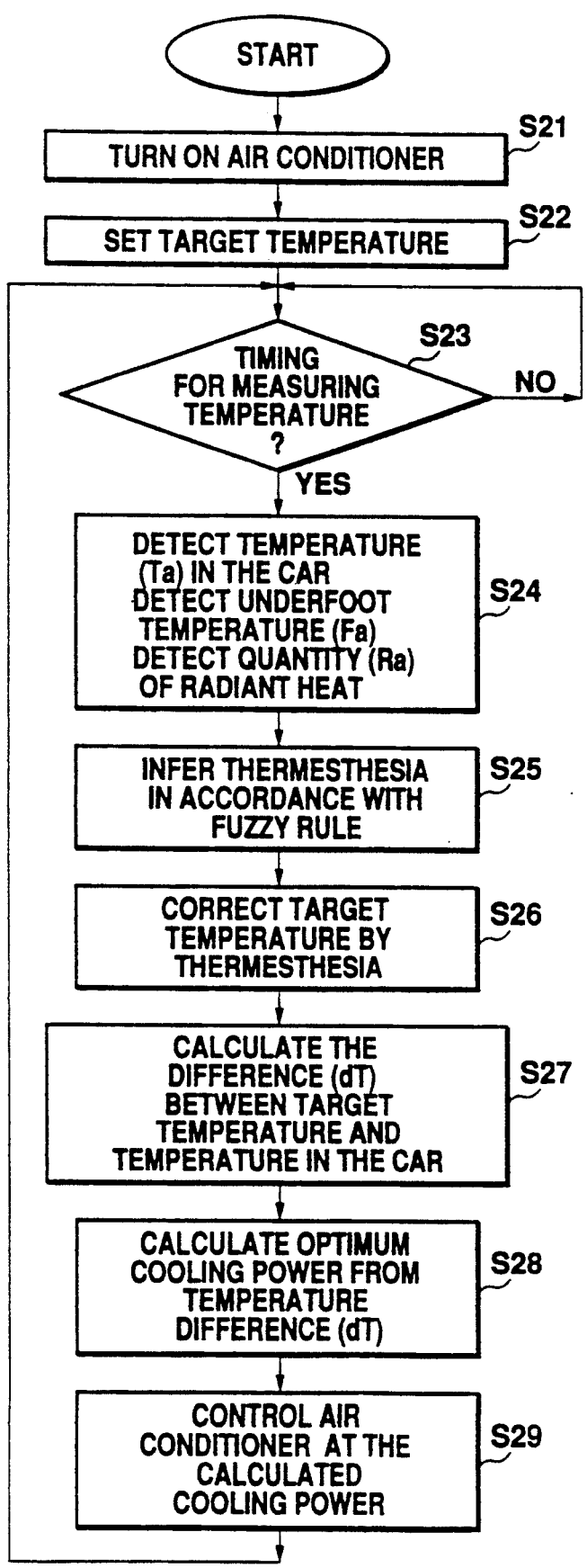
FIG. 6 is a flowchart of another example of the controlling operation of an air conditioner for railway vehicles according to the present invention.
Figures 7, 8:
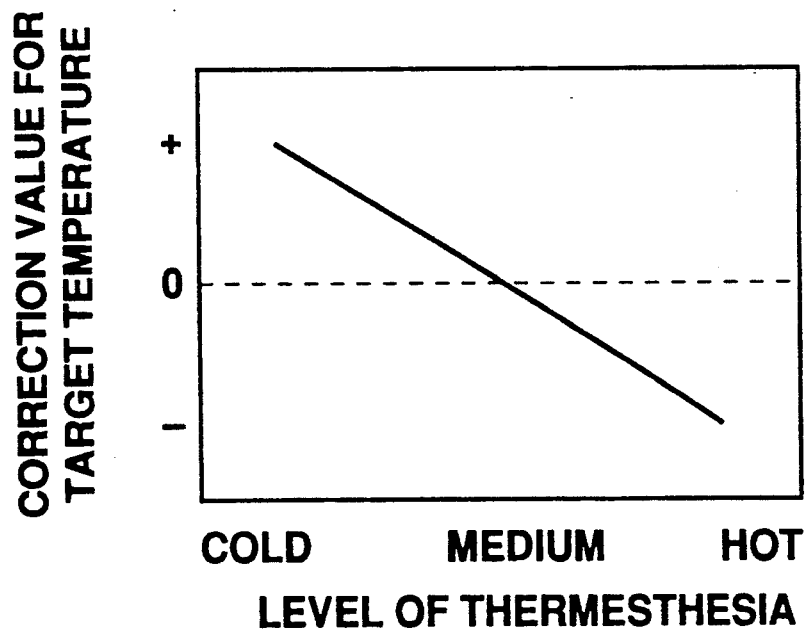
FIG. 7 shows the concept of an example of fuzzy rule for inferring thermesthesia.
FIG. 8 shows the concept of an example of the correction value for the target temperature determined by thermesthesia.

A second embodiment of the present invention will be explained with reference to FIG. 4 schematically showing a train car, a circuit diagram in FIG. 5, a flowchart in FIG. 6, FIG. 7 showing the concept of a fuzzy rule for inferring the thermesthesia of the passengers, and FIG. 8 showing the concept of the range of correction value.

FIG. 4 schematically shows the structure of a train car and the flow of data. In FIG. 4, the reference numeral 5 represents a control switch portion by which a train operator turns ON/OFF the air conditioner and sets the target temperature in the car, 4 a control unit for controlling the air conditioner including a heating-/cooling power correcting means, 6 a temperature detector for detecting the temperature of the air in the car, 9 an underfoot temperature detector provided in the vicinity of the floor of the car so as to detect the temperature in the vicinity of the feet of the passengers there and 10 a radiant heat quantity detector for detecting the quantity of radiant heat generated by solar radiation or the like. The data on ON/OFF of the air conditioner and the target temperature which has been set by the control switch portion 5, the output of the temperature detector 6, the output of the underfoot temperature detector 9, the output of the radiant heat quantity detector 10, etc. are supplied to the control unit 4.

FIG. 5 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The operation program of the heating/cooling power correcting means is stored in the memory 43 and calculated by the CPU 42. The output of the control switch portion 5 provided in a train operator's compartment, the output of the temperature detector 6, the output of the underfoot temperature detector 9 and the output of the radiant heat quantity detector 10 are input to the input circuit 41. A heating/cooling power controller 3 controls the power of the compressor in accordance with the output of the output circuit 44.

The operation of the air conditioner will be explained with reference to the flowchart in FIG. 6. At step S21, the air conditioner of the train is first turned ON by a train operator or the like, and the target temperature is set at step S22. At step S23, a preset time for measuring the temperature is allowed to pass, and the air temperature Ta in the car, the underfoot temperature Fa and the quantity Ra of radiant heat are detected at step S24. At step S25, the thermesthesia of the passengers is inferred from the vertical temperature difference fdT between the air temperature Ta in the car and the underfoot temperature Fa and the quantity Ra of radiant heat in accordance with a fuzzy rule such as that shown in FIG. 7. According to the fuzzy rule shown in FIG. 7, for example, when the vertical temperature difference is large and the quantity of radiant heat is small, it is inferred that the passengers feel cold, while when the vertical temperature difference is small and the quantity of radiant heat is large, it is inferred that the passengers feel hot. If the vertical temperature difference is intermediate between "large" and "medium" or "medium" and "small" or the quantity of radiant heat is intermediate between "small" and "medium" or "medium" and "large", the thermesthesia of the passengers is inferred to be "slightly hot" or "slightly cold". The target temperature is corrected from the result of the inference of the thermesthesia at step S26. The correction value for the target temperature is calculated so that the target temperature is lowered when the result of the inference of the thermesthesia is "hot", while the target temperature is raised when the result is "cold", and the target temperature is not changed when the result is "medium", as shown in FIG. 8. At step S27, the temperature difference dT between the temperature of the air in the car and the newly calculated target temperature, and at step S28, the optimum cooling power is calculated from the temperature difference dT. At step S29, the cooling operation is continued at the newly calculated cooling power.

In this way, the thermesthesia of the passengers is inferred from the temperature difference between in the upper portion and the lower portion of the car and the quantity of radiant heat, and the correction value for the target temperature is calculated so that the target temperature is lowered when the result of the inference shows that the passenger feel hot while the target temperature is raised when the result of the inference shows that the passenger feel cold. Since the cooling operation is carried out while correcting the target temperature, it is possible to constantly provide a comfortable environment for the passengers.

Third Embodiment

Figure 9:
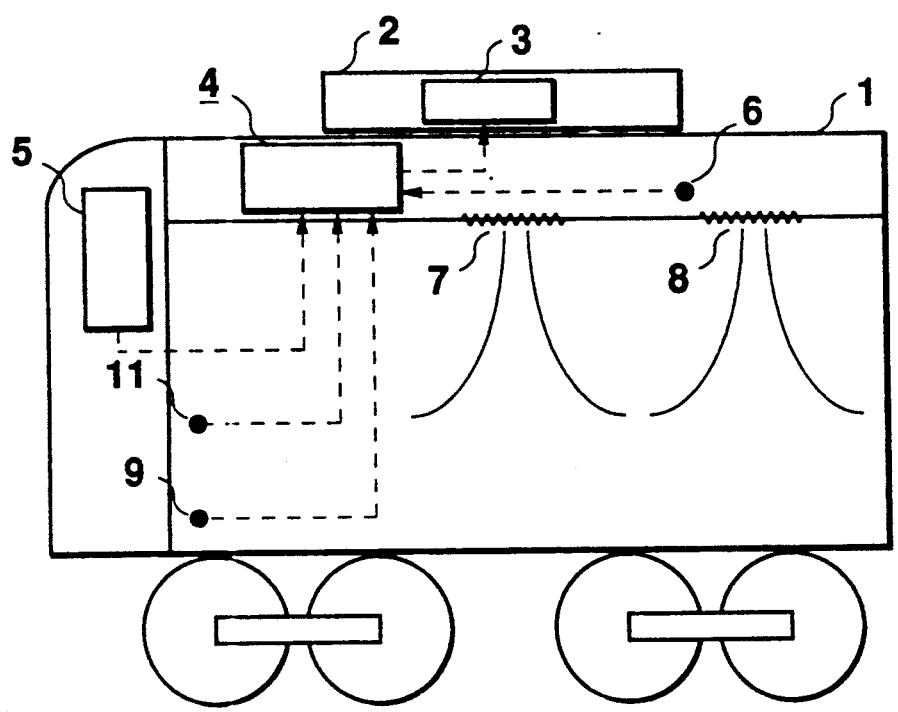
FIG. 9 schematically shows still another embodiment of an air conditioner for railway vehicles according to the present invention.
Figure 10:
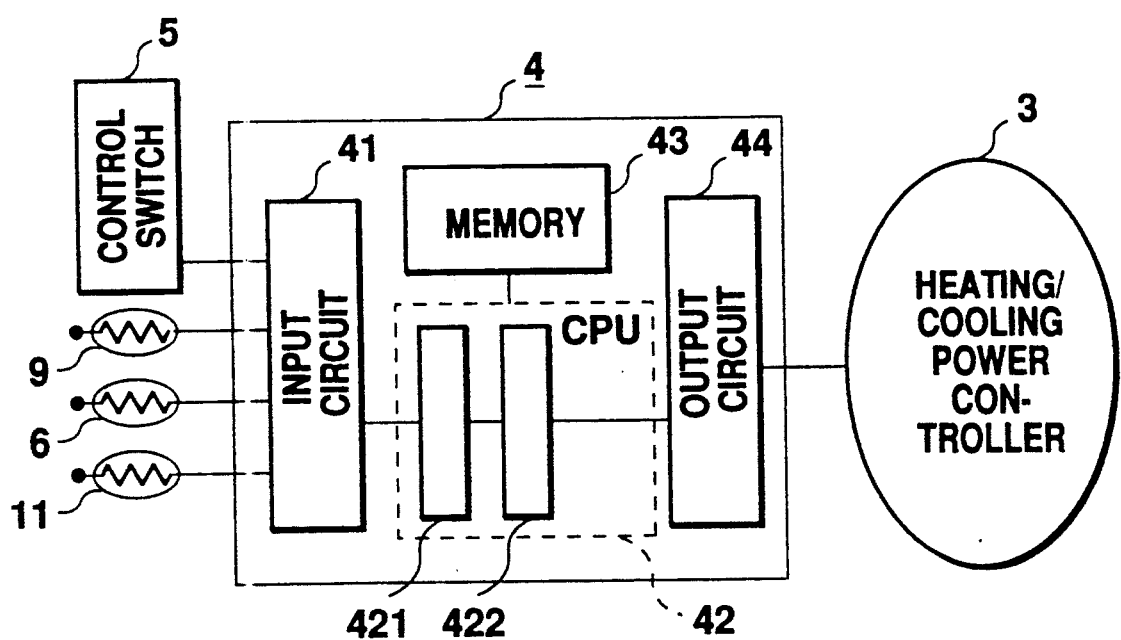
FIG. 10 is a block diagram of still another example of control unit of an air conditioner for railway vehicles according to the present invention.
Figure 11:
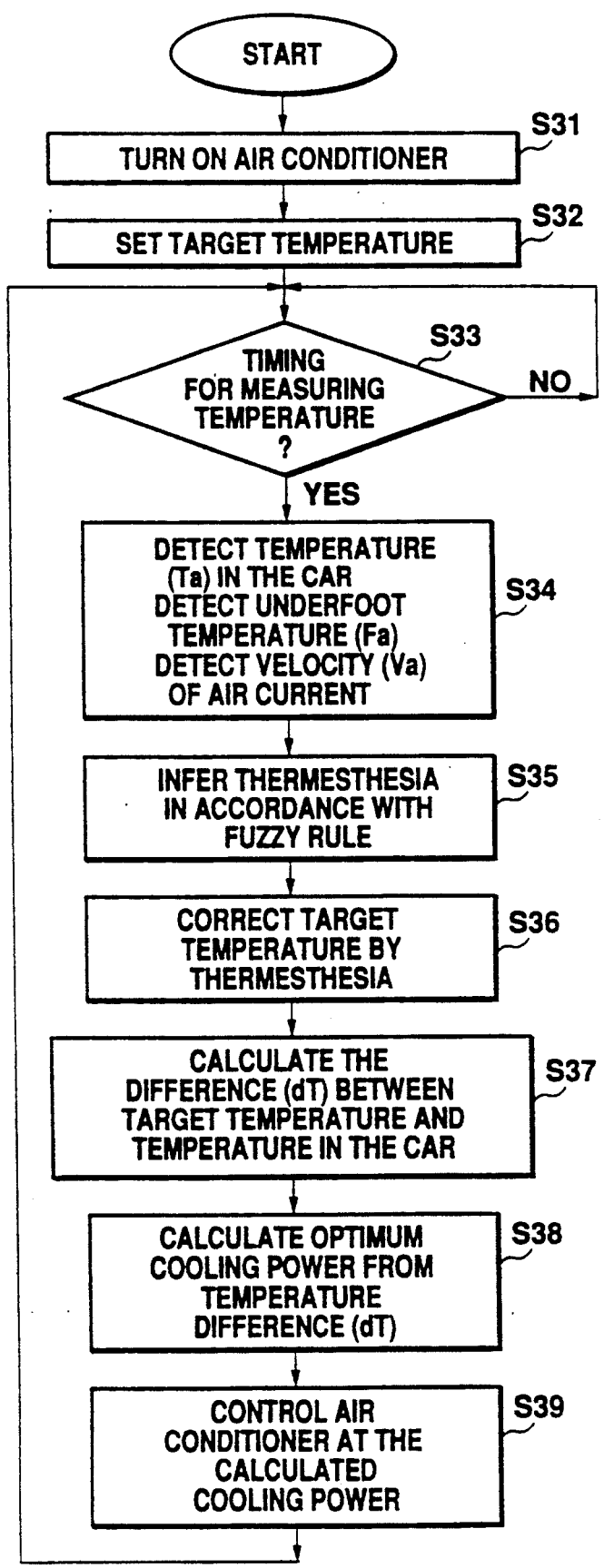
FIG. 11 is a flowchart of still another example of the controlling operation of an air conditioner for railway vehicles according to the present invention.
Figures 12, 13:
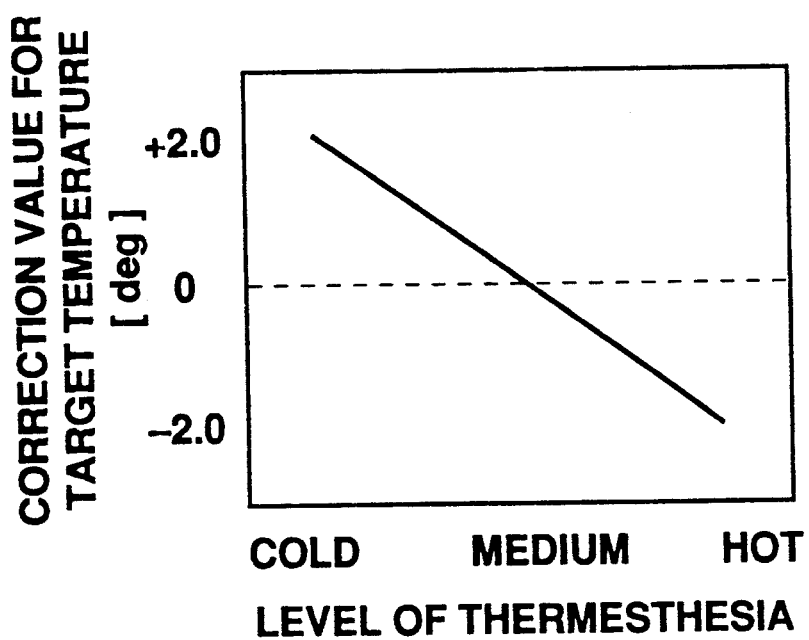
FIG. 12 shows the concept of another example of fuzzy rule for inferring thermesthesia.
FIG. 13 shows the concept of another example of the range of correction value for the target temperature determined by thermesthesia.

A third embodiment of the present invention will be explained with reference to FIG. 9 schematically showing a train car, a circuit diagram in FIG. 10, a flowchart in FIG. 11, FIG. 12 showing the concept of a fuzzy rule for inferring the thermesthesia of the passengers, and FIG. 13 showing the concept of the range of correction value.

FIG. 9 schematically shows the structure of a train car and the flow of data. In FIG. 9, the reference numeral 5 represents a control switch portion by which a train operator turns ON/OFF the air conditioner and sets the target temperature in the car, 4 a control unit for controlling the air conditioner including a heating-/cooling power correcting means, 6 a temperature detector for detecting the temperature of the air in the car, 9 an underfoot temperature detector provided in the vicinity of the floor of the car so as to detect the temperature in the vicinity of the feet of the passengers there and 11 an anemometer for detecting the velocity of the air current in the car. The data on ON/OFF of the air conditioner and the target temperature which has been set by the control switch portion 5, the output of the temperature detector 6, the output of the underfoot temperature detector 9, the output of the anemometer 11, etc. are supplied to the control unit 4.

FIG. 10 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The operation program of the heating/cooling power correcting means is stored in the memory 43 and calculated by the CPU 42. The output of the control switch portion 5 provided in a train operator's compartment, the output of the temperature detector 6, the output of the underfoot temperature detector 9 and the output of the anemometer 11 are input to the input circuit 41. A heating/cooling power controller 3 controls the power of the compressor in accordance with the output of the output circuit 44.

The operation of the air conditioner will be explained with reference to the flowchart in FIG. 11. At step S31, the air conditioner of the train is first turned ON by a train operator or the like, and the target temperature is set at step S32. At step S33, the timing for measuring the temperature is waited, and the temperature Ta of the air in the car, the underfoot temperature Fa and the velocity Va of the air current are detected at step S34. At step S35, the thermesthesia of the passengers is inferred from the vertical temperature difference fdT between the air temperature Ta in the car and the underfoot temperature Fa and the velocity Va in accordance with a fuzzy rule such as that shown in FIG. 12. According to the fuzzy rule shown in FIG. 12, for example, when the vertical temperature difference is large and velocity of the air current is high, it is inferred that the passengers feel cold, while when the vertical temperature difference is small and the velocity of the air current is low, it is inferred that the passengers feel hot. From the vertical temperature difference and the velocity of the air current intermediate between "large" and "medium" or "medium" and "small" or intermediate between "high" and "medium" or "medium" and "low", the level of the thermesthesia of the passengers is also inferred. The target temperature is corrected from the result of the inference of the thermesthesia in accordance with the level of the themesthesia, as shown in FIG. 13, at step S36. At step S37, the temperature difference dT between the temperature of the air in the car and the newly calculated target temperature, and at step S38, the optimum cooling power is calculated from the temperature difference dT. At step S39, the cooling operation is continued at the newly calculated cooling power.

In this way, the thermesthesia of the passengers is inferred from the temperature difference between in the upper portion and the lower portion of the car and the velocity of the air current in the car, and the correction value for the target temperature is calculated so that the target temperature is lowered when the result of the inference shows that the passenger feel hot while the target temperature is raised when the result of the inference shows that the passenger feel cold. Since the cooling operation is carried out while correcting the target temperature, it is possible to constantly provide a comfortable environment for the passengers.

Fourth Embodiment

Figure 14:
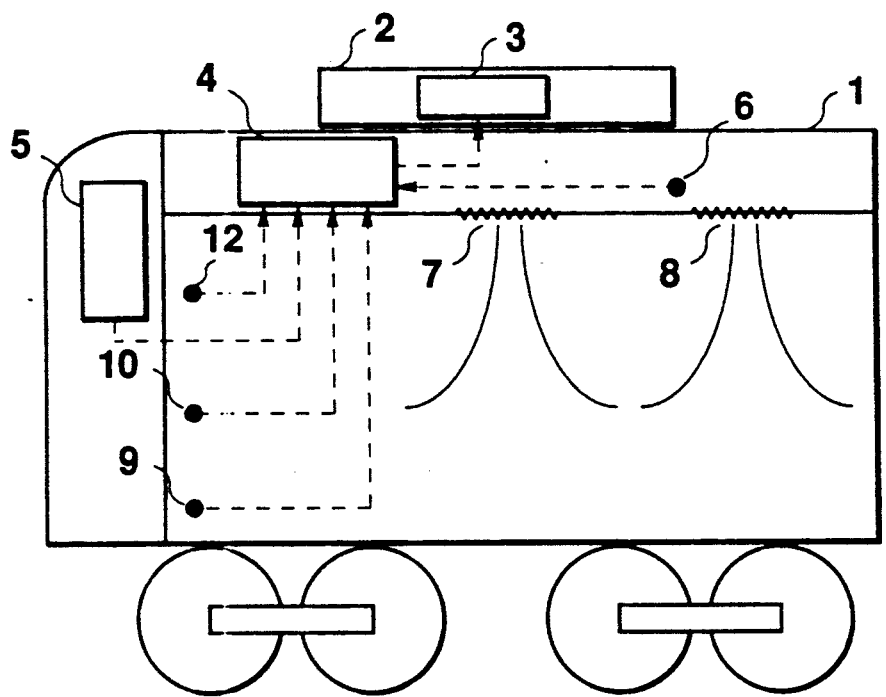
FIG. 14 schematically shows a further embodiment of an air conditioner for railway vehicles according to the present invention.
Figure 15:
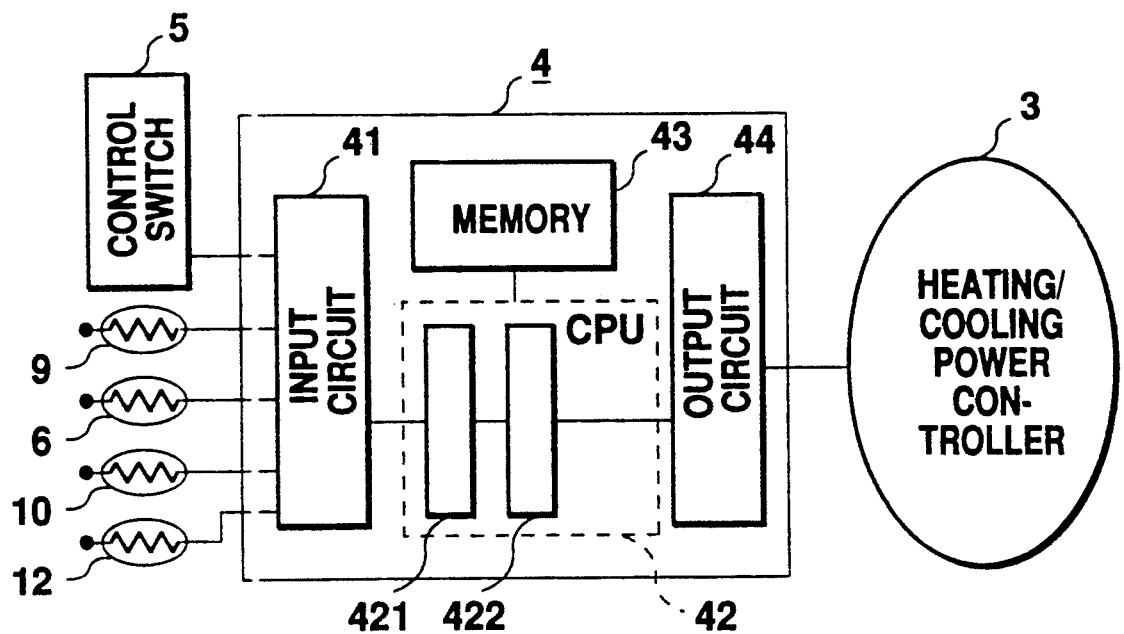
FIG. 15 is a block diagram of a further example of control unit of an air conditioner for railway vehicles according to the present invention.
Figure 16:
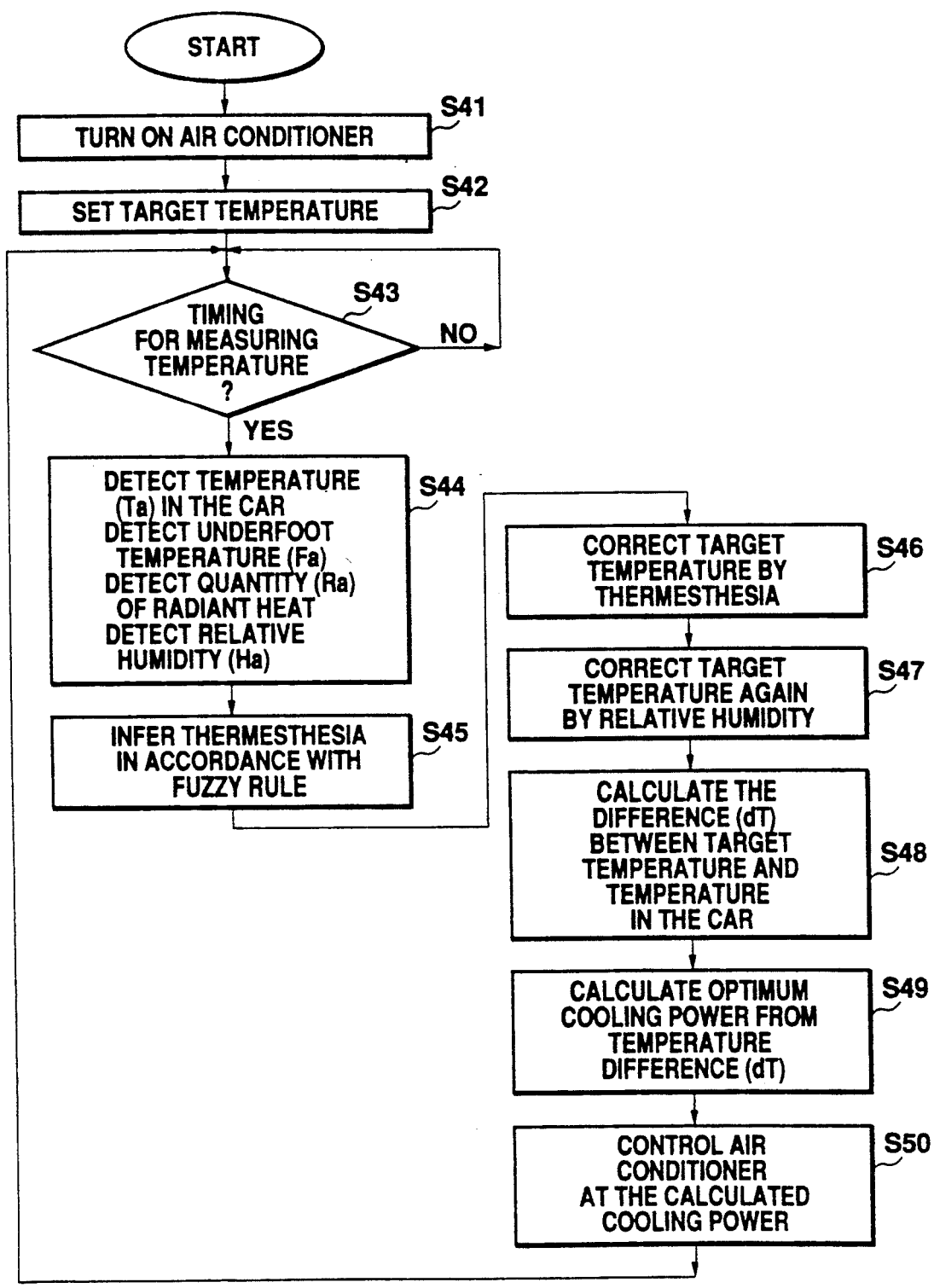
FIG. 16 is a flowchart of a further example of controlling operation of an air conditioner for railway vehicles according to the present invention.
Figure 17:
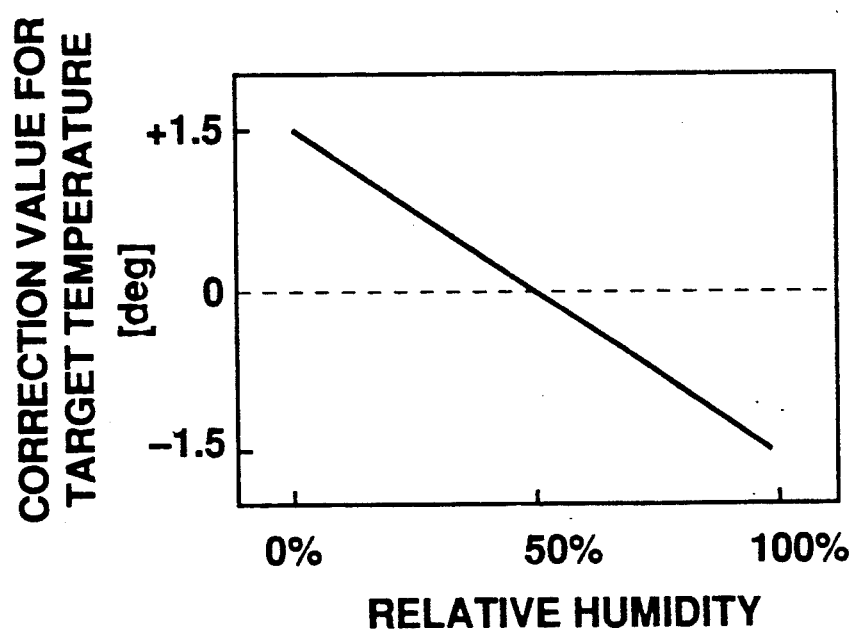
FIG. 17 shows the concept of an example of the range of correction value for the target temperature determined by a relative humidity.

A fourth embodiment of the present invention will be explained with reference to FIG. 14 schematically showing a train car, a circuit diagram in FIG. 15, a flowchart in FIG. 16, and FIG. 17 showing the concept of the correction of a target temperature in accordance with a humidity.

FIG. 14 schematically shows the structure of a train car and the flow of data. In FIG. 14, the reference numeral 5 represents a control switch portion by which a train operator turns ON/OFF the air conditioner and sets the target temperature in the car, 4 a control unit for controlling the air conditioner including a target temperature correcting means for correcting the target temperature in accordance with a humidity, 6 a temperature detector for detecting the temperature of the air in the car, 9 an underfoot temperature detector provided in the vicinity of the floor of the car so as to detect the temperature in the vicinity of the feet of the passengers there, 10 a radiant heat quantity detector for detecting the quantity of radiant heat generated by solar radiation or the like, and 12 a hygrometer for detecting the relative humidity. The data on ON/OFF of the air conditioner and the target temperature which has been set by the control switch portion 5, the output of the temperature detector 6, the output of the underfoot temperature detector 9, the output of the radiant heat quantity detector 10, the output of the hygrometer 12, etc. are supplied to the control unit 4.

FIG. 12 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The operation program of the target temperature correcting means is stored in the memory 43 and calculated by the CPU 42. The output of the control switch portion 5 provided in a train operator's compartment, the output of the temperature detector 6, the output of the underfoot temperature detector 9, the output of the radiant heat quantity detector 10 and the output of the hygrometer 12 are input to the input circuit 41. A heating/cooling power controller 3 controls the power of the compressor in accordance with the output of the output circuit 44.

The operation of the air conditioner will be explained with reference to the flowchart in FIG. 16. At step S41, the air conditioner of the train is first turned ON by a train operator or the like, and the target temperature is set at step S42. At step S43, a preset time for measuring the temperature is allowing to pass, and the air temperature Ta in the car, the underfoot temperature Fa and the quantity Ra of radiant heat and the relative humidity Ha are detected at step S44. At step S45, the thermesthesia of the passengers is inferred from the vertical temperature difference fdT between the temperature Ta of the air in the car, the underfoot temperature Fa and the quantity Ra of radiant heat. The target temperature is corrected from the result of the inference of the thermesthesia at step S46. At step S47, the target temperature correcting means calculates the correction value for the target temperature in accordance with the detected relative humidity so that the target temperature is lowered when the humidity is high, while the target temperature is raised when the humidity is low, as shown in FIG. 17. In this way, the target temperature which has been corrected in accordance with the result of the inference of the thermesthesia is further corrected by the correction value. At step S48, the temperature difference dT between the temperature of the air in the car and the newly calculated target temperature is calculated. At step S49, the optimum cooling power is calculated and the cooling operation is continued at the newly calculated cooling power at step 50.

In this way, the thermesthesia of the passengers is inferred from the temperature difference between in the upper portion and the lower portion of the car and the quantity of radiant heat, and the correction value for the target temperature is calculated. The target temperature is further corrected in accordance with the relative humidity. Since the cooling operation is carried out while correcting the target temperature in correspondence with the thermesthesia of the passengers, it is possible to constantly provide a comfortable environment for the passengers.

Fifth Embodiment

Figure 18:
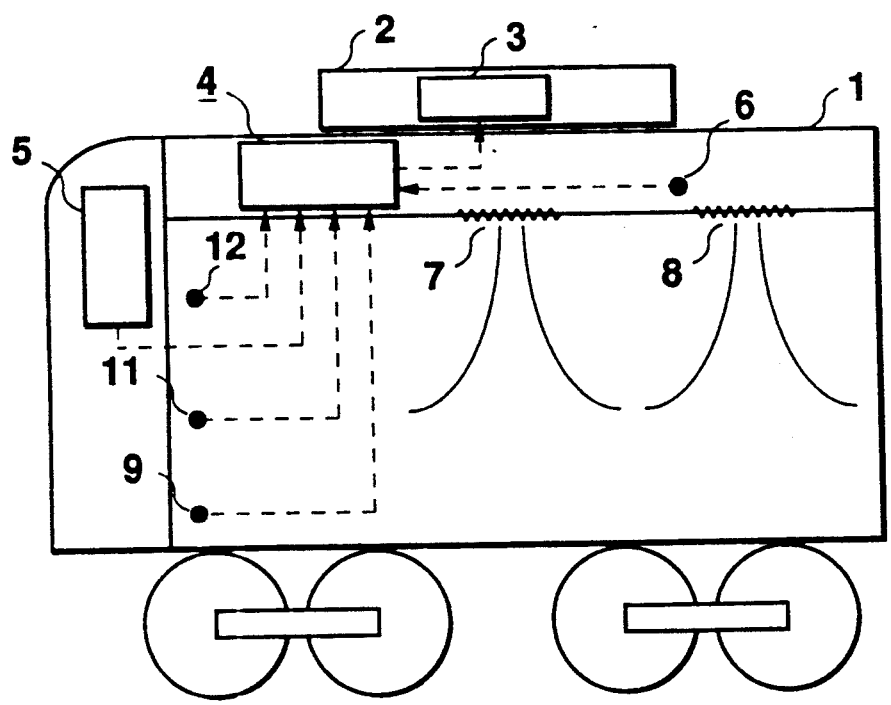
FIG. 18 schematically shows a still further embodiment of an air conditioner for railway vehicles according to the present invention.
Figure 19:
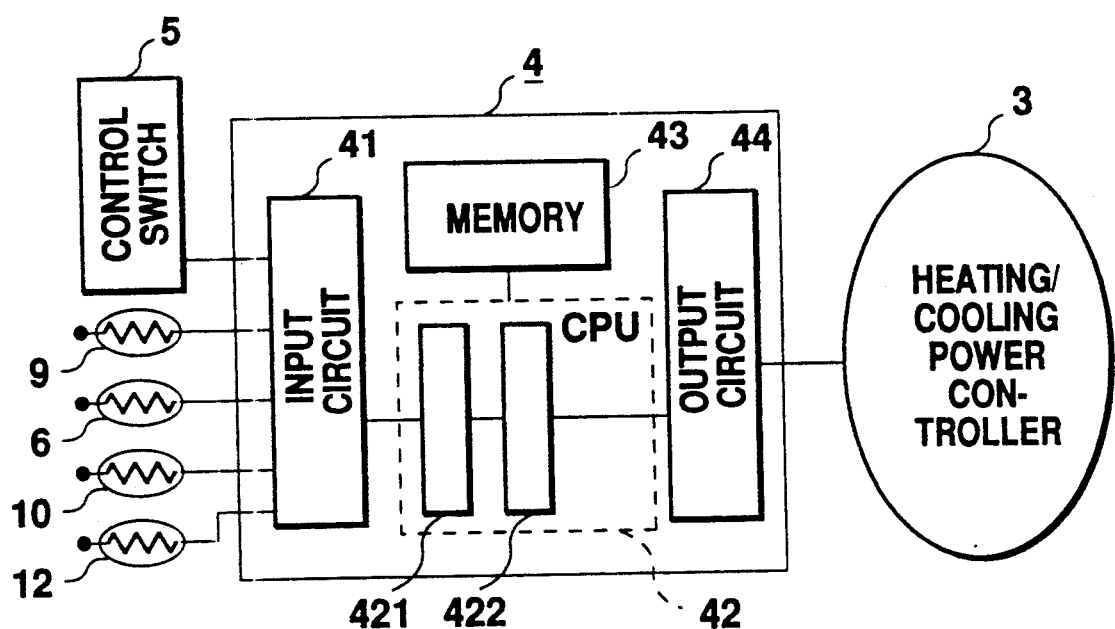
FIG. 19 is a block diagram of a still further example of control unit of an air conditioner for railway vehicles according to the present invention.
Figure 20:
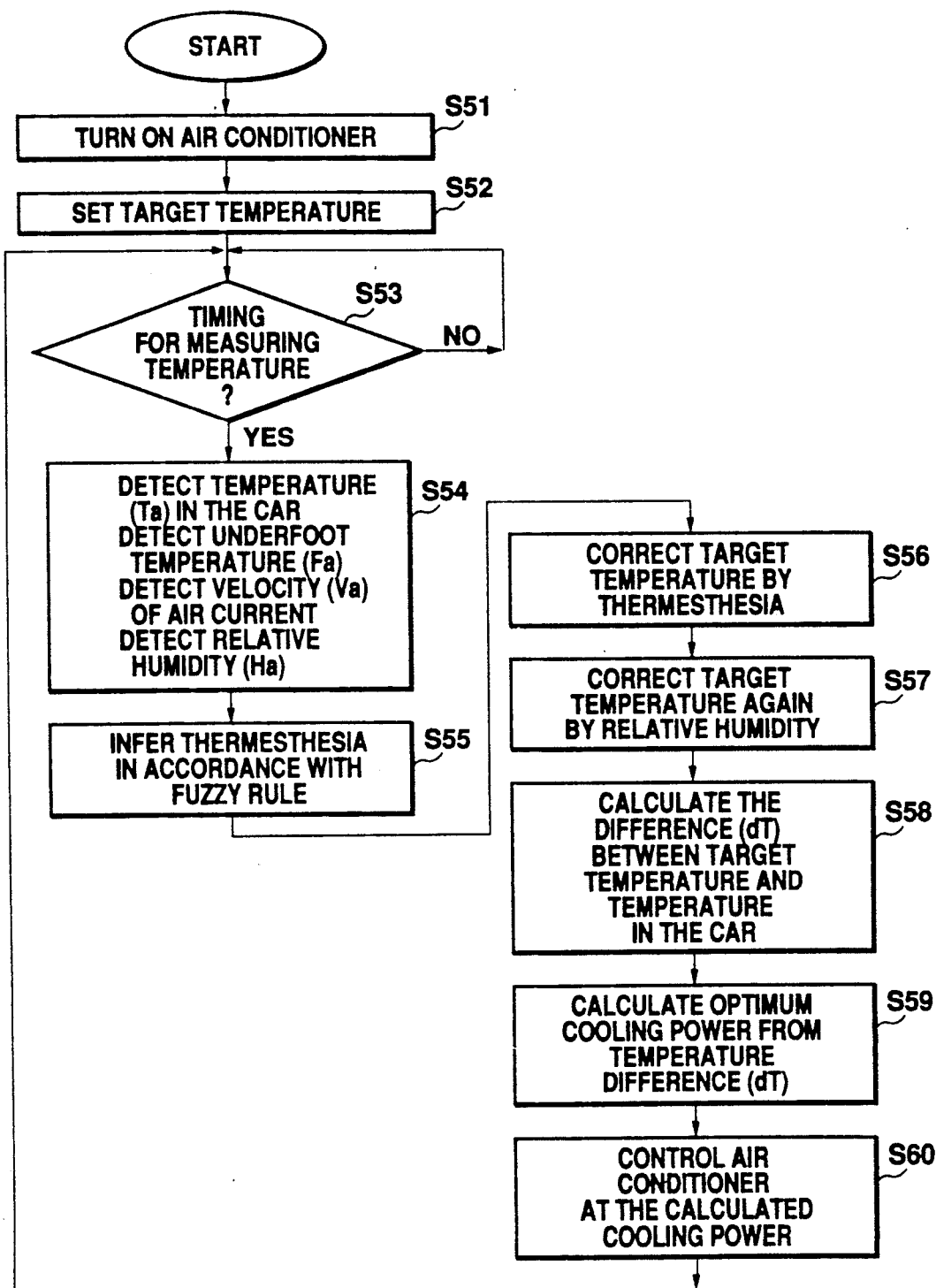
FIG. 20 is a flowchart of a still further example of the controlling operation of an air conditioner for railway vehicles according to the present invention.

A fifth embodiment of the present invention will be explained with reference to FIG. 18 schematically showing a train car, a circuit diagram in FIG. 19, a flowchart in FIG. 20, and FIG. 17 showing the concept of the correction of a target temperature in accordance with a humidity.

FIG. 18 schematically shows the structure of a train car and the flow of data. In FIG. 18, the reference numeral 5 represents a control switch portion by which a train operator turns ON/OFF the air conditioner and sets the target temperature in the car, 4 a control unit for controlling the air conditioner including a target temperature correcting means for correcting the target temperature in accordance with a humidity, 6 a temperature detector for detecting the air temperature in the car, 9 an underfoot temperature detector provided in the vicinity of the floor of the car so as to detect the temperature in the vicinity of the feet of the passengers there, 11 an anemometer for detecting the velocity of the air current in the car and 12 a hygrometer for detecting the relative humidity. The data on ON/OFF of the air conditioner and the target temperature which has been set by the control switch portion 5, the output of the temperature detector 6, the output of the underfoot temperature detector 9, the output of the anemometer 11, the output of the hygrometer 12, etc. are supplied to the control unit 4.

FIG. 19 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The operation program of the target temperature correcting means is stored in the memory 43 and calculated by the CPU 42. The output of the control switch portion 5 provided in a train operator's compartment, the output of the temperature detector 6, the output of the underfoot temperature detector 9, the output of the anemometer 11 and the output of the hygrometer 12 are input to the input circuit 41. A heating/cooling power controller 3 controls the power of the compressor in accordance with the output of the output circuit 44.

The operation of the air conditioner will be explained with reference to the flowchart in FIG. 20. At step S51, the air conditioner of the train is first turned ON by a train operator or the like, and the target temperature is set at step S42. At step S53, a present time for measuring the temperature is allowed to pass, and the air temperature Ta in the car, the underfoot temperature Fa, the velocity Va of the air current and the relative humidity Ha are detected at step S44. At step S55, the thermesthesia of the passengers is inferred from the vertical temperature difference fdT between the temperature Ta of the air in the car and the underfoot temperature Fa and the velocity Va of the air current. The target temperature is corrected from the result of the inference of the thermesthesia at step S56. At step S57, the target temperature correcting means calculates the correction value for the target temperature in accordance with the detected relative humidity so that the target temperature is lowered when the humidity is high, while the target temperature is raised when the humidity is low, as shown in FIG. 17. In this way, the target temperature which has been corrected in accordance with the result of the inference of the thermesthesia is further corrected by the correction value. At step S58, the temperature difference dT between the air temperature in the car and the newly calculated target temperature is calculated. At step S59, the optimum cooling power is calculated and the cooling operation is continued at the newly calculated cooling power at step 60.

In this way, the thermesthesia of the passengers is inferred from the temperature difference between in the upper portion and the lower portion of the car and the velocity of the air current, and the correction value for the target temperature is calculated. The target temperature is further corrected in accordance with the relative humidity. Since the cooling operation is carried out while correcting the target temperature in correspondence with the thermesthesia of the passengers, it is possible to constantly provide a comfortable environment for the passengers.

Figure 21:
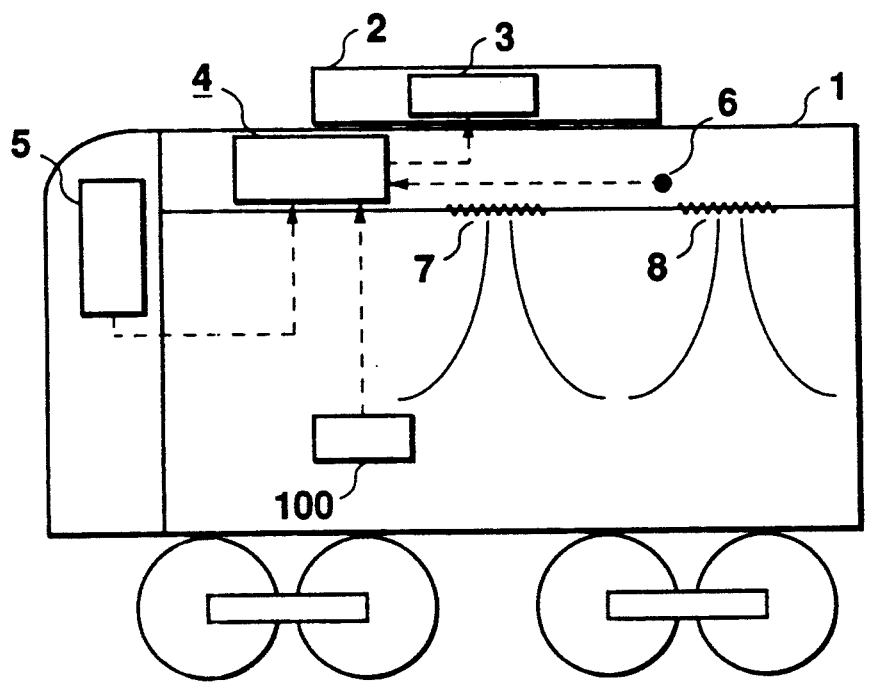
FIG. 21 schematically shows a still further embodiment of an air conditioner for railway vehicles according to the present invention.
Figure 22:
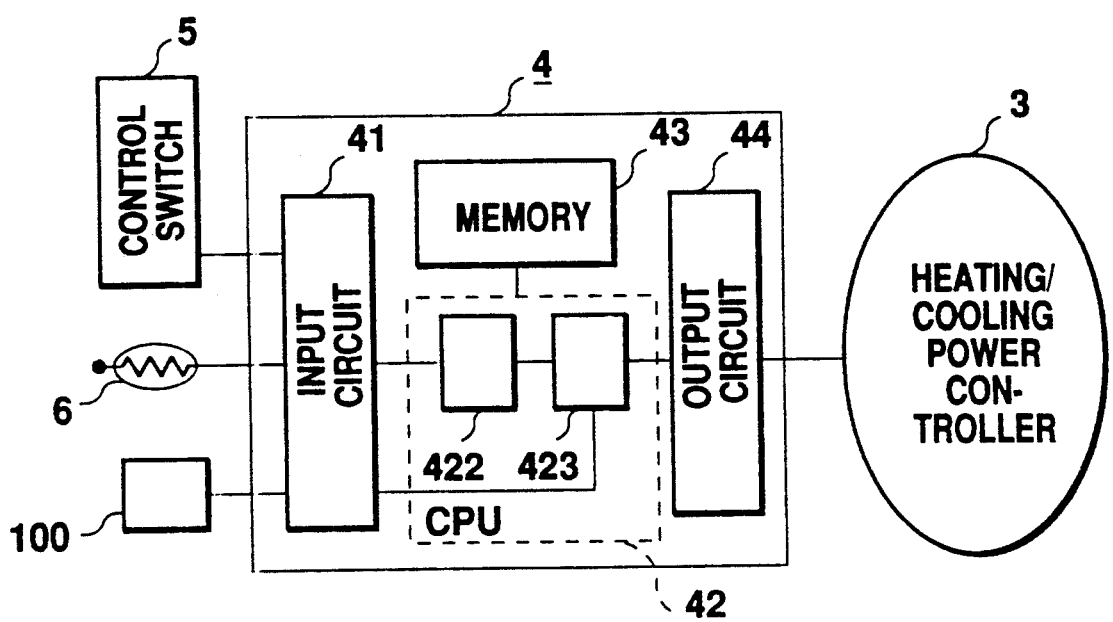
FIG. 22 is a block diagram of a still further example of control unit of an air conditioner for railway vehicles according to the present invention.

The schematic view of a train car in FIG. 21 and the circuit diagram in FIG. 22 show an example of the control of the power of an air conditioner by the use of a temperature detector 6 for detecting the air temperature in a car and at least one cooling power correcting value data detector 100.

FIG. 21 schematically shows the structure of a train car and the flow of data. In FIG. 21, the reference numeral 100 represents a cooling power correcting value data detector 100 provided separately from the temperature detector 6 for detecting the temperature of the air in a car, and 4 a control unit for controlling the air conditioner including a heating/cooling power correcting means. Various data detected by the cooling power correcting value data detector 100 are supplied to the control unit 4.

FIG. 22 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating/cooling power correcting means 423. The operation program of the heating/cooling power correcting means is stored in the memory 43 and calculated by the CPU 42. The output of the control switch portion 5 provided in a train operator's compartment, the output of the temperature detector 6 and the output of the cooling power correcting value data detector 100 are input to the input circuit 41. A heating/cooling power controller 3 controls the power of the compressor in accordance with the output of the output circuit 44. Concrete examples of the cooling power correcting value data detector 100 will be explained in the following embodiments.

Sixth Embodiment

Figure 23:
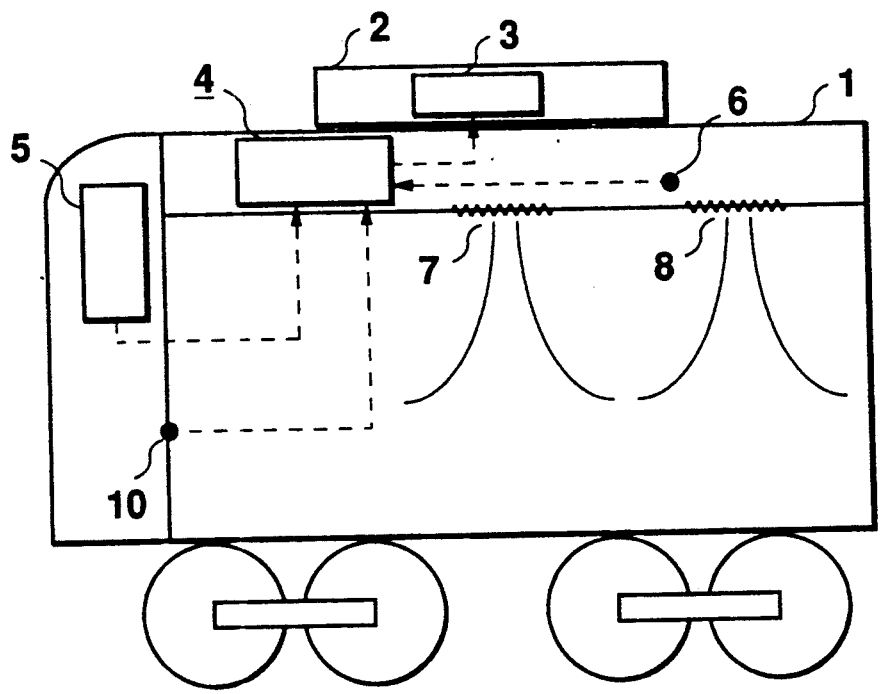
FIG. 23 schematically shows a still further embodiment of an air conditioner for railway vehicles according to the present invention.
Figure 24:
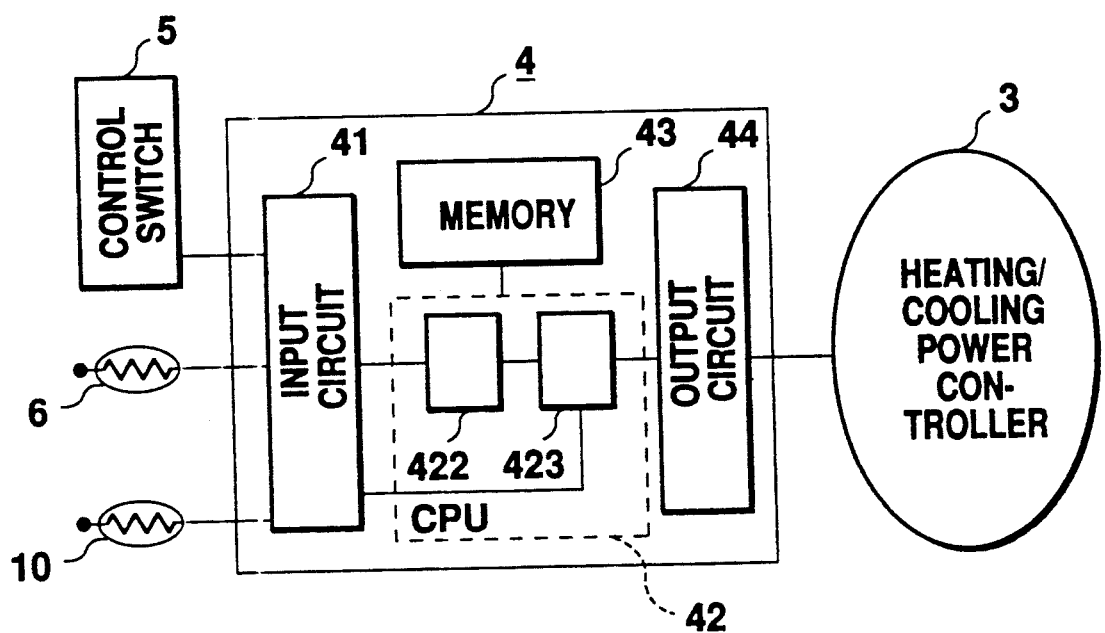
FIG. 24 is a block diagram of a still further example of control unit of an air conditioner for railway vehicles according to the present invention.
Figure 25:
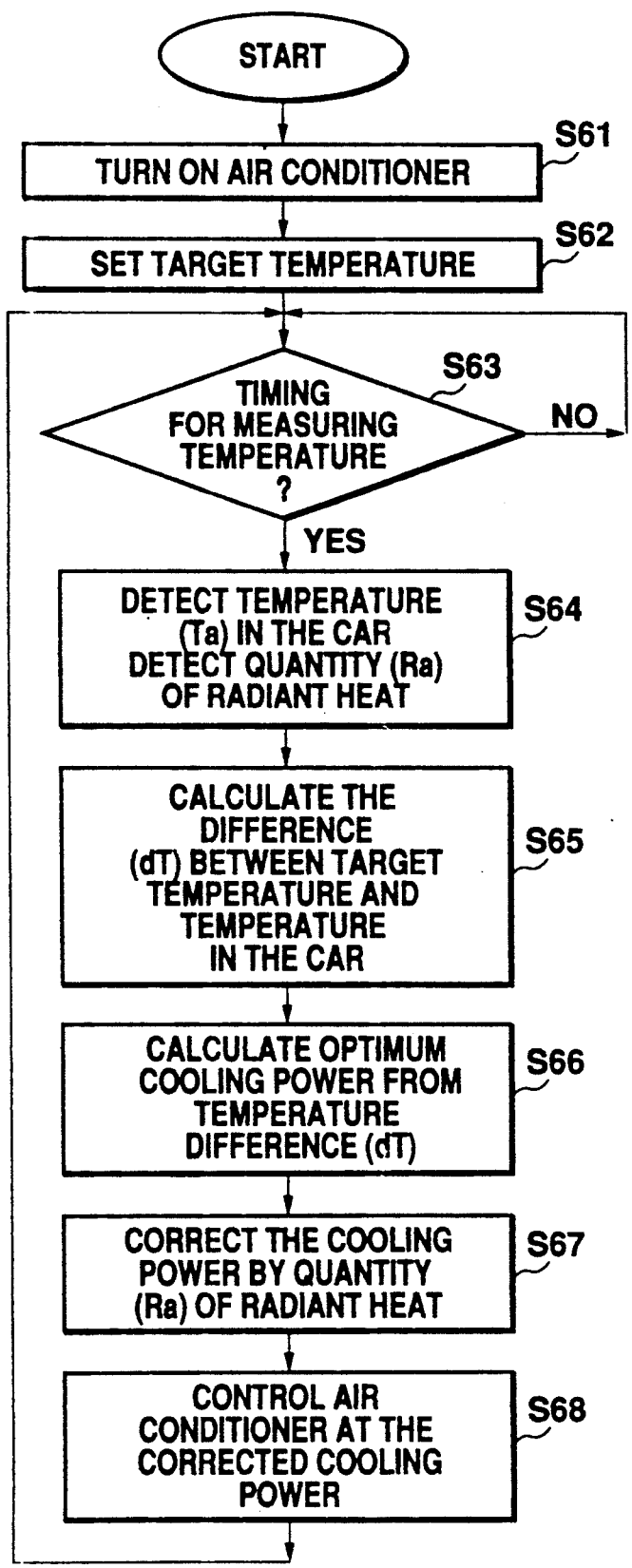
FIG. 25 is a flowchart of a still further example of the controlling operation of an air conditioner for railway vehicles according to the present invention.

A sixth embodiment of the present invention will be explained with reference to FIGS. 23 to 25. FIG. 23 schematically shows a train car, FIG. 24 is a circuit diagram of the sixth embodiment and FIG. 25 is a flowchart of the controlling operation of the sixth embodiment. FIG. 23 schematically shows the structure of a train car and the flow of data. In FIG. 23, the cooling power correcting value data detector 100 shown in FIG. 21 is shown as a radiant heat quantity detector 10 for detecting the quantity of radiant heat. The quantity of radiant heat detected by the radiant heat quantity detector is supplied to the control unit 4 of the air conditioner.

FIG. 24 is a circuit diagram of the control unit 4. The cooling power correcting value data detector 100 shown in FIG. 22 is shown as the radiant heat quantity detector 10. The operation program of the heating/cooling power correcting means is stored in the memory 43 and calculated by the CPU 42.

The operation of the air conditioner will now be explained with reference to the flowchart in FIG. 25. At step S61, the air conditioner of the train is first turned ON by a train operator or the like, and the target temperature is set at step S62. At step S63, a preset time for measuring the temperature is allowed pass, and the temperature Ta of the air in the car and the quantity Ra of radiant heat are detected at step S64. At step S65, the temperature difference dT between the target temperature and the temperature Ta of the air in the car is obtained. The correction value for the heating/cooling power is inferred from the temperature difference dT between the target temperature and the temperature of the air in the car in accordance with a fuzzy rule so that the air temperature in the car is equal to the target temperature, and the optimum cooling power is calculated at step 66. The next step 67 is a routine showing the heating/cooling power correcting means. The heating/cooling power is corrected in accordance with the detected quantity Ra of radiant heat so that when the output of the optimum heating/cooling power calculator indicates that the cooling power is increased, the cooling power is increased to a slightly larger value than the calculated value if the quantity of radiant heat is large, while the cooling power is increased to a slightly smaller value than the calculated value if the quantity of radiant heat is small. On the other hand, when the output of the optimum heating/cooling power calculator indicates that the cooling power is reduced, the cooling power is reduced to a slightly smaller value than the calculated value if the quantity of radiant heat is large, while the cooling power is reduced to a slightly larger value than the calculated value if the quantity of radiant heat is small. At step S68, the cooling operation is continued at the newly corrected cooling power.

Seventh Embodiment

Figure 26:
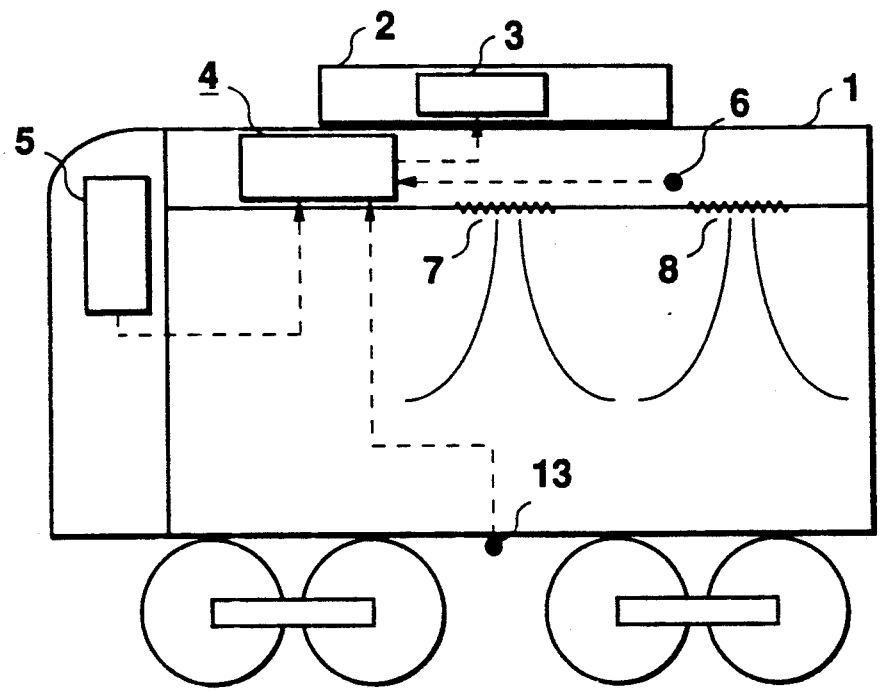
FIG. 26 schematically shows a still further embodiment of an air conditioner for railway vehicles according to the present invention.

A seventh embodiment of the present invention will be explained with reference to FIGS. 26 schematically showing a train car and a circuit diagram shown in FIG. 27. FIG. 26 schematically shows the structure of a train car and the flow of data. In FIG. 26, the cooling power correcting value data detector 100 shown in FIG. 21 is shown as an outdoor air temperature detector 13. The reference numeral 4 denotes a control unit of the air conditioner provided with a heating/cooling power determining means including a heating/cooling power correcting means. The temperature of the out door detected by the temperature of the out door detector 13 is supplied to the control unit 4.

Figure 27:
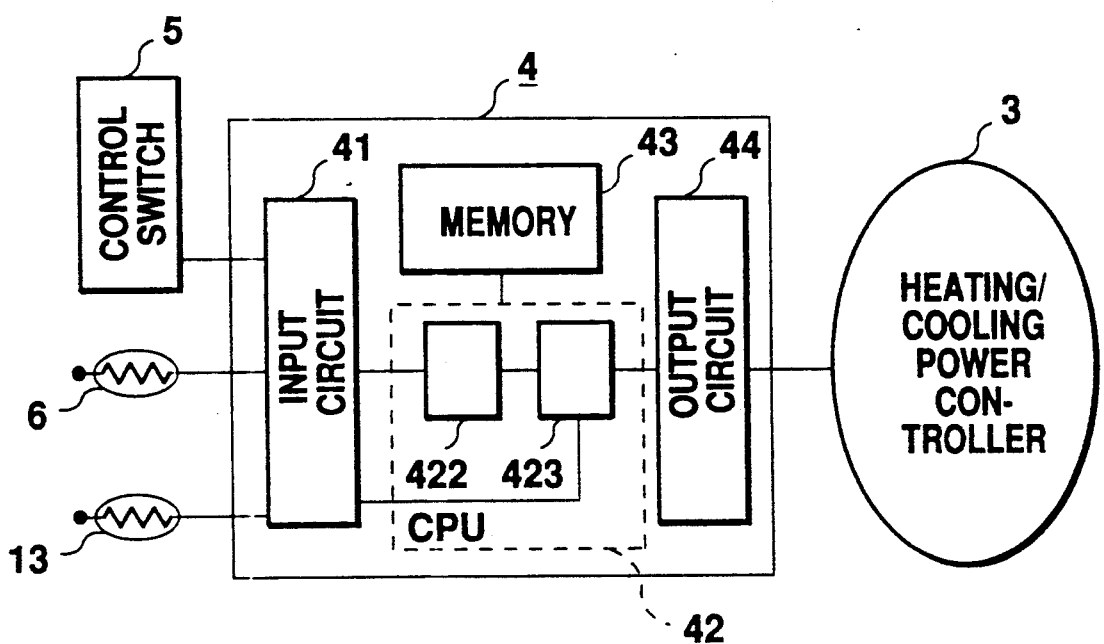
FIG. 27 is a block diagram of a still further example of control unit of an air conditioner for railway vehicles according to the present invention.

FIG. 27 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating/cooling power correcting means 423. The operation program of the heating/cooling power correcting means is stored in the memory 43 and calculated by the CPU 42. The output of the control switch portion 5 provided in a train operator's compartment, the output of the temperature detector 6 and the output of the outside air temperature detector 13 are input to the input circuit 41. A heating/cooling power controller 3 controls the power of the compressor in accordance with the output of the output circuit 44.

Figure 28:
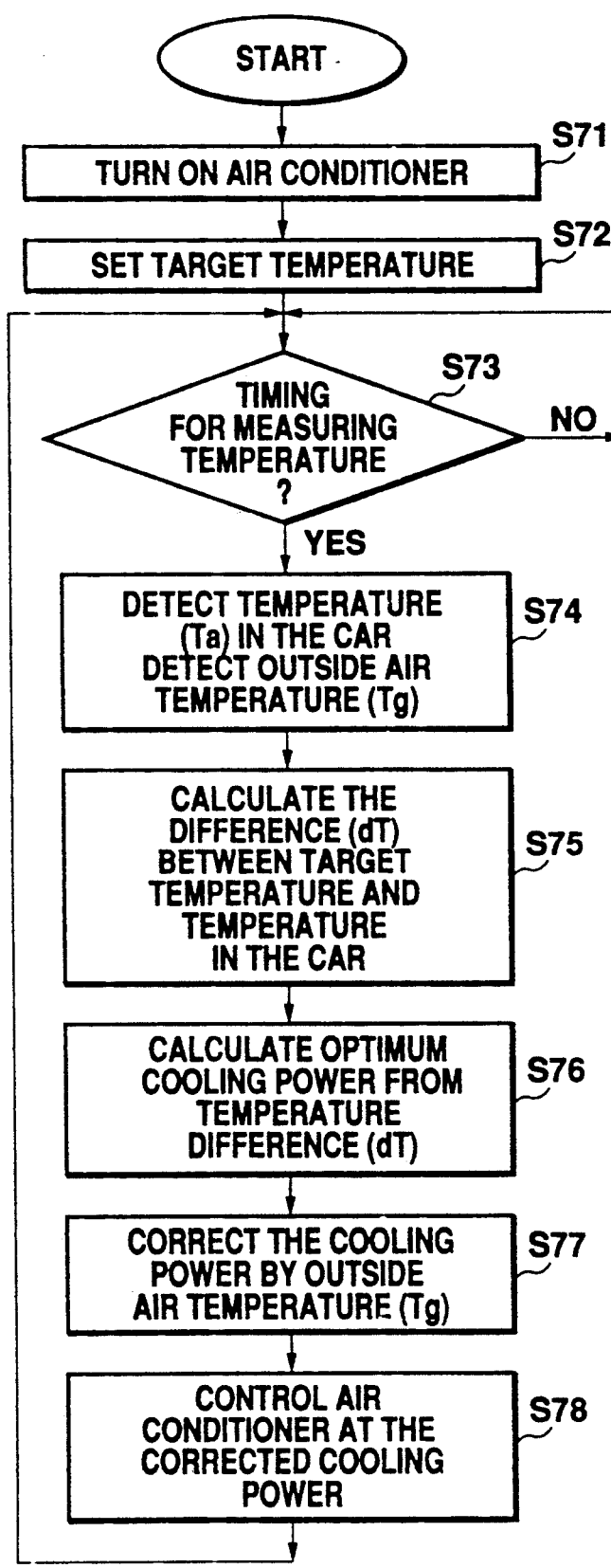
FIG. 28 is a flowchart of a still further example of the controlling operation of an air conditioner for railway vehicles according to the present invention.

The operation of the air conditioner will now be explained with reference to the flowchart in FIG. 28. At step S71, the air conditioner of the train is first turned ON by a train operator or the like, and the target temperature is set at step S72. At step S73, the timing for measuring the temperature is waited, and the air temperature Ta in the car and the outside air temperature Tg are detected at step S74. At step S75, the temperature difference dT between the target temperature and the air temperature in the car is obtained.

The correction value for the heating/cooling power is inferred from the temperature difference dT between the target temperature and the air temperature in the car in accordance with a fuzzy rule so that the air temperature in the car is equal to the target temperature, and the optimum cooling power is calculated at step 76. The next step 77 is a routine showing the heating/cooling power correcting means. The heating/cooling power is corrected in accordance with the detected temperature Tg of the outside air so that when the output of the optimum heating/cooling power calculator indicates that the cooling power is increased, the cooling power is increased to a slightly larger value than the calculated value if the temperature of the outside air is high, while the cooling power is increased to a slightly smaller value than the calculated value if the temperature of the outside air is low. On the other hand, when the output of the optimum heating/cooling power calculator indicates that the cooling power is reduced, the cooling power is reduced to a slightly smaller value than the calculated value if the temperature of the outside air is high, while the cooling power is reduced to a slightly larger value than the calculated value if the outside air temperature is low. At step S78, the cooling operation is continued at the newly corrected cooling power.

Eighth Embodiment

Figure 29:
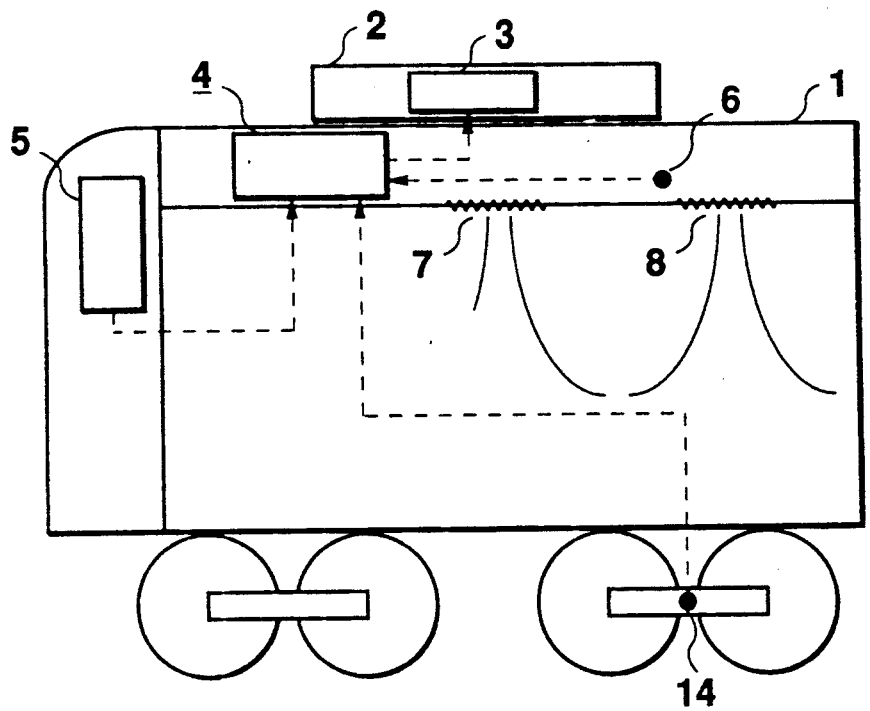
FIG. 29 schematically shows a still further embodiment of an air conditioner for railway vehicles according to the present invention.
Figure 30:
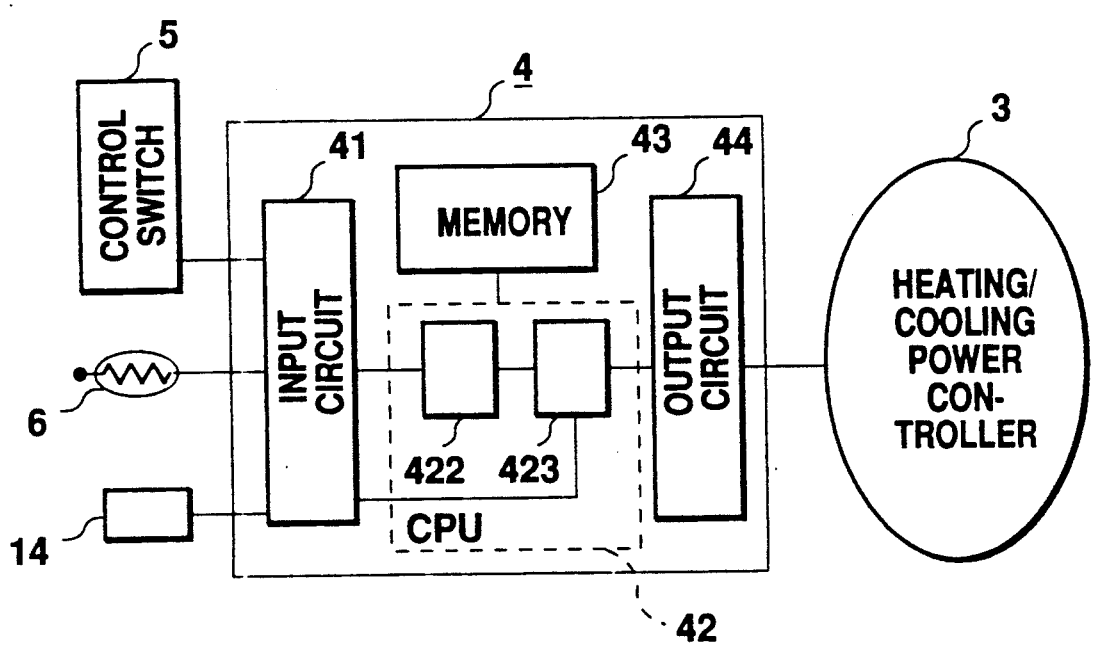
FIG. 30 is a block diagram of a still further example of control unit of an air conditioner for railway vehicles according to the present invention.
Figure 31:
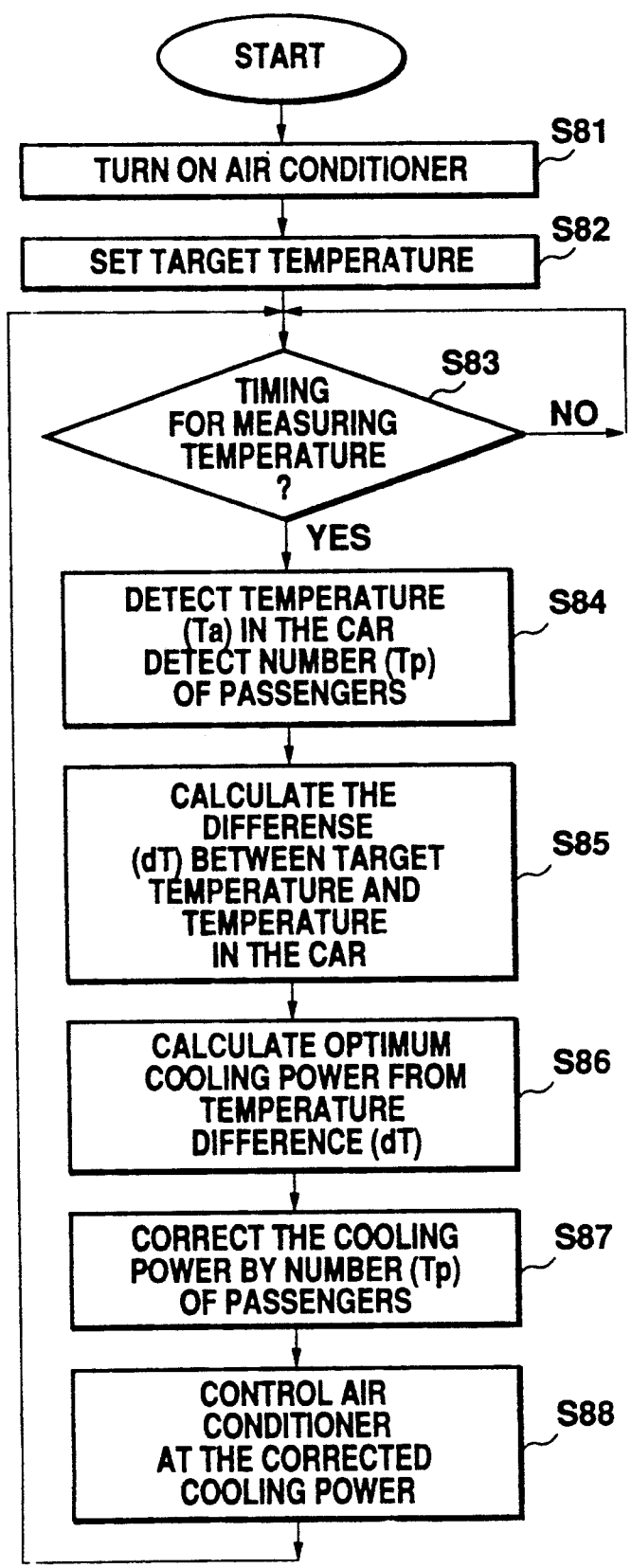
FIG. 31 is a flowchart of a still further example of the controlling operation of an air conditioner for railway vehicles according to the present invention.

An eighth embodiment of the present invention will be explained with reference to FIGS. 29 to 31. FIG. 29 schematically shows a train car, FIG. 30 is a circuit diagram of the eight embodiment and FIG. 31 is a flowchart of the controlling operation of the eighth embodiment. FIG. 29 schematically shows the structure of a train car and the flow of data. In FIG. 29, the cooling power correcting value data detector 100 shown in FIG. 21 is shown as a passenger number detector 14 for detecting the number of passengers. The passenger number detector 14 obtains the total weight of the car, for example, on the basis of the amount of contraction of the spring of a car suspension device and detects the number of passengers from the total weight. The reference numeral 4 denotes a control unit of the air conditioner provided with a heating/cooling power determining means including a heating/cooling power correcting means. The number of passengers detected by the passenger number detector 14

FIG. 30 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating-/cooling power correcting means 423. The operation program of the heating/cooling power correcting means is stored in the memory 43 and calculated by the CPU 42. The output of the control switch portion 5 provided in a train operator's compartment, the output of the temperature detector 6 and the output of the passenger number detector 14 are input to the input circuit 41. A heating/cooling power controller 3 controls the power of the compressor in accordance with the output of the output circuit 44.

The operation of the air conditioner will now be explained with reference to the flowchart in FIG. 31. At step S81, the air conditioner of the train is first turned ON by a train operator or the like, and the target temperature is set at step S82. At step S83, the timing for measuring the temperature is waited, and the temperature Ta of the air in the car and the number Tp of passengers are detected at step S84. At step S85, the temperature difference dT between the target temperature and the air temperature in the car is obtained.

The correction value for the heating/cooling power is inferred from the temperature difference dT between the target temperature and the temperature of the air in the car in accordance with a fuzzy rule, and the optimum cooling power is calculated at step 86. The next step 87 is a routine showing the heating/cooling power correcting means. The heating/cooling power is corrected in accordance with the detected number Tp of passengers so that when the output of the optimum heating/cooling power calculator indicates that the cooling power is increased, the cooling power is increased to a slightly larger value than the calculated value if the number of passengers is large, while the cooling power is increased to a slightly smaller value than the calculated value if the number of passengers is small. On the other hand, when the output of the optimum heating/cooling power calculator indicates that the cooling power is reduced, the cooling power is reduced to a slightly smaller value than the calculated value if the number of passengers is small, while the cooling power is reduced to a slightly larger value than the calculated value if the number of passengers is large.

At step S88, the cooling operation is continued at the newly corrected cooling power.

Ninth Embodiment

Figure 32:
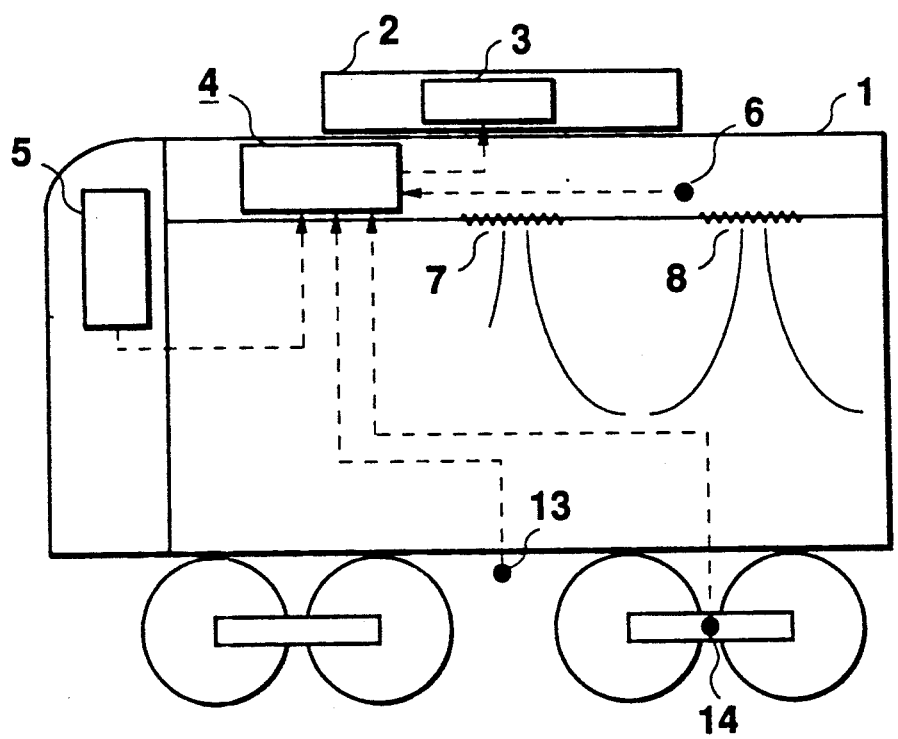
FIG. 32 schematically shows a still further embodiment of an air conditioner for railway vehicles according to the present invention.
Figure 33:
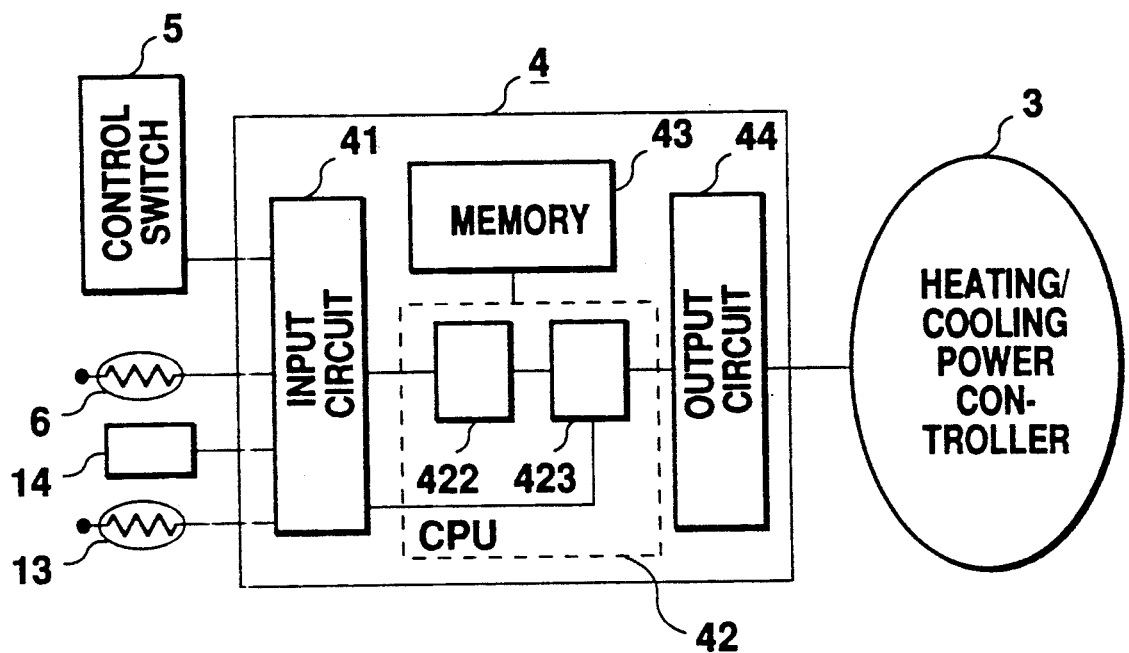
FIG. 33 is a block diagram of a still further example of control unit of an air conditioner for railway vehicles according to the present invention.
Figure 34:
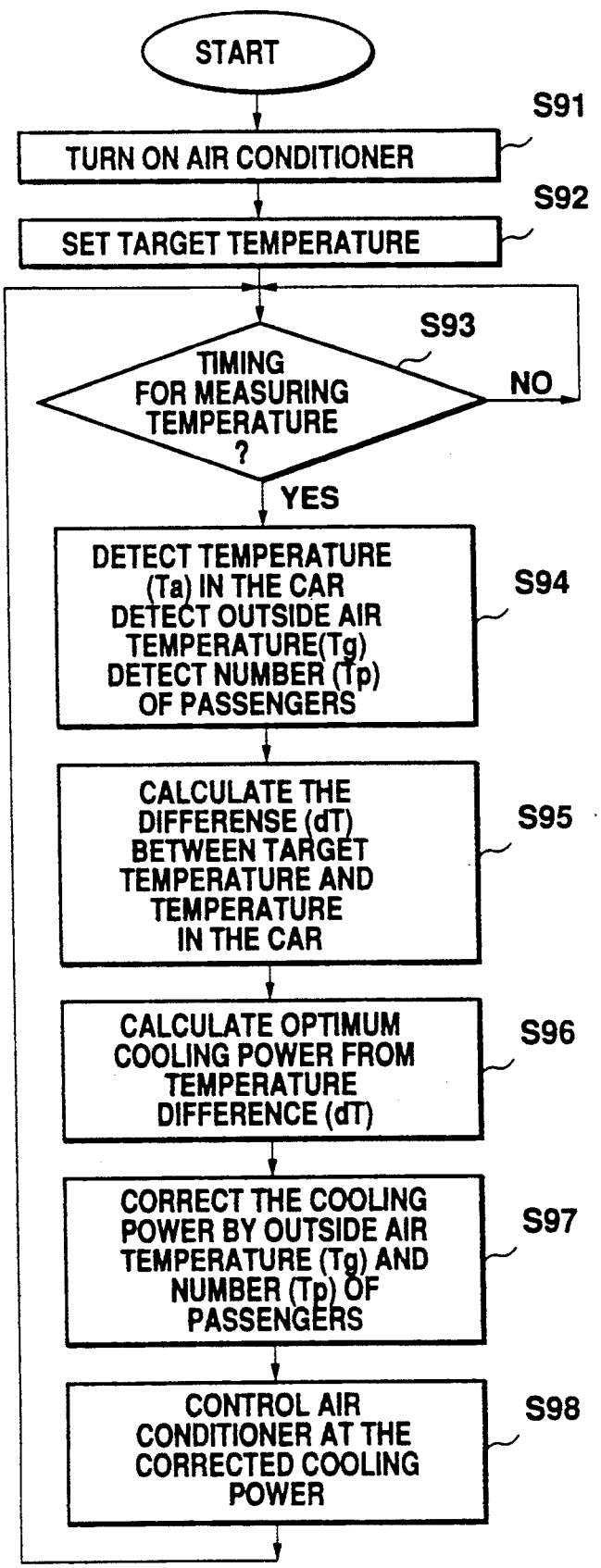
FIG. 34 is a flowchart of a still further example of the controlling operation of an air conditioner for railway vehicles according to the present invention.

A ninth embodiment of the present invention will be explained with reference to FIGS. 32 to 34. FIG. 32 schematically shows a train car, FIG. 33 is a circuit diagram of the ninth embodiment and FIG. 34 is a flowchart of the controlling operation of the ninth embodiment. FIG. 32 schematically shows the structure of a train car and the flow of data. In FIG. 32, the cooling power correcting value data detector 100 shown in FIG. 21 is shown as an outside air temperature detector 13 and a passenger number detector 14. The reference numeral 4 denotes a control unit of the air conditioner provided with a heating/cooling power determining means including a heating/cooling power correcting means. The outside air temperature and the number of passengers detected by the outside air temperature detector 13 and the passenger number detector 14, respectively, are supplied to the control unit 4.

FIG. 33 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating-/cooling power correcting means 423. The operation program of the heating/cooling power correcting means is stored in the memory 43 and calculated by the CPU 42. The output of the control switch portion 5 provided in a train operator's compartment, the output of the temperature detector 6, the output of the outside air temperature detector 13 and the output of the passenger number detector 14 are input to the input circuit 41. An inverter 3 controls the power of the compressor in accordance with the output of the output circuit 44.

The operation of the air conditioner will now be explained with reference to the flowchart in FIG. 34. At step S91, the air conditioner of the train is first turned ON by a train operator or the like, and the target temperature is set at step S92. At step S93, the timing for measuring the temperature is waited, and the air temperature Ta in the car, the outside air temperature Tg and the number Tp of passengers are detected at step S94. At step S95, the temperature difference dT between the target temperature and the air temperature in the car is obtained.

The correction value for the heating/cooling power is inferred from the temperature difference dT between the target temperature and the air temperature in the car in accordance with a fuzzy rule so that the temperature of the air in the car is equal to the target temperature, and the optimum cooling power is calculated at step 96. The next step 97 is a routine showing the heating/cooling power correcting means. The load in the heating-/cooling system is obtained from the detected temperature Tg of the outside air and number Tp of passengers in accordance with a fuzzy rule in such a manner that the load is "large" when the temperature of the outside air is high and the number of passengers is large, that the load is "small" when the temperature of the outside air is low and the number of passengers is small, and that the load is "medium" when the temperature of the outside air is high and the number of passengers is small. When the output of the optimum heating/cooling power calculator indicates that the cooling power is increased due to the load in the heating/cooling system, the cooling power is corrected so as to be increased to a slightly larger value than the calculated value if the load is large and to be increased to a slightly smaller value than the calculated value if the load is small. On the other hand, when the output of the optimum heating/cooling power calculator indicates that the cooling power is reduced, the cooling power is corrected so as to be reduced to a slightly larger value than the calculated value if the load is large and to be reduced to a slightly smaller value than the calculated value if the load is small. At step S98, the cooling operation is continued at the newly corrected cooling power.

Tenth Embodiment

Figure 35:
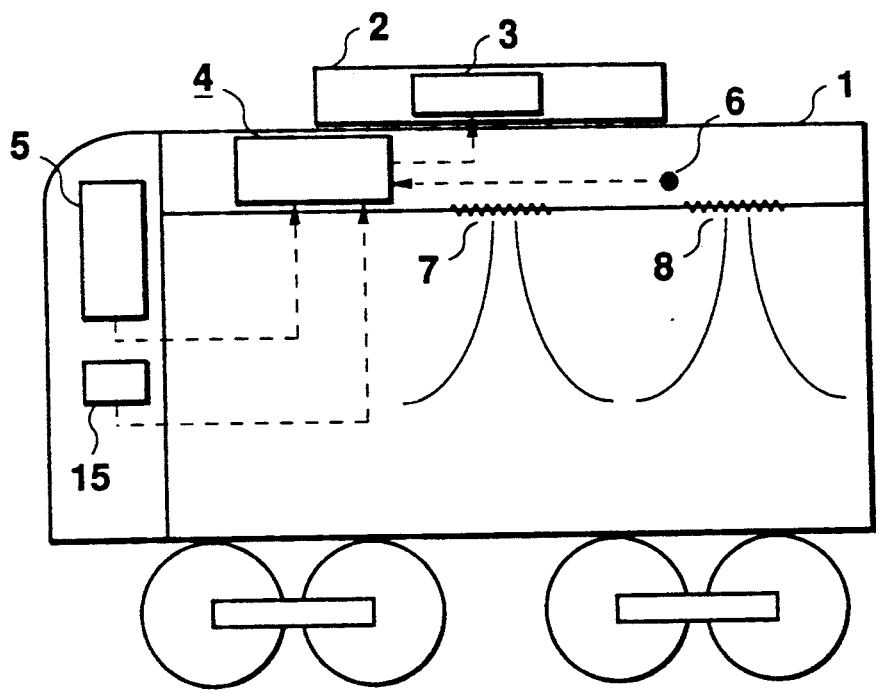
FIG. 35 schematically shows a still further embodiment of an air conditioner for railway vehicles according to the present invention.
Figure 36:
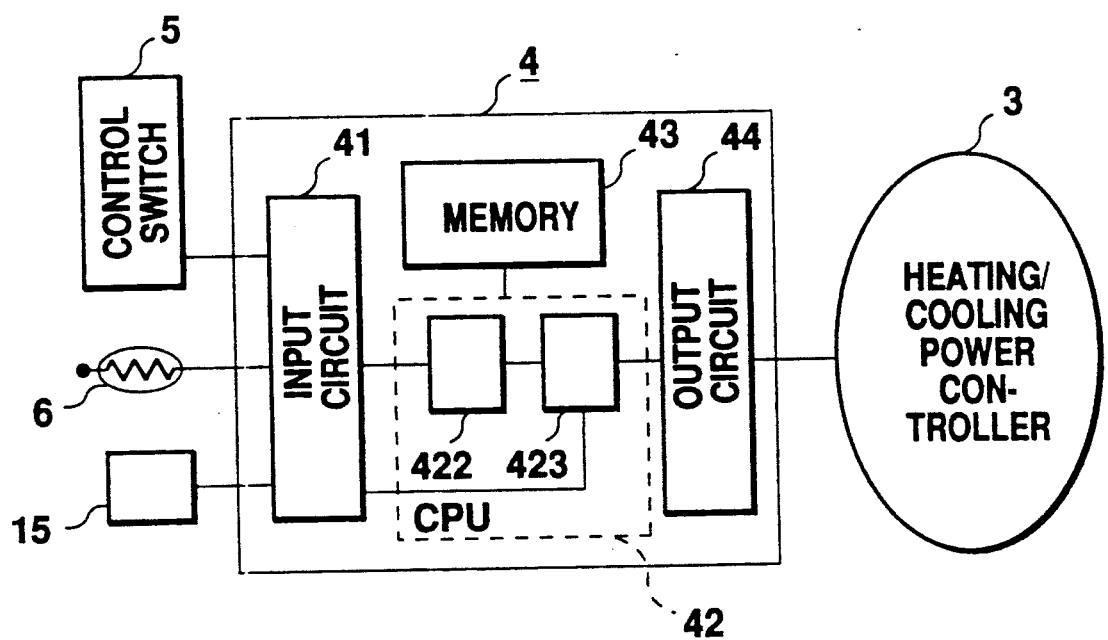
FIG. 36 is a block diagram of a still further example of control unit of an air conditioner for railway vehicles according to the present invention.
Figure 37:
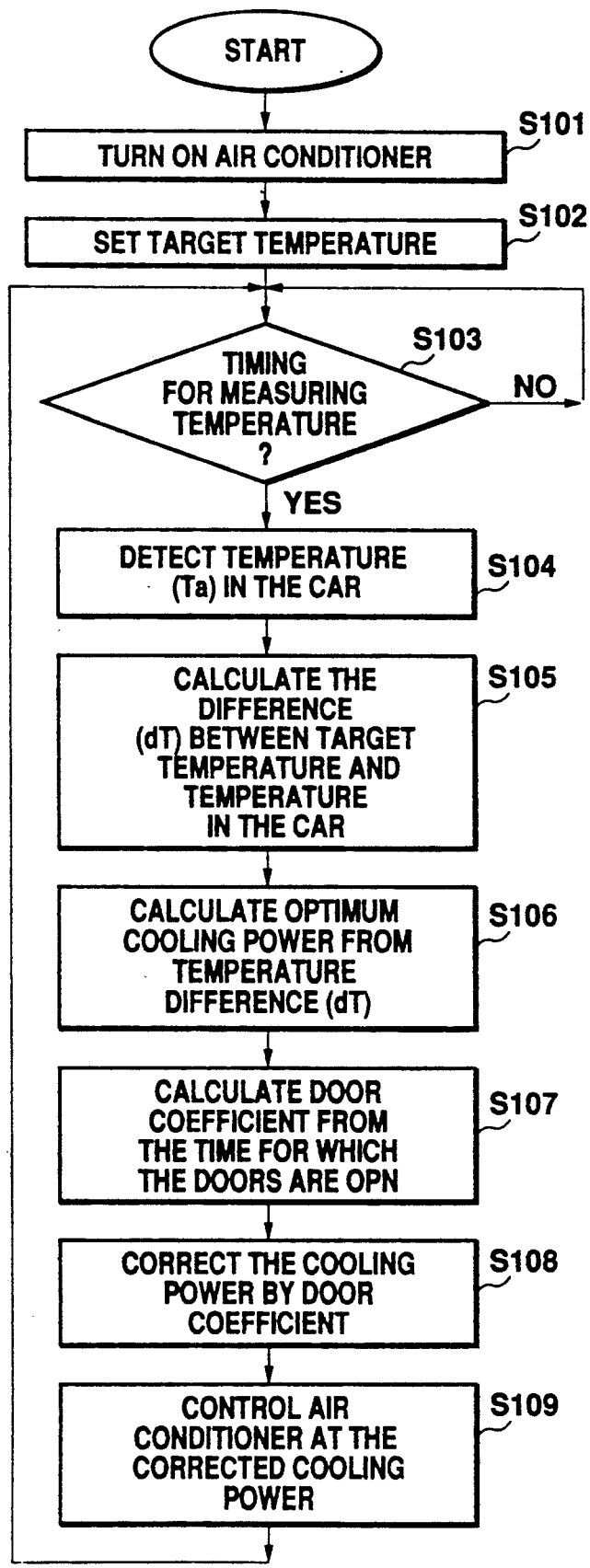
FIG. 37 is a flowchart of a still further example of the controlling operation of an air conditioner for railway vehicles according to the present invention.
Figure 38:
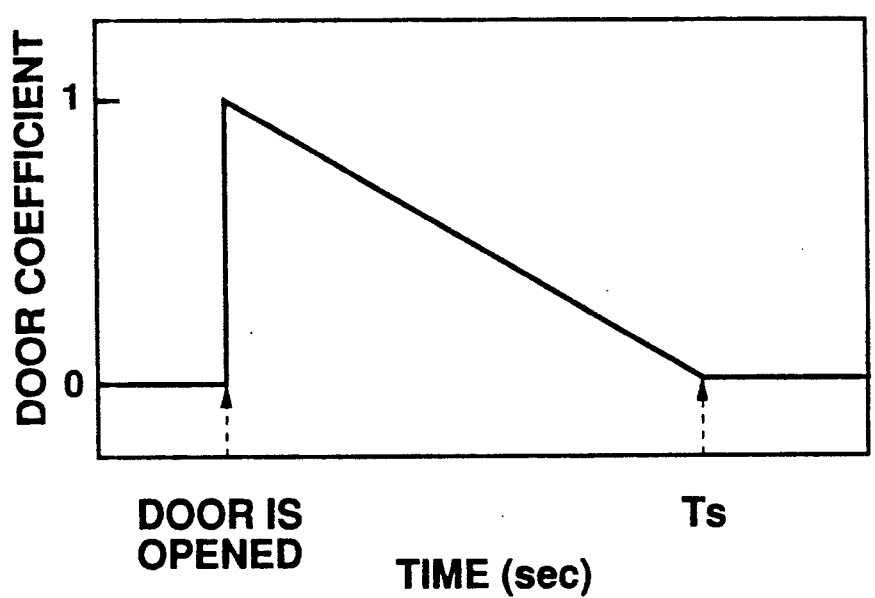
FIG. 38 shows the concept of a door coefficient.
Figure 39:
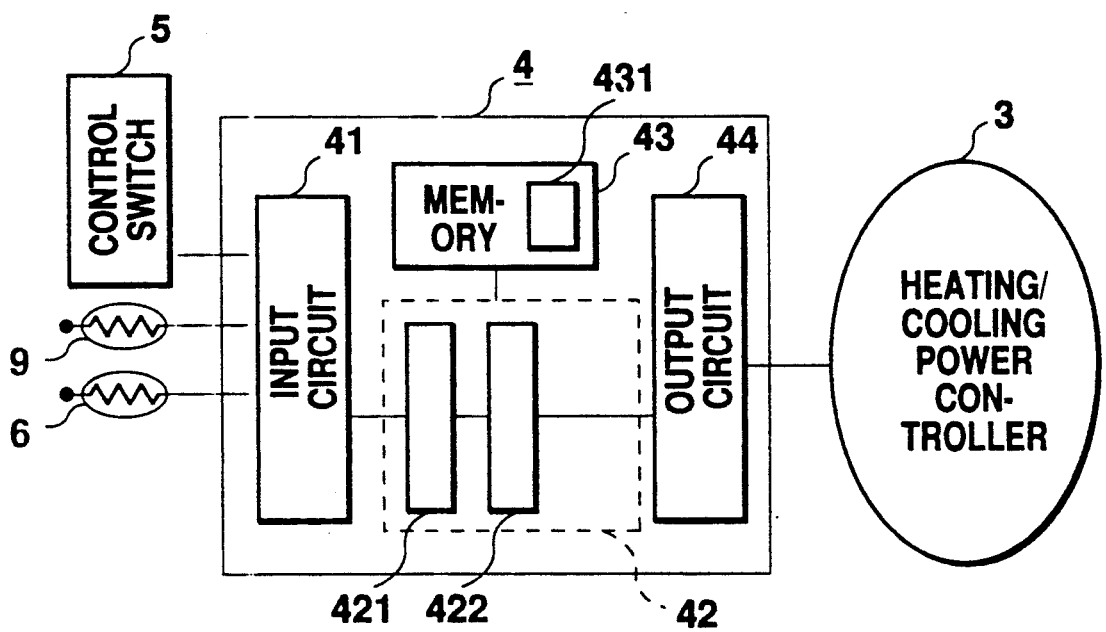
FIG. 39 shows the concept of the controlling operation of the embodiment shown in FIG. 35.

A tenth embodiment of the present invention will be explained with reference to FIGS. 35 to 38. FIG. 35 schematically shows a train car, FIG. 36 is a circuit diagram of the tenth embodiment, FIG. 37 is a flowchart of the controlling operation of the tenth embodiment, FIG. 38 shows the concept of a door coefficient and FIG. 39 shows the concept of the controlling operation of the tenth embodiment. FIG. 35 schematically shows the structure of a train car and the flow of data. In FIG. 35, the reference numeral 5 represents a control switch portion by which a train operator turns ON/OFF the air conditioner, 15 a door switch portion for opening and closing the doors, and 4 a control unit for controlling the air conditioner including a heating/cooling power correcting means. The data on ON/OFF of the air conditioner and the opening of the doors are supplied to the control unit 4.

FIG. 36 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating/cooling power correcting means 423. The operation program of the heating/cooling power correcting means is stored in the memory 43 and calculated by the CPU 42. The output of the control switch portion 5 provided in a train operator's compartment and the output of a temperature detector 6 are input to the input circuit 41. A heating/cooling power controller 3 controls the power of the compressor in accordance with the output of the output circuit 44.

The operation of the air conditioner will now be explained with reference to the flowchart in FIG. 37. At step S101, the air conditioner of the train is first turned ON by a train operator or the like, and the target temperature is set at step S102. At step S103, the timing for measuring the temperature is waited, and the temperature Ta of the air in the car, the temperature Tg of the outside air and the number Tp of passengers are detected at step S104. At step S105, the temperature difference dT between the target temperature and the air temperature in the car is obtained.

The correction value for the heating/cooling power is inferred from the temperature difference dT between the target temperature and the temperature of the air in the car in accordance with a fuzzy rule so that the temperature of the air in the car is equal to the target temperature, and the optimum cooling power is calculated at step 106. The next step 107 is a routine showing the heating/cooling power correcting means. A door coefficient is obtained from the time elapsed from the opening operation of the doors in accordance with the concept of a door coefficient shown in FIG. 38. The correction value is multiplied by the door coefficient so as to obtain a new correction value. In this case, however, if a predetermined time (Ts) has elapsed from the opening operation of the doors, the door coefficient is set at "1" and the correction value is not changed. At step S108, the cooling power is corrected by the newly-obtained correction value, and at step 109 the cooling operation is continued at the newly corrected cooling power.

In the above-described first to tenth embodiments, the air conditioner is controlled by proportional control which is carried out by calculating the required cooling power from the temperature difference between the current air temperature in the car and the target temperature. It is also possible to control the air conditioner in any of the first to tenth embodiments by PID control shown in Japanese Utility Model Laid-Open No. Hei 2-41037. That is, the air conditioner controlled on the basis of the temperature difference between the current air temperature in the car and the target temperature and the data on how long this temperature difference has lasted.

Embodiments controlled by PID control will be explained in the following.

Eleventh Embodiment

Figure 40:
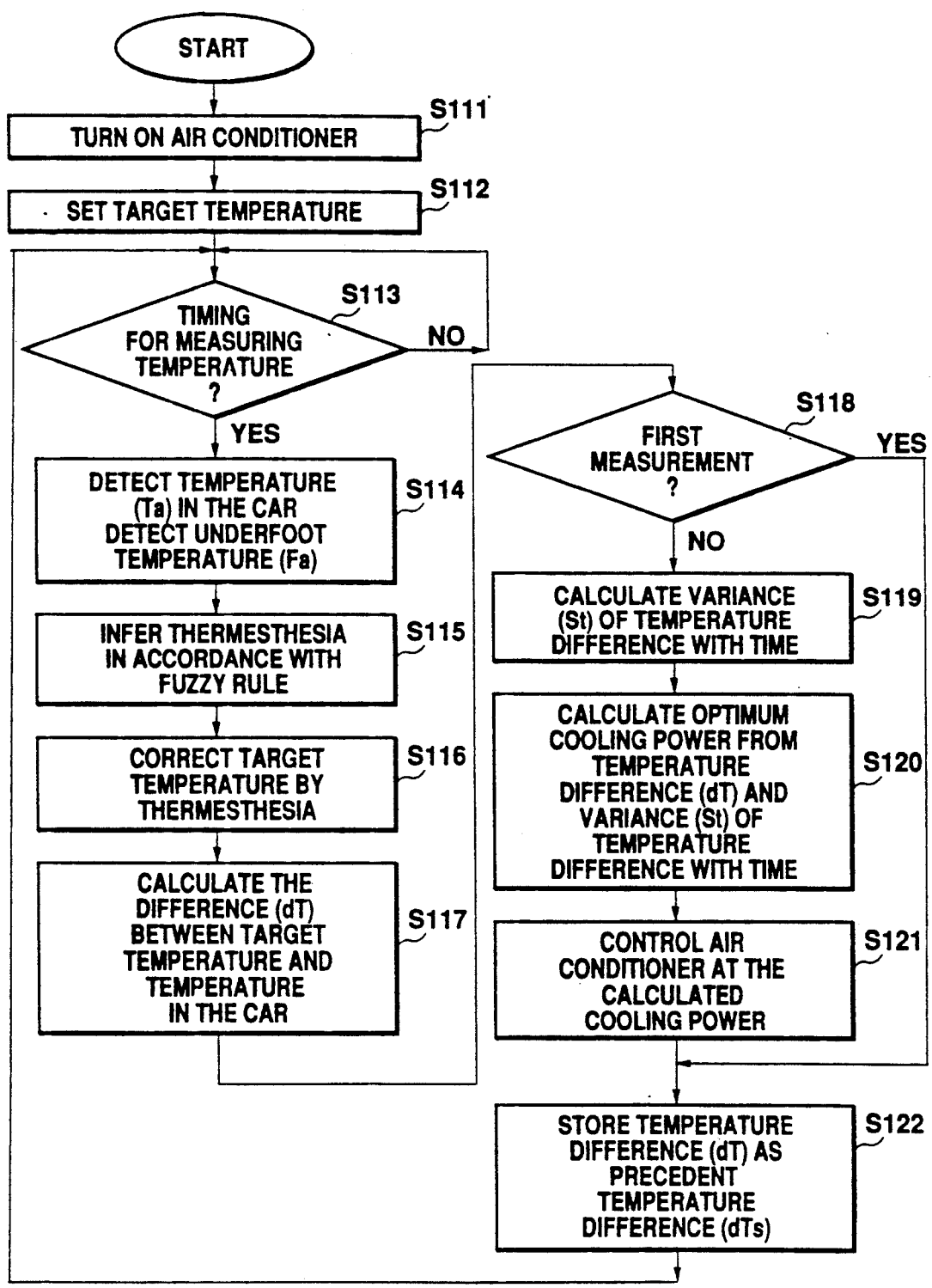
FIG. 40 is a flowchart of a still further example of the controlling operation of an air conditioner for railway vehicles according to the present invention.

An eleventh embodiment of the present invention will be explained with reference to FIG. 1 schematically showing a train car, a circuit diagram in FIG. 39 and a flowchart in FIG. 40. FIG. 1 schematically shows the structure of a train car and the flow of data. In FIG. 1, the reference numeral 5 represents a control switch portion by which a train operator turns ON/OFF the air conditioner and sets the target temperature in the car, 4 a control unit for controlling the air conditioner including a heating/cooling power correcting means, 6 a temperature detector for detecting the temperature of the air in the car, and 9 an underfoot temperature detector provided in the vicinity of the floor of the car so as to detect the temperature in the vicinity of the feet of the passengers there. The data on ON/OFF of the air conditioner and the target temperature which has been set by the control switch portion 5, the output of the temperature detector 6, the output of the underfoot temperature detector 9, etc. are supplied to the control unit 4.

FIG. 39 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6 and the output of the underfoot temperature detector 9 are input to the input circuit 41. A heating/cooling power controller 3 controls the power of the compressor in accordance with the output of the output circuit 44.

The operation of the air conditioner will be explained with reference to the flowchart in FIG. 39. At step S111, the air conditioner of the train is first turned ON by a train operator or the like, and the target temperature is set at step S112. At step S113, the timing for measuring the temperature is waited, and the temperature Ta of the air in the car and the underfoot temperature Fa are detected at step S114. At step S115, the thermesthesia of the passengers is inferred from the vertical temperature difference fdT between the temperature Ta of the air in the car and the underfoot temperature Fa. For example, when the vertical temperature difference is large, it is inferred that the passengers feel cold, while when the vertical temperature difference is small, it is inferred that the passengers feel hot. The target temperature is corrected from the result of the inference of the thermesthesia at step S116. The correction value for the target temperature is calculated so that the target temperature is lowered when the result of the inference of the thermesthesia is "hot", while the target temperature is raised when the result is "cold", and the target temperature is not changed when the result is "medium". At step S117, the temperature difference dT between the temperature of the air in the car and the newly calculated target temperature. At step S118, judgement is made as to whether or not the current measurement is a first measurement. If this is a first measurement, this temperature difference is stored in the memory 43 as a precedent temperature difference dTs at step 122. On the other hand, if this is judged to be a second or later measurement at step S118, the variance St of temperature difference with time, which is the difference between the precedent temperature difference dTs and the current temperature difference dT, is obtained at step S119. From the variance of temperature difference with time, whether the temperature in the car is stable or it has changed in a short time is grasped and the correction value for the cooling power is obtained. The current cooling power is corrected by the thus-obtained correction value at step S120. At step S121, the cooling operation is continued at the newly calculated cooling power.

In this way, the thermesthesia of the passengers is inferred from the temperature difference between in the upper portion and the lower portion of the car, and the correction value for the target temperature is calculated so that the target temperature is lowered when the result of the inference shows that the passenger feel hot while the target temperature is raised when the result of the inference shows that the passenger feel cold. Since the cooling operation is carried out while correcting the target temperature, it is possible to constantly provide a comfortable environment for the passengers.

Twelfth Embodiment

Figure 41:
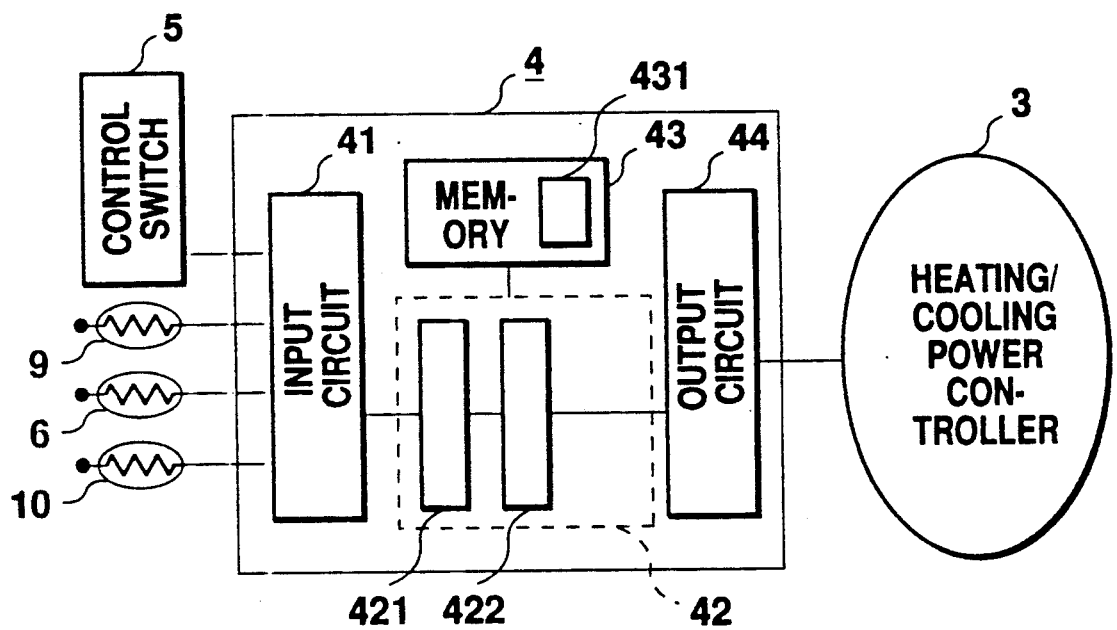
FIG. 41 is a block diagram of a still further example of control unit of an air conditioner for railway vehicles according to the present invention.
Figure 42:
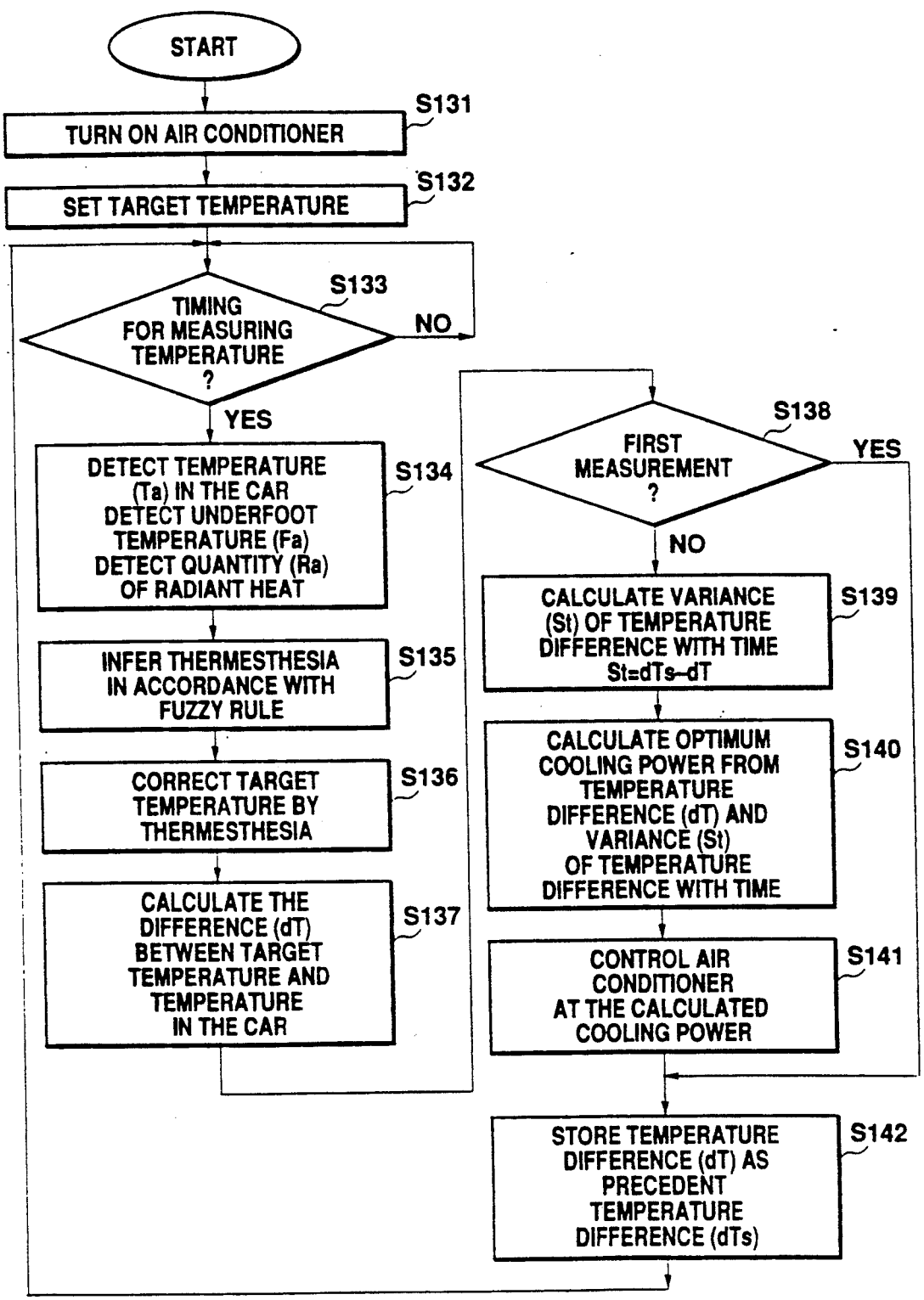
FIG. 42 is a flowchart of a still further example of the controlling operation of an air conditioner for railway vehicles according to the present invention.

A twelfth embodiment of the present invention will be explained with reference to FIG. 4 schematically showing a train car, a circuit diagram in FIG. 41, a flowchart in FIG. 42, FIG. 7 showing the concept of a fuzzy rule for inferring the thermesthesia of the passengers, and FIG. 8 showing the concept of the range of correction value.

FIG. 4 schematically shows the structure of a train car and the flow of data. In FIG. 4, the reference numeral 5 represents a control switch portion by which a train operator turns ON/OFF the air conditioner and sets the target temperature in the car, 4 a control unit for controlling the air conditioner including a heating-/cooling power correcting means, 6 a temperature detector for detecting the air temperature in the car, 9 an underfoot temperature detector provided in the vicinity of the floor of the car so as to detect the temperature in the vicinity of the feet of the passengers there and 10 a radiant heat quantity detector for detecting the quantity of radiant heat generated by solar radiation or the like. The data on ON/OFF of the air conditioner and the target temperature which has been set by the control switch portion 5, the output of the temperature detector 6, the output of the underfoot temperature detector 9, the output of the radiant heat quantity detector 10, etc. are supplied to the control unit 4.

FIG. 41 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6, the output of the underfoot temperature detector 9 and the output of the radiant heat quantity detector 10 are input to the input circuit 41. A heating/cooling power controller 3 controls the power of the compressor in accordance with the output of the output circuit 44.

The operation of the air conditioner will be explained with reference to the flowchart in FIG. 42. At step S131, the air conditioner of the train is first turned ON by a train operator or the like, and the target temperature is set at step S132. At step S133, the timing for measuring the temperature is waited, and the air temperature Ta in the car, the underfoot temperature Fa and the quantity Ra of radiant heat are detected at step S134. At step S135, the thermesthesia of the passengers is inferred from the vertical temperature difference fdT between the temperature Ta of the air in the car and the underfoot temperature Fa and the quantity Ra of radiant heat in accordance with a fuzzy rule such as that shown in FIG. 7. According to the fuzzy rule shown in FIG. 7, for example, when the vertical temperature difference is large and the quantity of radiant heat is small, it is inferred that the passengers feel cold, while when the vertical temperature difference is small and the quantity of radiant heat is large, it is inferred that the passengers feel hot. If the vertical temperature difference is intermediate between "large" and "medium" or "medium" and "small" or the quantity of radiant heat is intermediate between "small" and "medium" or "medium" and "large", the thermesthesia of the passengers is inferred to be "slightly hot" or "slightly cold". The target temperature is corrected from the result of the inference of the thermesthesia at step S136. The correction value for the target temperature is calculated so that the target temperature is lowered when the result of the inference of the thermesthesia is "hot", while the target temperature is raised when the result is "cold", and the target temperature is not changed when the result is "medium", as shown in FIG. 8. At step S138, judgement is made as to whether or not the current measurement is a first measurement. If this is a first measurement, this temperature difference is stored in the memory 43 as a precedent temperature difference dTs at step 142. On the other hand, if this is judged to be a second or later measurement at step S138, the variance St of temperature difference with time, which is the difference between the precedent temperature difference dTs and the current temperature difference dT, is obtained at step S139. From the variance of temperature difference with time, whether the temperature in the car is stable or it has changed in a short time is grasped and the correction value for the cooling power is obtained. The current cooling power is corrected by the thus-obtained correction value at step S140. At step S141, the cooling operation is continued at the newly calculated cooling power. The newly calculated temperature difference is stored in the memory 431 as a precedent temperature difference dTs at step 142.

In this way, the thermesthesia of the passengers is inferred from the temperature difference between in the upper portion and the lower portion of the car and the quantity of radiant heat, and the correction value for the target temperature is calculated so that the target temperature is lowered when the result of the inference shows that the passenger feel hot while the target temperature is raised when the result of the inference shows that the passenger feel cold. Since the cooling operation is carried out while correcting the target temperature, it is possible to constantly provide a comfortable environment for the passengers.

Thirteenth Embodiment

Figure 43:
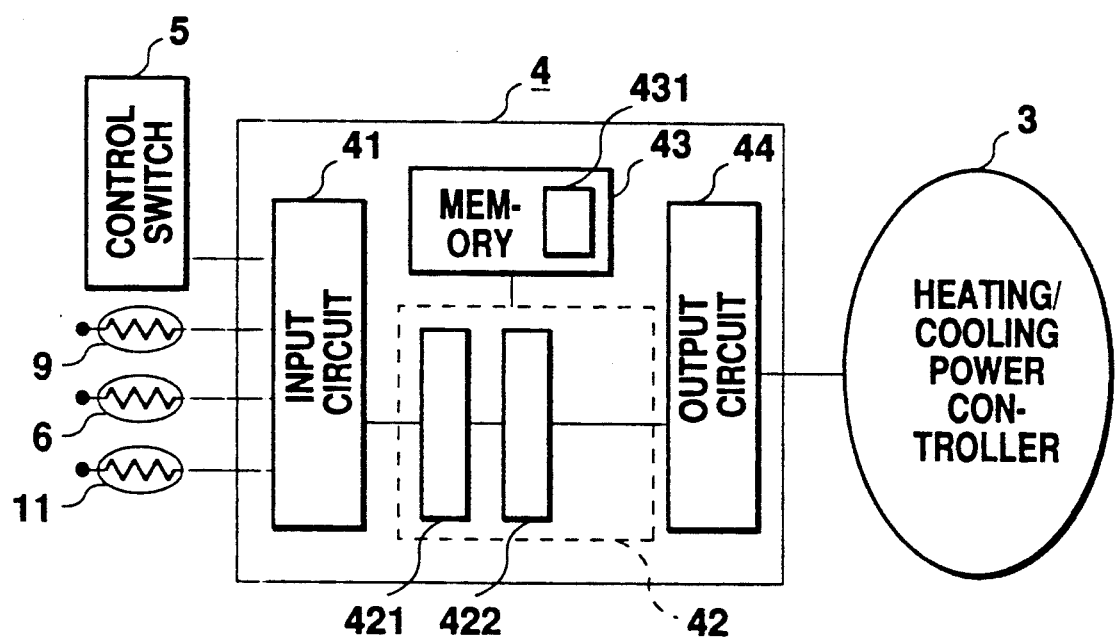
FIG. 43 is a block diagram of a still further example of control unit of an air conditioner for railway vehicles according to the present invention.
Figure 44:
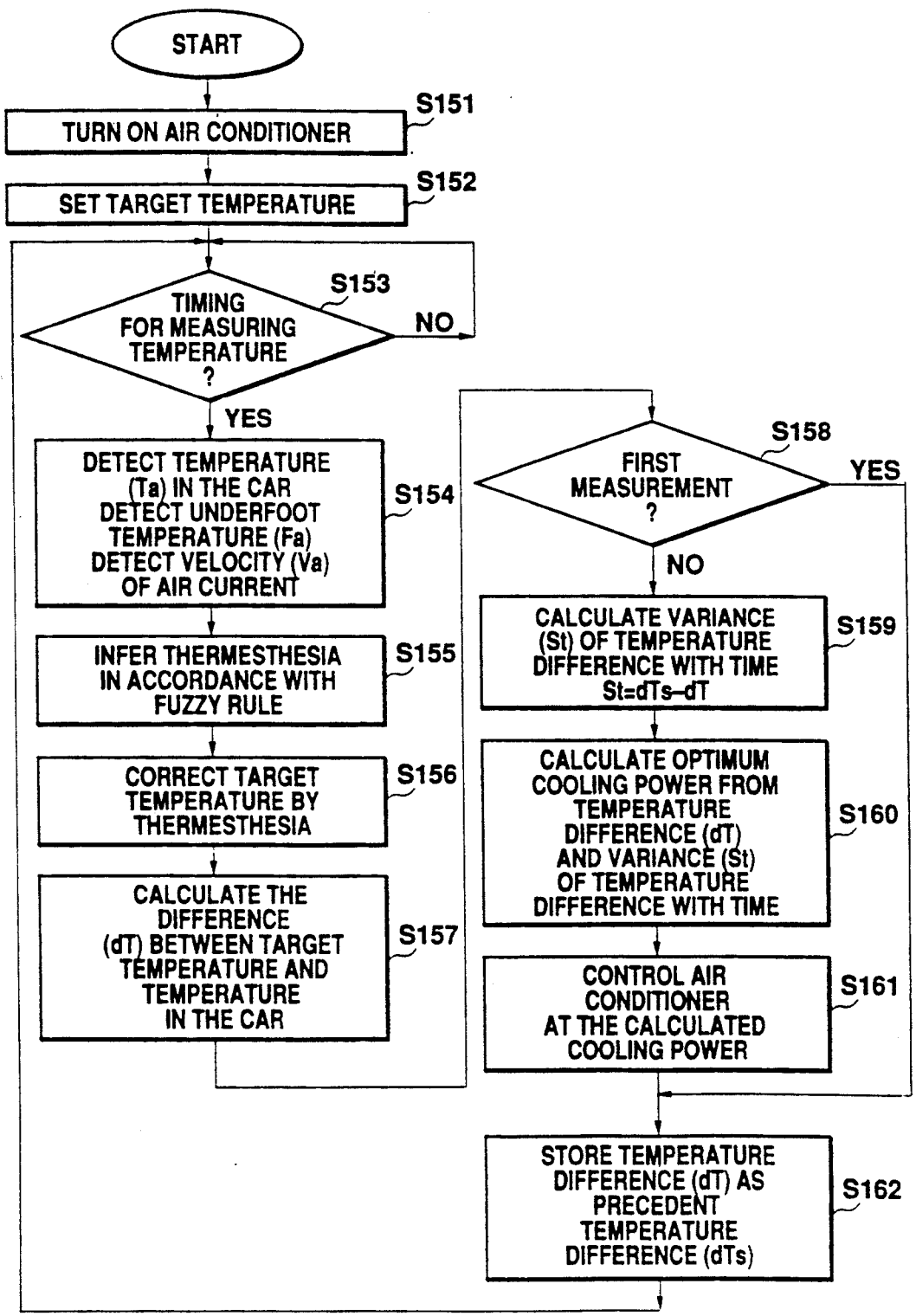
FIG. 44 is a flowchart of a still further example of the controlling operation of an air conditioner for railway vehicles according to the present invention.

A thirteenth embodiment of the present invention will be explained with reference to FIG. 9 schematically showing a train car, a circuit diagram in FIG. 43, a flowchart in FIG. 44, FIG. 12 showing the concept of a fuzzy rule for inferring the thermesthesia of the passengers, and FIG. 13 showing the concept of the range of correction value.

FIG. 9 schematically shows the structure of a train car and the flow of data. In FIG. 9, the reference numeral 5 represents a control switch portion by which a train operator turns ON/OFF the air conditioner and sets the target temperature in the car, 4 a control unit for controlling the air conditioner including a heating-/cooling power correcting means, 6 a temperature detector for detecting the air temperature in the car, 9 an underfoot temperature detector provided in the vicinity of the floor of the car so as to detect the temperature in the vicinity of the feet of the passengers there and 11 an anemometer for detecting the velocity of the air current in the car. The data on ON/OFF of the air conditioner and the target temperature which has been set by the control switch portion 5, the output of the temperature detector 6, the output of the underfoot temperature detector 9, the output of the anemometer 11, etc. are supplied to the control unit 4.

FIG. 43 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6, the output of the underfoot temperature detector 9 and the output of the anemometer 11 are input to the input circuit 41. A heating-/cooling power controller 3 controls the power of the compressor in accordance with the output of the output circuit 44.

The operation of the air conditioner will be explained with reference to the flowchart in FIG. 44. At step S151, the air conditioner of the train is first turned ON by a train operator or the like, and the target temperature is set at step S152. At step S153, the timing for measuring the temperature is waited, and the temperature Ta of the air in the car, the underfoot temperature Fa and the velocity Va of the air current are detected at step S154. At step S155, the thermesthesia of the passengers is inferred from the vertical temperature difference fdT between the air temperature Ta in the car and the underfoot temperature Fa and the velocity Va in accordance with a fuzzy rule such as that shown in FIG. 12. According to the fuzzy rule shown in FIG. 12, for example, when the vertical temperature difference is large and velocity of the air current is high, it is inferred that the passengers feel cold, while when the vertical temperature difference is small and the velocity of the air current is low, it is inferred that the passengers feel hot. From the vertical temperature difference and the velocity of the air current intermediate between "large" and "medium" or "medium" and "small" or intermediate between "high" and "medium" or "medium" and "low", the level of the thermesthesia of the passengers is also inferred. From the result of the inference of the thermesthesia, the correction value for the target temperature is calculated in accordance with the level of the thermesthesia, as shown in FIG. 13. For example, the target temperature is lowered when the result of the inference is "hot", the target temperature is raised when the result of the inference is "cold" and the target temperature is not changed when the result of the inference is "medium". At step S156, the target temperature is corrected by the calculated correction value. At step S158, judgement is made as to whether or not the current measurement is a first measurement. If this is a first measurement, this temperature difference is stored in the memory 43 as a precedent temperature difference dTs at step 162. On the other hand, if this is judged to be a second or later measurement at step S158, the variance St of temperature difference with time, which is the difference between the precedent temperature difference dTs and the current temperature difference dT, is obtained at step S159. From the variance of temperature difference with time, whether the temperature in the car is stable or it has changed in a short time is grasped and the correction value for the cooling power is obtained. The current cooling power is corrected by the thus-obtained correction value at step S160. At step S161, the cooling operation is continued at the newly calculated cooling power.

In this way, the thermesthesia of the passengers is inferred from the temperature difference between in the upper portion and the lower portion of the car and the velocity of the air current in the car, and the correction value for the target temperature is calculated so that the target temperature is lowered when the result of the inference shows that the passenger feel hot while the target temperature is raised when the result of the inference shows that the passenger feel cold. Since the cooling operation is carried out while correcting the target temperature, it is possible to constantly provide a comfortable environment for the passengers.

Fourteenth Embodiment

Figure 45:
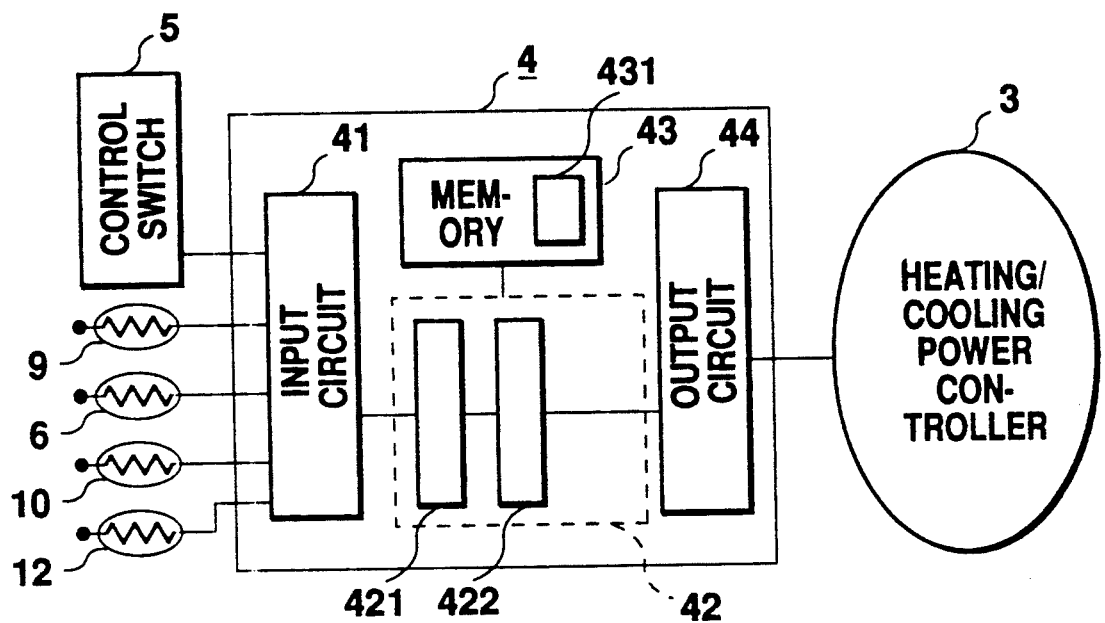
FIG. 45 is a block diagram of a still further example of control unit of an air conditioner for railway vehicles according to the present invention.
Figure 46:
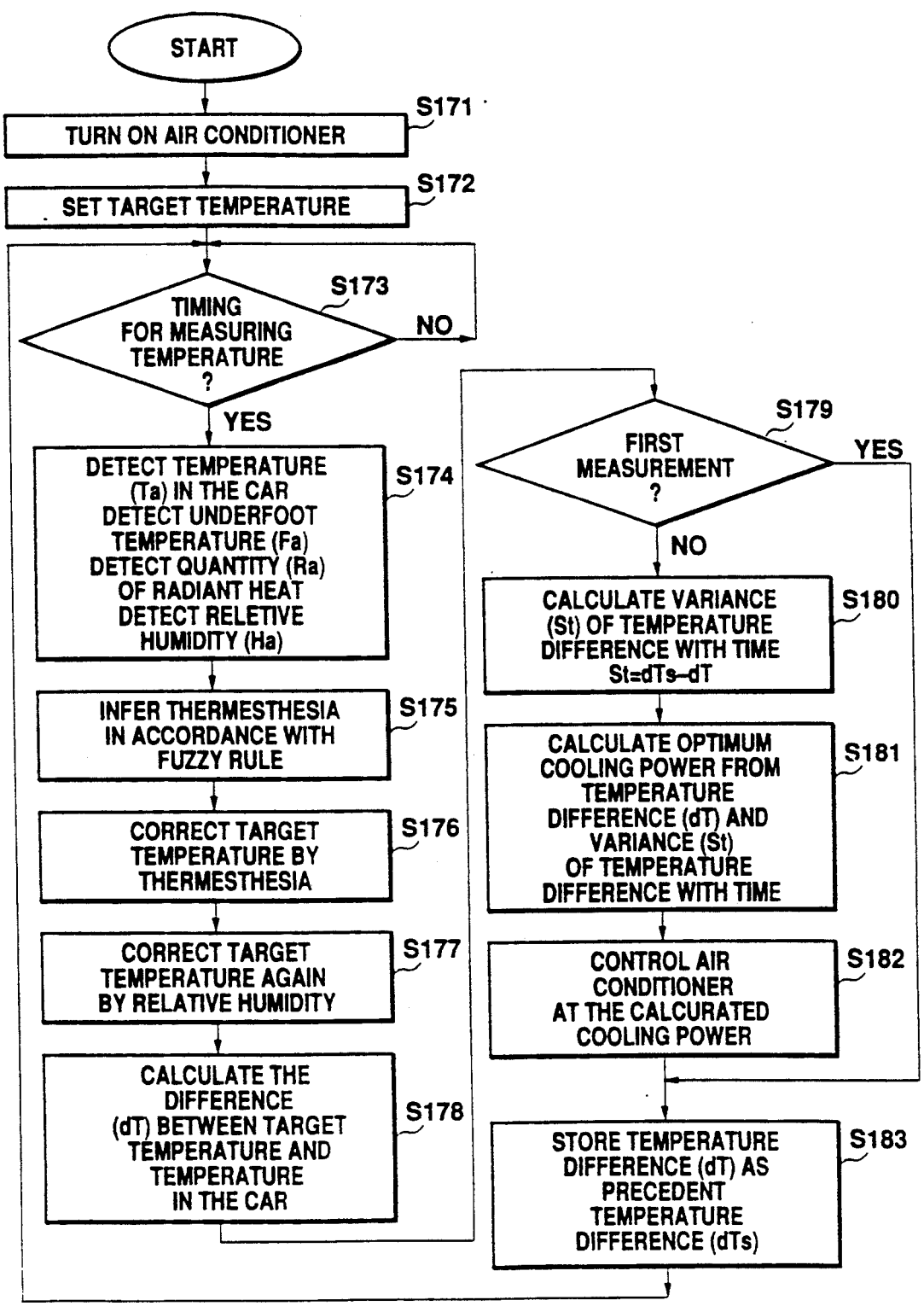
FIG. 46 is a flowchart of a still further example of the controlling operation of an air conditioner for railway vehicles according to the present invention.

A fourteenth embodiment of the present invention will be explained with reference to FIG. 14 schematically showing a train car, a circuit diagram in FIG. 45, a flowchart in FIG. 46, and FIG. 17 showing the concept of the correction of a target temperature in accordance with a humidity.

FIG. 14 schematically shows the structure of a train car and the flow of data. In FIG. 14, the reference numeral 5 represents a control switch portion by which a train operator turns ON/OFF the air conditioner and sets the target temperature in the car, 4 a control unit for controlling the air conditioner including a target temperature correcting means for correcting the target temperature in accordance with a humidity, 6 a temperature detector for detecting the temperature of the air in the car, 9 an underfoot temperature detector provided in the vicinity of the floor of the car so as to detect the temperature in the vicinity of the feet of the passengers there, 10 a radiant heat quantity detector for detecting the quantity of radiant heat generated by solar radiation or the like, and 12 a hygrometer for detecting the relative humidity. The data on ON/OFF of the air conditioner and the target temperature which has been set by the control switch portion 5, the output of the temperature detector 6, the output of the underfoot temperature detector 9, the output of the radiant heat quantity detector 10, the output of the hygrometer 12, etc. are supplied to the control unit 4.

FIG. 45 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The memory 43 has a region 431 for storing a precedently calculated temperature difference between the target temperature and the temperature of the air in the car. The operation program of the target temperature correcting means is stored in the memory 43 and calculated by the CPU 42. The output of the control switch portion 5 provided in a train operator's compartment, the output of the temperature detector 6, the output of the underfoot temperature detector 9, the output of the radiant heat quantity detector 10 and the output of the hygrometer 12 are input to the input circuit 41. A heating/cooling power controller 3 controls the power of the compressor in accordance with the output of the output circuit 44.

The operation of the air conditioner will be explained with reference to the flowchart in FIG. 46. At step S171, the air conditioner of the train is first turned ON by a train operator or the like, and the target temperature is set at step S172. At step S173, the timing for measuring the temperature is waited, and the temperature Ta of the air in the car, the underfoot temperature Fa and the quantity Ra of radiant heat and the relative humidity Ha are detected at step S174. At step S175, the thermesthesia of the passengers is inferred from the vertical temperature difference fdT between the temperature Ta of the air in the car, the underfoot temperature Fa and the quantity Ra of radiant heat. The target temperature is corrected from the result of the inference of the thermesthesia at step S176. At step S177, the target temperature correcting means calculates the correction value for the target temperature in accordance with the detected relative humidity so that the target temperature is lowered when the humidity is high, while the target temperature is raised when the humidity is low, as shown in FIG. 17. In this way, the target temperature which has been corrected in accordance with the result of the inference of the thermesthesia is further corrected by the correction value. At step S178, the temperature difference dT between the temperature of the air in the car and the newly calculated target temperature is calculated. At step S179, judgement is made as to whether or not the current measurement is a first measurement. If this is a first measurement, this temperature difference is stored in the memory 43 as a precedent temperature difference dTs at step 183. On the other hand, if this is judged to be a second or later measurement at step S179, the variance St of temperature difference with time, which is the difference between the precedent temperature difference dTs and the current temperature difference dT, is obtained at step S180. From the variance of temperature difference with time, whether the temperature in the car is stable or it has changed in a short time is grasped and the correction value for the cooling power is obtained. The current cooling power is corrected by the thus-obtained correction value at step S181. At step S182, the cooling operation is continued at the newly calculated cooling power. The newly calculated temperature difference is stored in the memory 431 as a precedent temperature difference dTs at step 183.

In this way, the thermesthesia of the passengers is inferred from the temperature difference between in the upper portion and the lower portion of the car and the quantity of radiant heat, and the correction value for the target temperature is calculated. The target temperature is further corrected in accordance with the relative humidity. Since the cooling operation is carried out while correcting the target temperature in correspondence with the thermesthesia of the passengers, it is possible to constantly provide a comfortable environment for the passengers.

Fifteenth Embodiment

Figure 47:
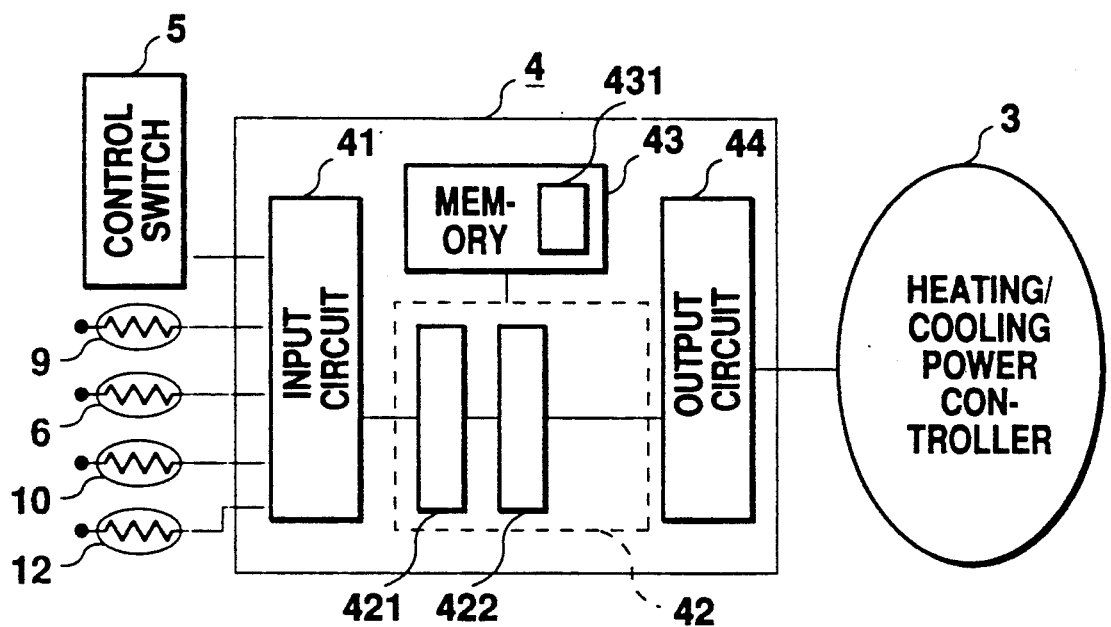
FIG. 47 is a block diagram of a still further example of control unit of an air conditioner for railway vehicles according to the present invention.
Figure 48:
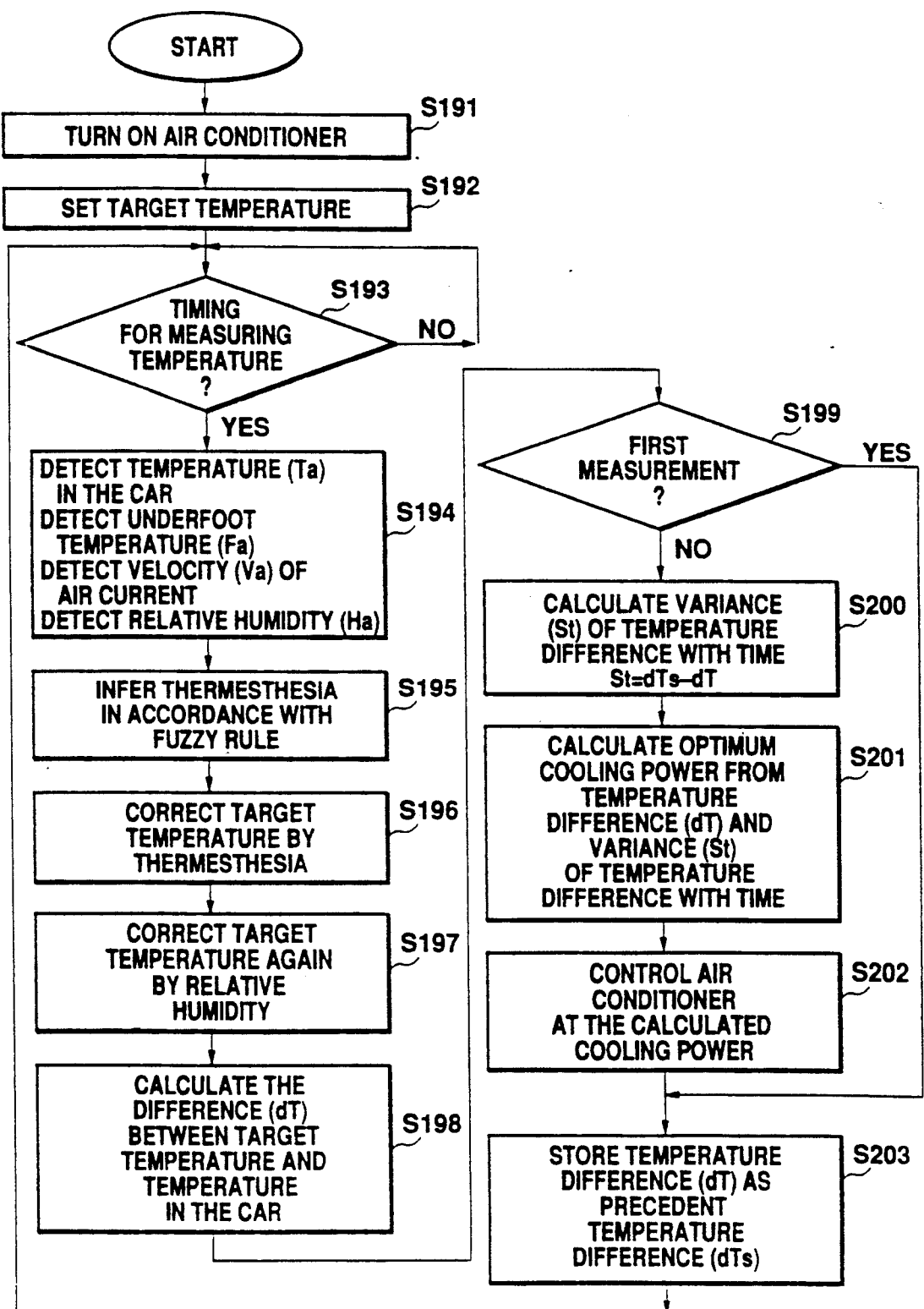
FIG. 48 is a flowchart of a still further example of the controlling operation of an air conditioner for railway vehicles according to the present invention.

A fifteenth embodiment of the present invention will be explained with reference to FIG. 18 schematically showing a train car, a circuit diagram in FIG. 47, a flowchart in FIG. 48 and FIG. 17 showing the concept of the correction of a target temperature in accordance with a humidity.

FIG. 18 schematically shows the structure of a train car and the flow of data. In FIG. 18, the reference numeral 5 represents a control switch portion by which a train operator turns ON/OFF the air conditioner and sets the target temperature in the car, 4 a control unit for controlling the air conditioner including a target temperature correcting means for correcting the target temperature in accordance with a humidity, 6 a temperature detector for detecting the air temperature in the car, 9 an underfoot temperature detector provided in the vicinity of the floor of the car so as to detect the temperature in the vicinity of the feet of the passengers there, 11 an anemometer for detecting the velocity of the air current in the car and 12 a hygrometer for detecting the relative humidity. The data on ON/OFF of the air conditioner and the target temperature which has been set by the control switch portion 5, the output of the temperature detector 6, the output of the underfoot temperature detector 9, the output of the anemometer 11, the output of the hygrometer 12, etc. are supplied to the control unit 4.

FIG. 47 is a circuit diagram of the control unit 4. The electric circuit of the control unit 4 is composed of an input circuit 41, a CPU 42, a memory 43 and an output circuit 44. The CPU 42 is provided with a target temperature correcting portion 421 and an optimum heating/cooling power calculator 422. The memory 43 has a region 431 for storing a precedently calculated temperature difference between the target temperature and the temperature of the air in the car. The operation program of the target temperature correcting means is stored in the memory 43 and calculated by the CPU 42. The output of the control switch portion 5 provided in a train operator's compartment, the output of the temperature detector 6, the output of the underfoot temperature detector 9, the output of the anemometer 11 and the output of the hygrometer 12 are input to the input circuit 41. A heating/cooling power controller 3 controls the power of the compressor in accordance with the output of the output circuit 44.

The operation of the air conditioner will be explained with reference to the flowchart in FIG. 48. At step S191, the air conditioner of the train is first turned ON by a train operator or the like, and the target temperature is set at step S192. At step S193, the timing for measuring the temperature is waited, and the temperature Ta of the air in the car, the underfoot temperature Fa, the velocity Va of the air current and the relative humidity Ha are detected at step S194. At step S195, the thermesthesia of the passengers is inferred from the vertical temperature difference fdT between the temperature Ta of the air in the car and the underfoot temperature Fa and the velocity Va of the air current. The target temperature is corrected from the result of the inference of the thermesthesia at step S196. At step S197, the target temperature correcting means calculates the correction value for the target temperature in accordance with the detected relative humidity so that the target temperature is lowered when the humidity is high, while the target temperature is raised when the humidity is low, as shown in FIG. 17. In this way, the target temperature which has been corrected in accordance with the result of the inference of the thermesthesia is further corrected by the correction value. At step S198, the temperature difference dT between the temperature of the air in the car and the newly calculated target temperature is calculated. At step S199, judgement is made as to whether or not the current measurement is a first measurement. If this is a first measurement, this temperature difference is stored in the memory 43 as a precedent temperature difference dTs at step 203. On the other hand, if this is judged to be a second or later measurement at step S199, the variance St of temperature difference with time, which is the difference between the precedent temperature difference dTs and the current temperature difference dT, is obtained at step S200.

From the variance of temperature difference with time, whether the temperature in the car is stable or it has changed in a short time is grasped and the correction value for the cooling power is obtained. The current cooling power is corrected by the thus-obtained correction value at step S201. At step S203, the cooling operation is continued at the newly calculated cooling power.

In this way, the thermesthesia of the passengers is inferred from the temperature difference between in the upper portion and the lower portion of the car and the velocity of the air current, and the correction value for the target temperature is calculated. The target temperature is further corrected in accordance with the relative humidity. Since the cooling operation is carried out while correcting the target temperature in correspondence with the thermesthesia of the passengers, it is possible to constantly provide a comfortable environment for the passengers.

Figure 49:
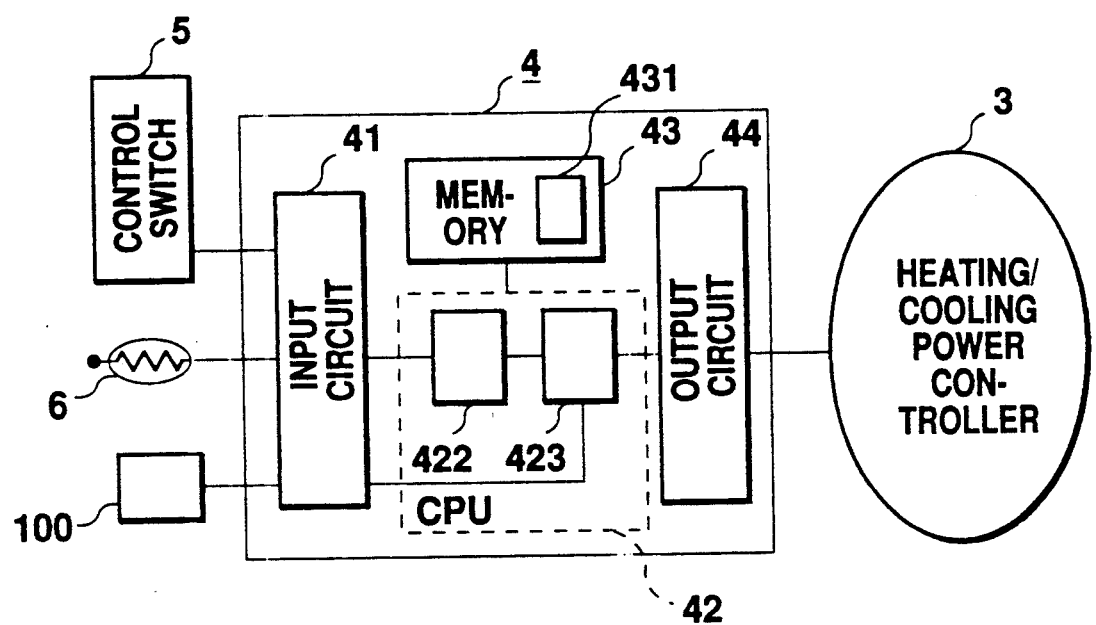
FIG. 49 is a block diagram of a still further example of control unit of an air conditioner for railway vehicles according to the present invention.

The schematic view of a train car in FIG. 21 and the circuit diagram in FIG. 49 show an example of the control of the power of an air conditioner by the use of a temperature detector 6 for detecting the temperature of the air in a car and at least one cooling power correcting value data detector 100.

FIG. 21 schematically shows the structure of a train car and the flow of data. In FIG. 21, the reference numeral 100 represents a cooling power correcting value data detector 100 provided separately from the temperature detector 6 for detecting the temperature of the air in a car, and 4 a control unit for controlling the air conditioner including a heating/cooling power correcting means. Various data detected by the cooling power correcting value data detector 100 are supplied to the control unit 4.

FIG. 49 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating/cooling power correcting means 423. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6 and the output of the cooling power correcting value data detector 100 are input to the input circuit 41. A heating/cooling power controller 3 controls the power of the compressor in accordance with the output of the output circuit 44. Concrete examples of the cooling power correcting value data detector 100 will be explained in the following embodiments.

Sixteenth Embodiment

A sixteenth embodiment of the present invention will be explained with reference to FIGS. 23 schematically showing a train car, a circuit diagram in FIG. 50, and a flowchart in FIG. 51. FIG. 23 schematically shows the structure of a train car and the flow of data. In FIG. 23, the reference numeral 10 denotes a radiant heat quantity detector for detecting the quantity of radiant heat, and 4 a control unit for controlling the air conditioner including a heating/cooling power correcting means. The quantity of radiant heat detected by the radiant heat quantity detector 10 is supplied to the control unit 4.

Figure 50:
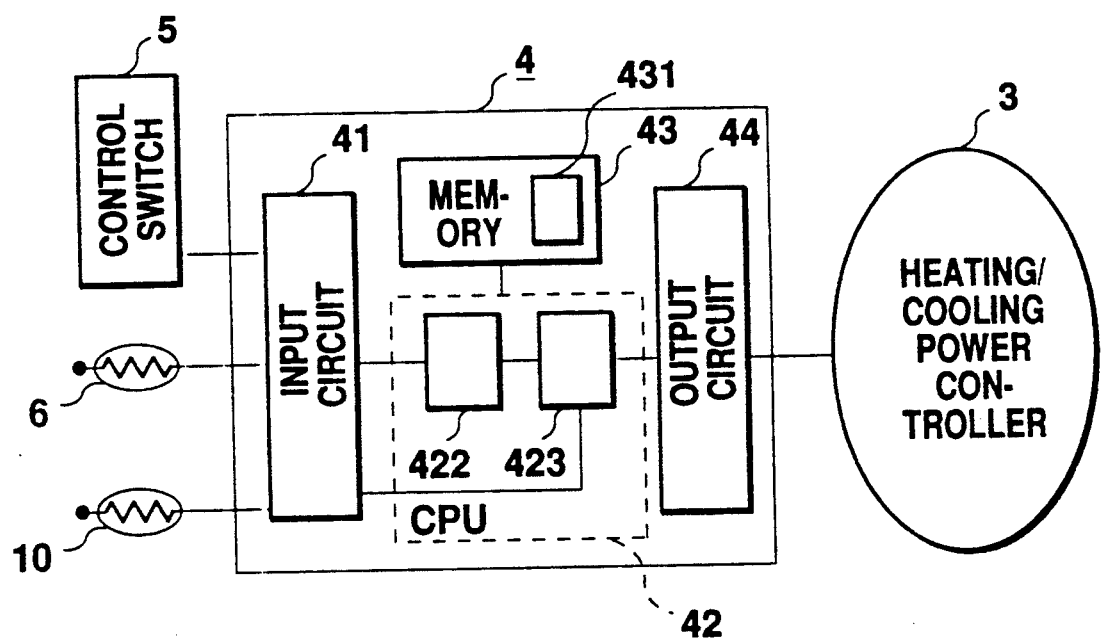
FIG. 50 is a block diagram of a still further example of control unit of an air conditioner for railway vehicles according to the present invention.
Figure 51:
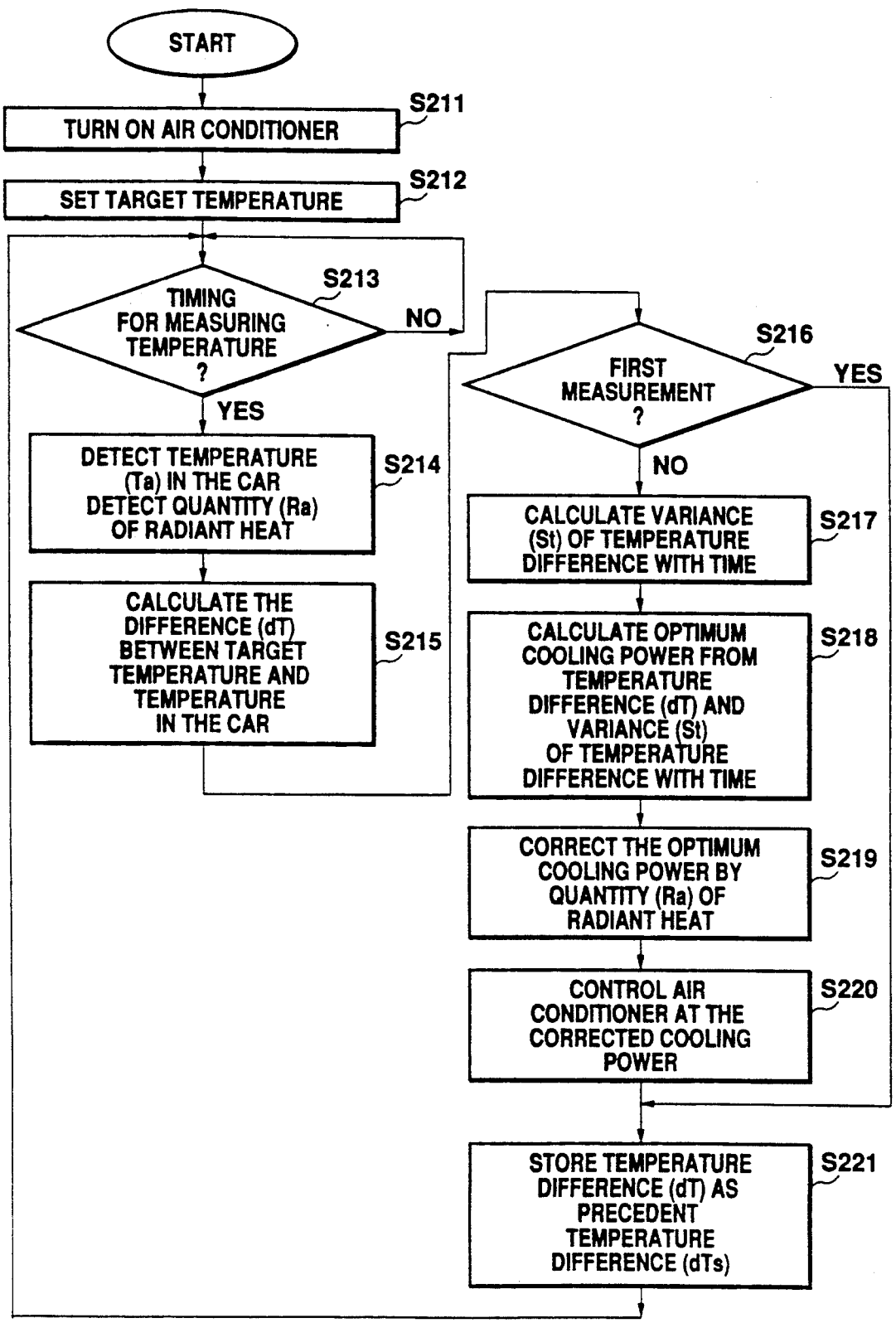
FIG. 51 is a flowchart of a still further example of the controlling operation of an air conditioner for railway vehicles according to the present invention.

FIG. 50 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating/cooling power correcting means 423. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6 and the output of the radiant heat quantity detector 10 are input to the input circuit 41. An inverter 3 controls the power of the compressor in accordance with the output of the output circuit 44.

The operation of the air conditioner will now be explained with reference to the flowchart in FIG. 51. At step S211, the air conditioner of the train is first turned ON by a train operator or the like, and the target temperature is set at step S212. At step S213, the timing for measuring the temperature is waited, and the temperature Ta of the air in the car and the quantity Ra of radiant heat are detected at step S214. At step S215, the temperature difference dT between the target temperature and the temperature Ta of the air in the car is obtained. At step S216, judgement is made as to whether or not the current measurement is a first measurement. If this is a first measurement, this temperature difference is stored in the memory 43 as a precedent temperature difference dTs at step 221. On the other hand, if this is judged to be a second or later measurement at step S216, the variance St of temperature difference with time, which is the difference between the precedent temperature difference dTs and the current temperature difference dT, is obtained at step S217. From the variance of temperature difference with time, whether the temperature in the car is stable or it has changed in a short time is grasped.

The correction value for the heating/cooling power is then inferred from the temperature difference dT between the target temperature and the variance St of temperature difference with time in accordance with a fuzzy rule so that the temperature of the air in the car is equal to the target temperature, and the optimum cooling power is calculated at step 218. For example, if the temperature in the car is lower than the target temperature and than the precedently measured temperature, it is judged that the air-cooling is excessive, and the cooling power is reduced. On the other hand, if the temperature in the car is higher than the target temperature and than the precedently measured temperature, it is judged that the air-cooling is insufficient, and the cooling power is increased. If there is no temperature difference between the temperature of the air in the car and the target temperature and there is no difference in the current temperature change and the precedent temperature change, it is judged that the temperature of the air in the car is maintained in a good state and the cooling power is maintained as it is. At the next step 219, the heating/cooling power is corrected in accordance with the detected quantity Ra of radiant heat so that when the output of the optimum heating/cooling power calculator indicates that the cooling power is increased, the cooling power is increased to a slightly larger value than the calculated value if the quantity of radiant heat is large, while the cooling power is increased to a slightly smaller value than the calculated value if the quantity of radiant heat is small. On the other hand, when the output of the optimum heating/cooling power calculator indicates that the cooling power is reduced, the cooling power is reduced to a slightly smaller value than the calculated value if the quantity of radiant heat is large, while the cooling power is reduced to a slightly larger value than the calculated value if the quantity of radiant heat is small. At step S220, the cooling operation is continued at the newly corrected cooling power. At step 221, the temperature difference dT between the target temperature and the temperature of the air is stored in the memory 43 as a precedent temperature difference dTs and the next timing for measuring the temperature is waited.

In this way, the outdoor air temperature, the number of passengers or the quantity of radiant heat is detected so as to correct the heating/cooling power.

In the above embodiments, only the case of cooling the car is explained but the same effects can be obtained in the case of heating the car. The present invention is applicable to all air conditioners which can control the temperature of the air in the car to a desired temperature or in the vicinity thereof by changing the heating-/cooling power.

Seventeenth Embodiment

A seventeenth embodiment of the present invention will be explained with reference to FIGS. 26 schematically showing a train car and a circuit diagram shown in FIG. 52, and a flowchart in FIG. 53. FIG. 26 schematically showing the structure of a train car and the flow of data. In FIG. 26, the reference numeral 13 denotes an outside air temperature detector which is composed of a thermistor or the like so as to detect the temperature of the outside air, 4 a control unit of the air conditioner provided with a heating/cooling power determining means including a heating/cooling power correcting means. The temperature of the outdoor air detected by the outdoor air temperature detector 13 is supplied to the control unit 4.

Figure 52:
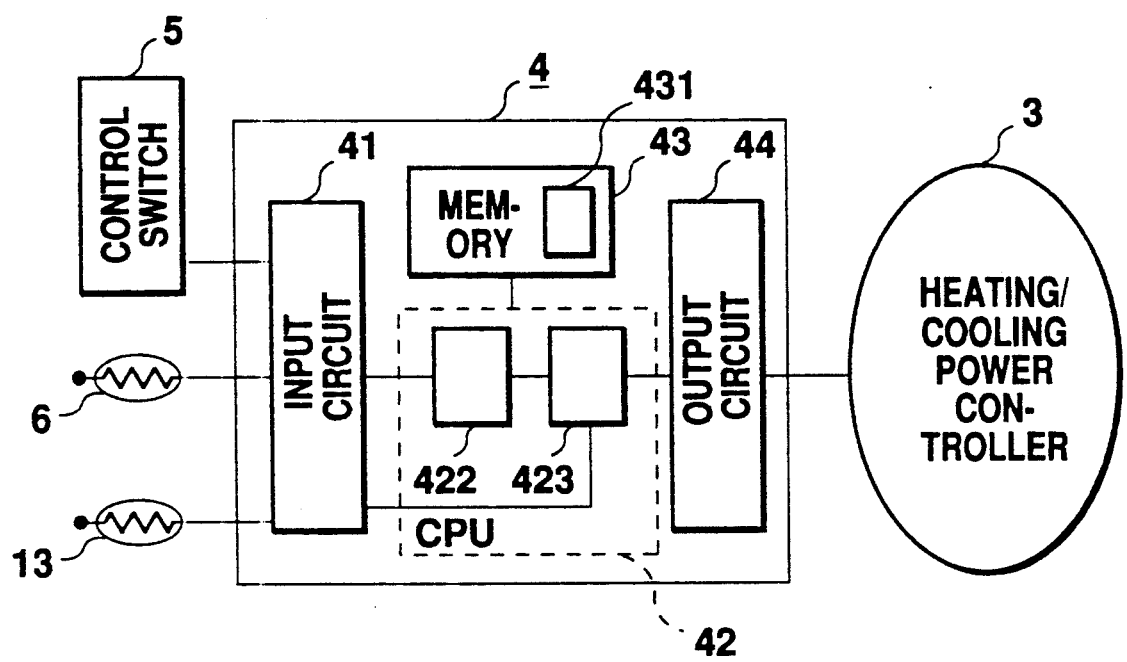
FIG. 52 is a block diagram of a still further example of control unit of an air conditioner for railway vehicles according to the present invention.
Figure 53:
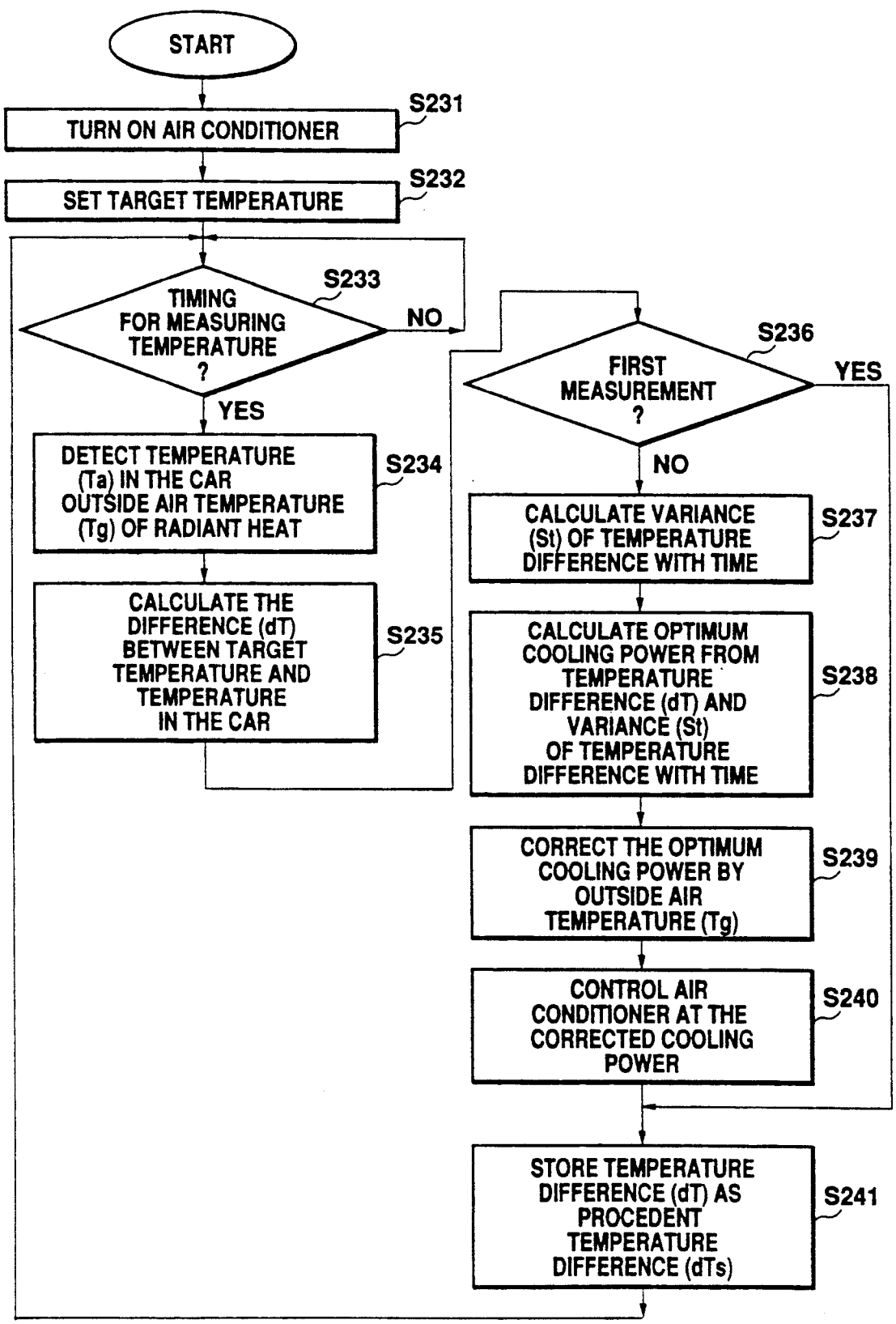
FIG. 53 is a flowchart of a still further example of the controlling operation of an air conditioner for railway vehicles according to the present invention.

FIG. 52 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating-/cooling power correcting means 423. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6 and the output of the outside air temperature detector 13 are input to the input circuit 41. A heating/cooling power controller 3 controls the power of the compressor in accordance with the output of the output circuit 44.

The operation of the air conditioner will now be explained with reference to the flowchart in FIG. 53. At step S231, the air conditioner of the train is first turned ON by a train operator or the like, and the target temperature is set at step S232. At step S233, the timing for measuring the temperature is waited, and the temperature Ta of the air in the car and the temperature Tg of the outside air are detected at step S234. At step S235, the temperature difference dT between the target temperature and the air temperature in the car is obtained. At step S236, judgement is made as to whether or not the current measurement is a first measurement. If this is a first measurement, this temperature difference is stored in the memory 43 as a precedent temperature difference dTs at step 241. On the other hand, if this is judged to be a second or later measurement at step S236, the variance St of temperature difference with time, which is the difference between the precedent temperature difference dTs and the current temperature difference dT, is obtained at step S237. From the variance of temperature difference with time, whether the temperature in the car is stable or it has changed in a short time is grasped.

The correction value for the heating/cooling power is then inferred from the temperature difference dT between the target temperature and the variance St of temperature difference with time in accordance with a fuzzy rule so that the temperature of the air in the car is equal to the target temperature, and the optimum cooling power is calculated at step 218. For example, if the temperature in the car is lower than the target temperature and than the precedently measured temperature, it is judged that the air-cooling is excessive, and the cooling power is reduced. On the other hand, if the temperature in the car is higher than the target temperature and than the precedently measured temperature, it is judged that the air-cooling is insufficient, and the cooling power is increased. If there is no temperature difference between the temperature of the air in the car and the target temperature and there is no difference in the current temperature change and the precedent temperature change, it is judged that the temperature of the air in the car is maintained in a good state and the cooling power is maintained as it is. At the next step 239, the heating/cooling power is corrected in accordance with the detected the temperature Tg of the outside air so that when the output of the optimum heating/cooling power calculator indicates that the cooling power is increased, the cooling power is increased to a slightly larger value than the calculated value if the temperature of the outside air is high, while the cooling power is increased to a slightly smaller value than the calculated value if the temperature of the outside air is low. On the other hand, when the output of the optimum heating/cooling power calculator indicates that the cooling power is reduced, the cooling power is reduced to a slightly smaller value than the calculated value if the temperature of the outside air is high, while the cooling power is reduced to a slightly larger value than the calculated value if the temperature of the outside air is low. At step S240, the cooling operation is continued at the newly corrected cooling power. At step 241, the temperature difference dT between the target temperature and the air temperature is stored in the memory 43 as a precedent temperature difference dTs and the next timing for measuring the temperature is waited.

Figure 54A:
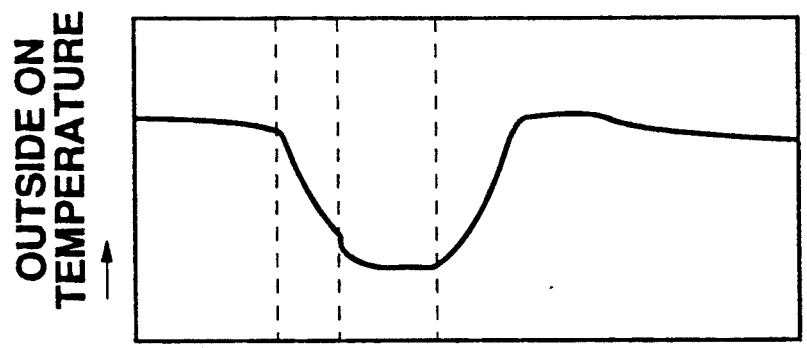
FIGS. 54(A) to 54(C) show the concept of the controlling operation of a conventional air conditioner carried out when a load changes.
Figure 54B:
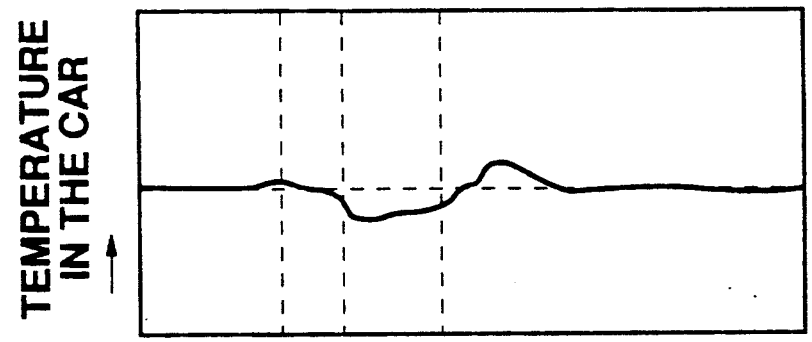
Figure 54C:
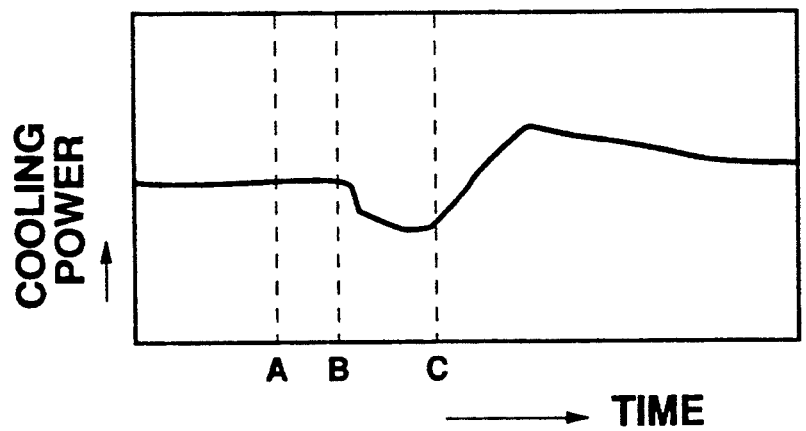
Figure 55A:
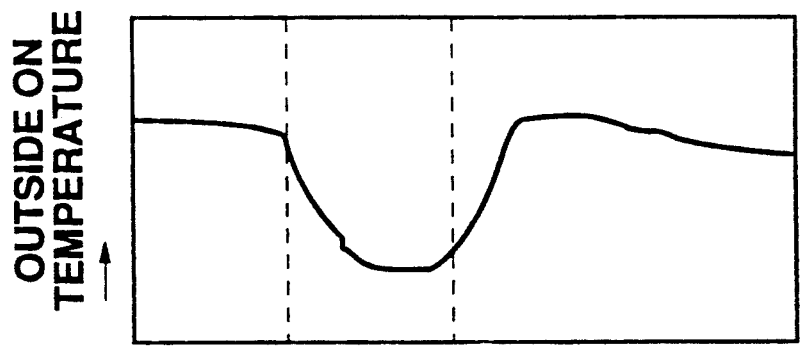
FIGS. 55(A) to 55(C) show the concept of the controlling operation of an air conditioner according to the present invention carried out when the load in FIGS. 54(A) to 54(C) changes.
Figure 55B:
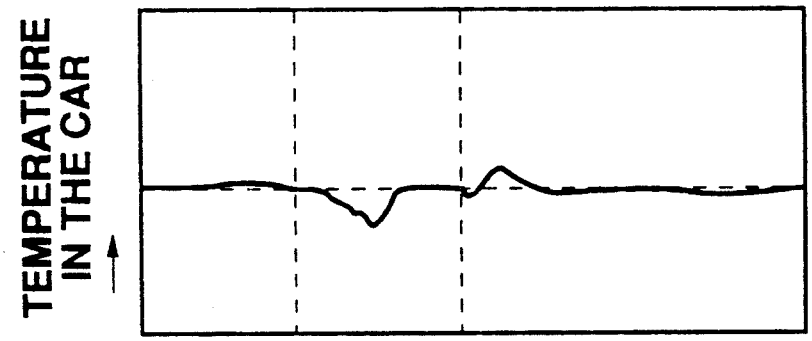
Figure 55C:
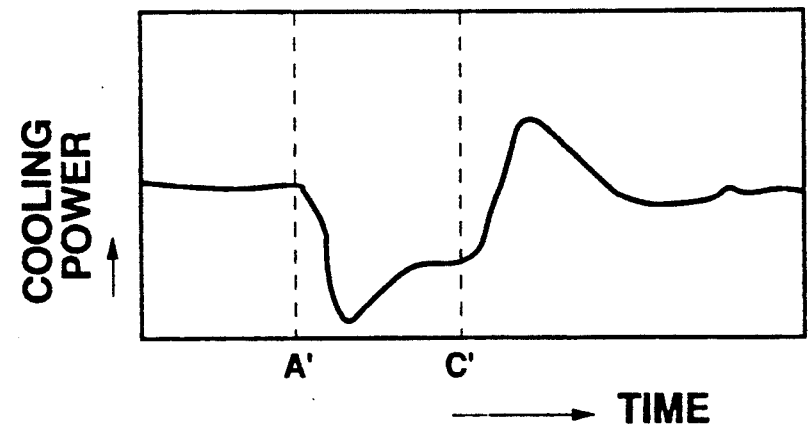

The result of this control is shown in FIGS. 55(A) to 55 (C) in comparison with FIGS. 54(A) to 54(C), which show the concept of controlling operation without correction of the heating/cooling power in accordance with the present invention. In a conventional control method shown in FIGS. 54(A) to 54(C), when the temperature of the outside air begins to lower at the point (a) (FIG. 54(A)), the air temperature in the car begins to gradually lower (FIG. 54(B)). At the point (b) of time when the temperature of the air in the car becomes below the target temperature, the cooling power begins to decrease (FIG. 54(C)), and the temperature of the air in the car returns to the target temperature soon. As a result, the temperature of the air in the car becomes greatly below the target temperature. At the point (b) of time when the temperature of the outside air begins to rise again, the temperature of the air in the car begins to gradually rise. About the point of time when the temperature of the air in the car becomes above the target temperature, the cooling power begins to increase, and the temperature of the air in the car returns to the target temperature soon. In this way, by the conventional method, the control of the cooling power is always after the change in the temperature of the air in the car comes below the target temperature, so that the temperature in the car sometimes becomes too high or too low due to a change in the outside air temperature. In contrast, if the heating/cooling power is corrected in accordance with the present invention, the correction value for the heating/cooling power is greatly increased when the outside air temperature begins to lower at the point (a), as shown in FIGS. 55(A) to 55(C), so that the air temperature in the car does not become too lower than the target temperature. Similarly, the correction value for the heating/cooling power is greatly reduced so as to increase the cooling power immediately when the temperature of the outside air begins to rise at the point (c), so that the temperature of the air in the car does not become too higher than the target temperature.

Eighteenth Embodiment

Figure 56:
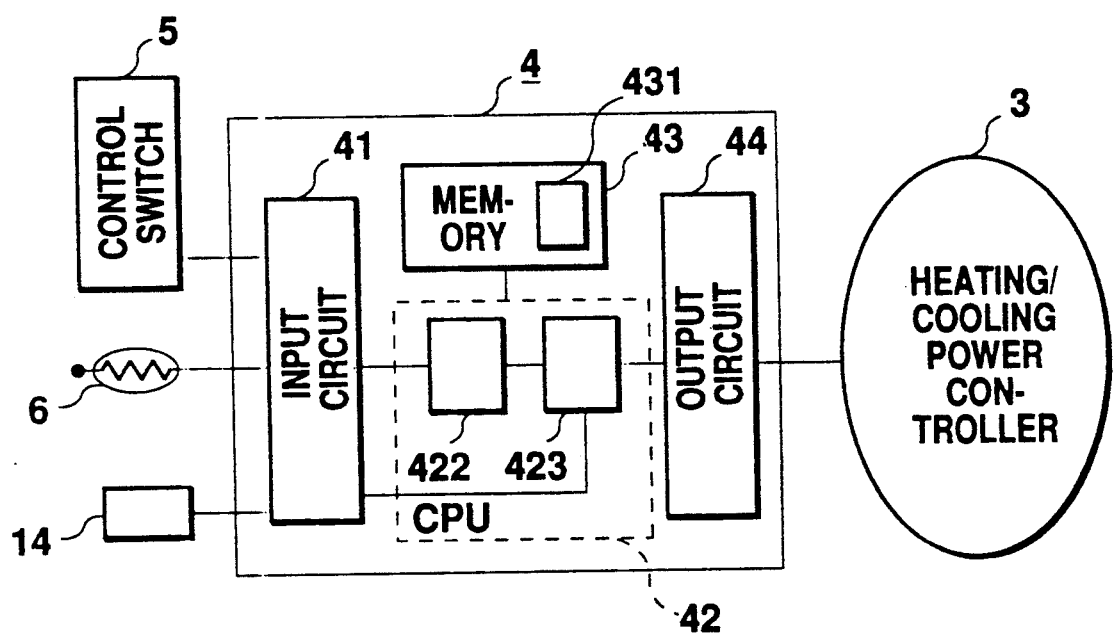
FIG. 56 is a block diagram of a still further example of control unit of an air conditioner for railway vehicles according to the present invention.
Figure 57:
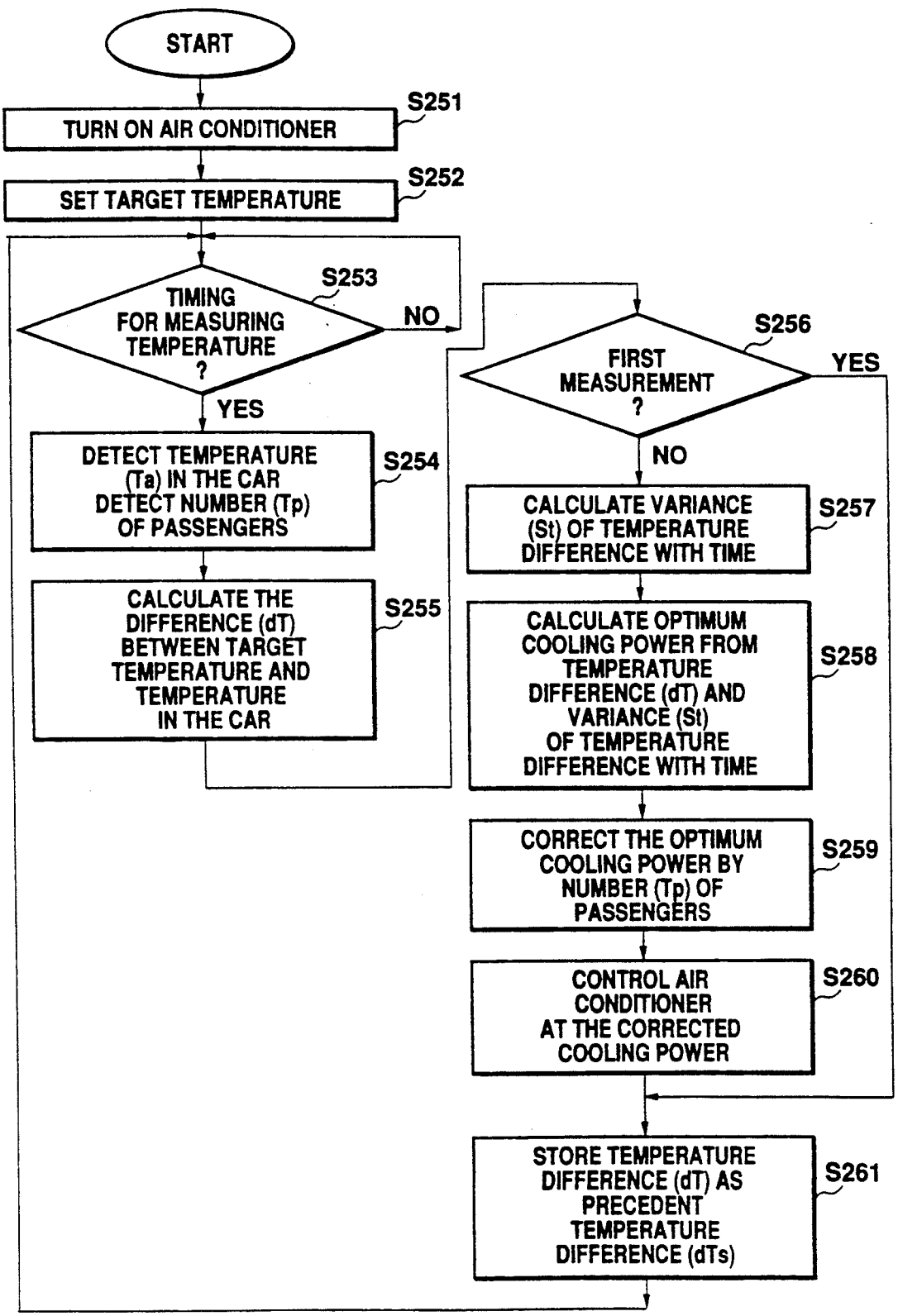
FIG. 57 is a flowchart of a still further example of the controlling operation of an air conditioner for railway vehicles according to the present invention.

An eighteenth embodiment of the present invention will be explained with reference to FIGS. 29, 56 and 57. FIG. 29 schematically shows a train car, FIG. 56 is a circuit diagram of the eight embodiment and FIG. 57 is a flowchart of the controlling operation of the eighth embodiment. FIG. 29 schematically shows the structure of a train car and the flow of data. In FIG. 29, the reference numeral 14 represents a passenger number detector for detecting the number of passengers and 4 a control unit of the air conditioner provided with a heating-/cooling power determining means including a heating-/cooling power correcting means. The number of passengers detected by the passenger number detector 14 is supplied to the control unit 4.

FIG. 56 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating-/cooling power correcting means 423. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6 and the output of the passenger number detector 14 are input to the input circuit 41. A heating/cooling power controller 3 controls the power of the compressor in accordance with the output of the output circuit 44.

The operation of the air conditioner will now be explained with reference to the flowchart in FIG. 57. At step S251, the air conditioner of the train is first turned ON by a train operator or the like, and the target temperature is set at step S252. At step S253, the timing for measuring the temperature is waited, and the air temperature Ta in the car and the number Tp of passengers are detected at step S254. At step S255, the temperature difference dT between the target temperature and the air temperature in the car is obtained. At step S256, judgement is made as to whether or not the current measurement is a first measurement. If this is a first measurement, this temperature difference is stored in the memory 43 as a precedent temperature difference dTs at step 262. On the other hand, if this is judged to be a second or later measurement at step S256, the variance St of temperature difference with time, which is the difference between the precedent temperature difference dTs and the current temperature difference dT, is obtained at step S257. From the variance of temperature difference with time, whether the temperature in the car is stable or it has changed in a short time is grasped and the correction value for the cooling power is obtained. The correction value for the heating/cooling power is then inferred from the temperature difference dT between the target temperature and the variance St of temperature difference with time in accordance with a fuzzy rule, and the optimum cooling power is calculated at step 258. For example, if the temperature in the car is lower than the target temperature and than the precedently measured temperature, it is judged that the air-cooling is excessive, and the cooling power is reduced. On the other hand, if the temperature in the car is higher than the target temperature and than the precedently measured temperature, it is judged that the air-cooling is insufficient, and the cooling power is increased. If there is no temperature difference between the air temperature in the car and the target temperature and there is no difference in the current temperature change and the precedent temperature change, it is judged that the air temperature in the car is maintained in a good state and the cooling power is maintained as it is. At the next step 259, the heating/cooling power is corrected in accordance with the detected number Tp of passengers so that when the output of the optimum heating/cooling power calculator indicates that the cooling power is increased, the cooling power is increased to a slightly larger value than the calculated value if the number of passengers is large, while the cooling power is increased to a slightly smaller value than the calculated value if the number of passengers is small. On the other hand, when the output of the optimum heating/cooling power calculator indicates that the cooling power is reduced, the cooling power is reduced to a slightly smaller value than the calculated value if the number of passengers is large, while the cooling power is reduced to a slightly larger value than the calculated value if the number of passengers is small. At step S260, the cooling operation is continued at the newly corrected cooling power. At step S261, the temperature difference dT between the target temperature and the air temperature is stored in the memory 43 as a precedent temperature difference dTs and the next timing for measuring the temperature is waited.

Nineteenth Embodiment

A nineteenth embodiment of the present invention will be explained with reference to FIGS. 32 schematically showing a train car, a circuit diagram in FIG. 58 and a flowchart in FIG. 59. FIG. 32 schematically shows the structure of a train car and the flow of data. In FIG. 32, the reference numeral 13 represents an outside air temperature detector, 14 a passenger number detector, and 4 a control unit of the air conditioner provided with a heating/cooling power determining means including a heating/cooling power correcting means. The temperature of the outside air and the number of passengers detected by the outside air temperature detector 13 and the passenger number detector 14, respectively, are supplied to the control unit 4.

Figure 58:
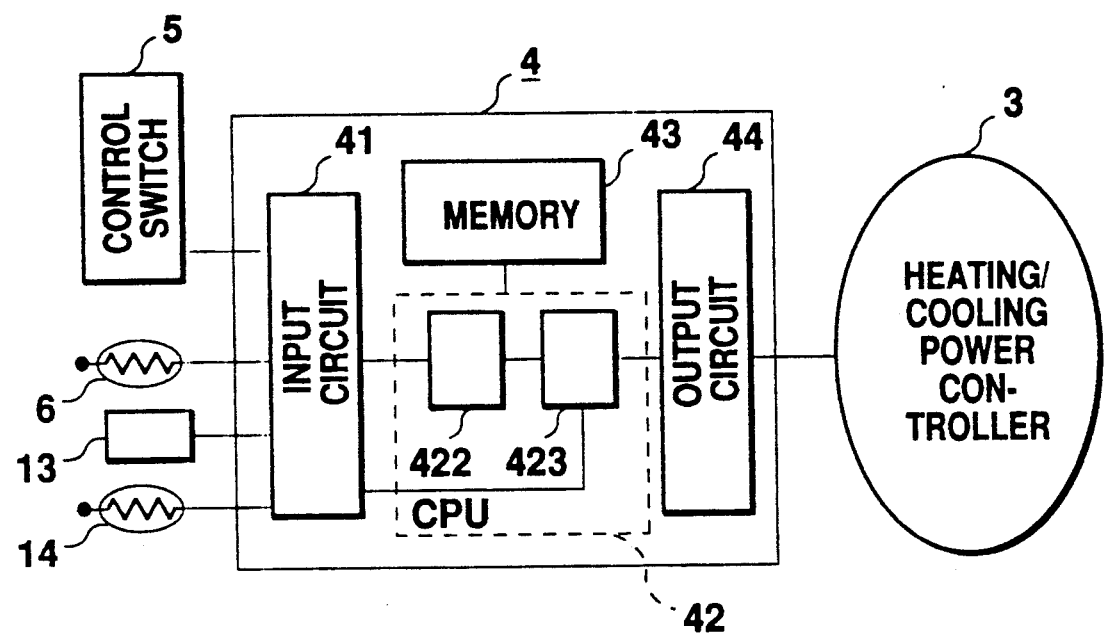
FIG. 58 is a block diagram of a still further example of control unit of an air conditioner for railway vehicles according to the present invention.
Figure 59:
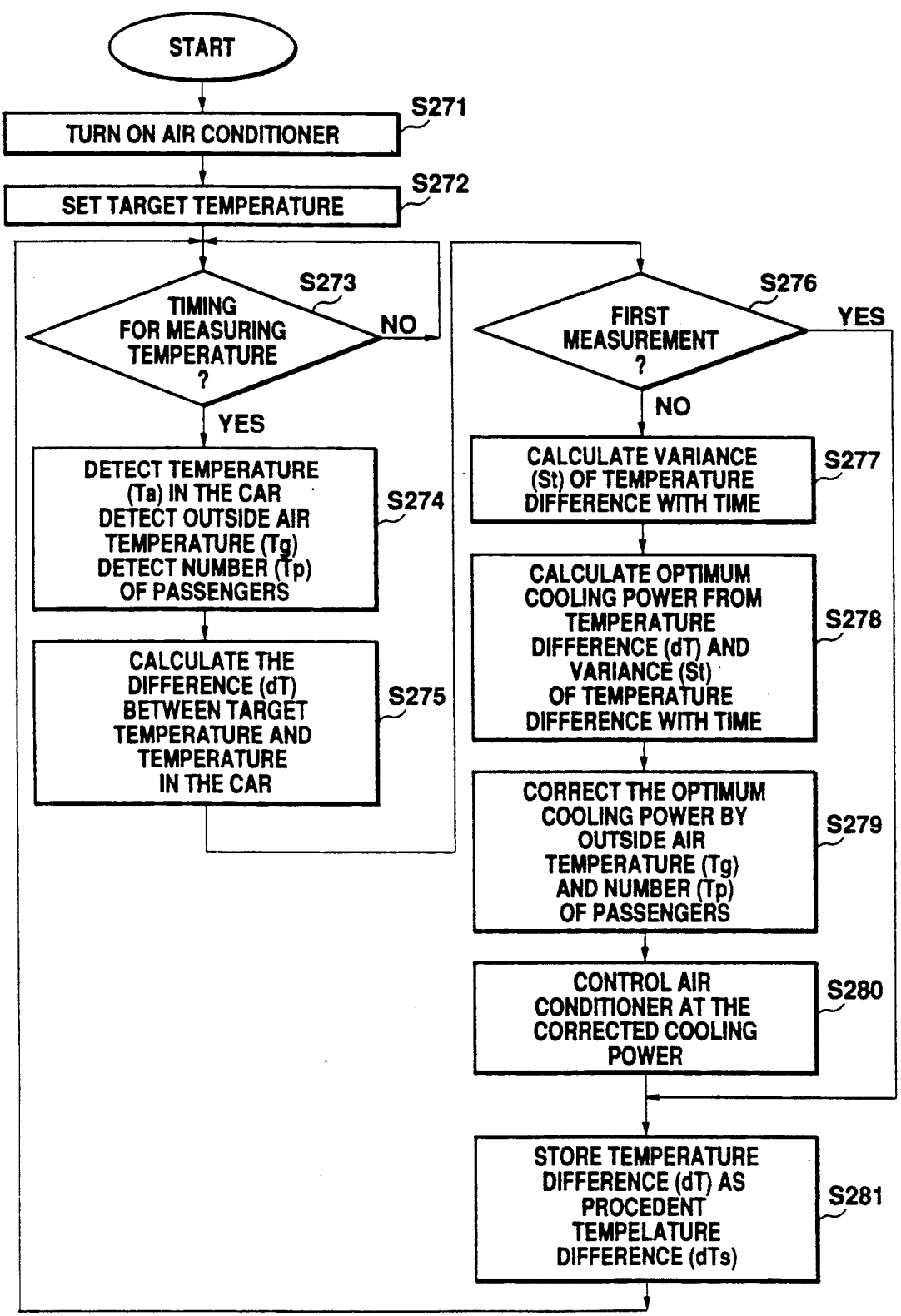
FIG. 59 is a flowchart of a still further example of the controlling operation of an air conditioner for railway vehicles according to the present invention.

FIG. 58 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating/cooling power correcting means 423. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment, the output of the temperature detector 6, the output of the outside air temperature detector 13 and the output of the passenger number detector 14 are input to the input circuit 41. An inverter 3 controls the power of the compressor in accordance with the output of the output circuit 44.

The operation of the air conditioner will now be explained with reference to the flowchart in FIG. 59. At step S271, the air conditioner of the train is first turned ON by a train operator or the like, and the target temperature is set at step S272. At step S273, the timing for measuring the temperature is waited, and the temperature Ta of the air in the car, the temperature Tg of the outside air and the number Tp of passengers are detected at step S274. At step S275, the temperature difference dT between the target temperature and the temperature of the air in the car is obtained. At step S276, judgement is made as to whether or not the current measurement is a first measurement. If this is a first measurement, this temperature difference is stored in the memory 43 as a precedent temperature difference dTs at step 281. On the other hand, if this is judged to be a second or later measurement at step S276, the variance St of temperature difference with time, which is the difference between the precedent temperature difference dTs and the current temperature difference dT, is obtained at step S277.

From the variance of temperature difference with time, whether the temperature in the car is stable or it has changed in a short time is grasped and the correction value for the cooling power is obtained.

The correction value for the heating/cooling power is then inferred from the temperature difference dT between the target temperature and the variance St of temperature difference with time in accordance with a fuzzy rule so that the temperature of the air in the car is equal to the target temperature, and the optimum cooling power is calculated at step 278. For example, if the temperature in the car is lower than the target temperature and than the precedently measured temperature, it is judged that the air-cooling is excessive, and the cooling power is reduced. On the other hand, if the temperature in the car is higher than the target temperature and than the precedently measured temperature, it is judged that the air-cooling is insufficient, and the cooling power is increased. If there is no temperature difference between the temperature of the air in the car and the target temperature and there is no difference in the current temperature change and the precedent temperature change, it is judged that the temperature of the air in the car is maintained in a good state and the cooling power is maintained as it is. At the next step 279, the heating/cooling power is corrected in accordance with the detected temperature Tg of the outside air and number Tp of passengers. The load in the heating/cooling system is obtained from the detected temperature Tg of the outside air and number Tp of passengers in accordance with a fuzzy rule in such a manner that the load is "large" when the outside air temperature is high and the number of passengers is large, that the load is "small" when the temperature of the outside air is low and the number of passengers is small, and that the load is "medium" when the temperature of the outside air is high and the number of passengers is small. When the output of the optimum heating/cooling power calculator indicates that the cooling power is increased due to the load in the heating/cooling system, the cooling power is corrected so as to be increased to a slightly larger value than the calculated value if the load is large and to be increased to a slightly smaller value than the calculated value if the load is small. On the other hand, when the output of the optimum heating/cooling power calculator indicates that the cooling power is reduced, the cooling power is corrected so as to be reduced to a slightly larger value than the calculated value if the load is large and to be reduced to a slightly smaller value than the calculated value if the load is small. At step S280, the cooling operation is continued at the newly corrected cooling power. At step 281, the temperature difference dT between the target temperature and the temperature of the air is stored in the memory 43 as a precedent temperature difference dTs and the next timing for measuring the temperature is waited.

Twentieth Embodiment

Figure 60:
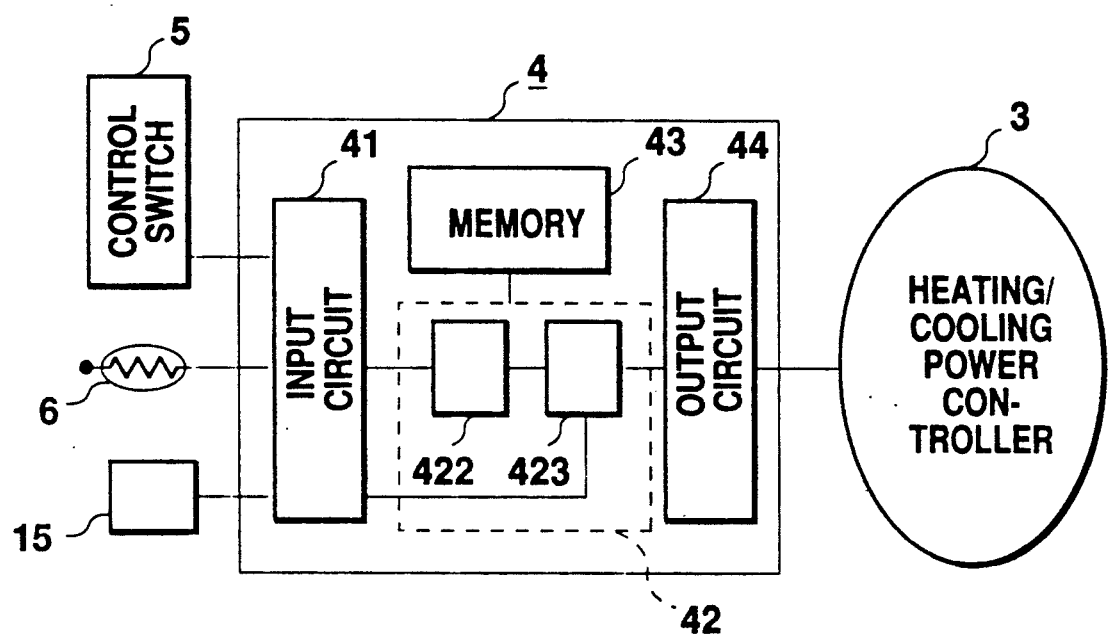
FIG. 60 is a block diagram of a still further example of control unit of an air conditioner for railway vehicles according to the present invention.
Figure 61:
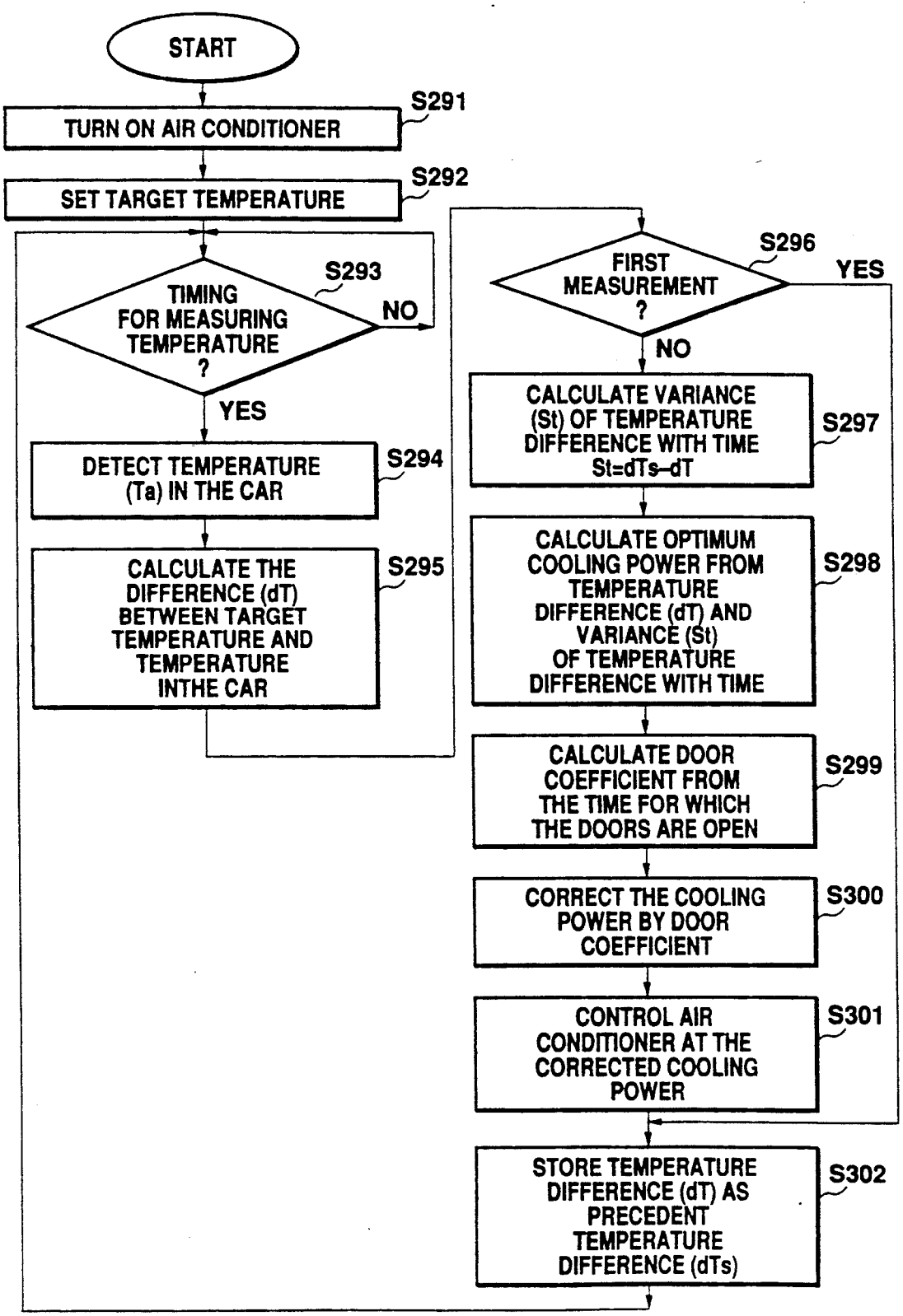
FIG. 61 is a flowchart of a still further example of the controlling operation of an air conditioner for railway vehicles according to the present invention.
Figure 62:
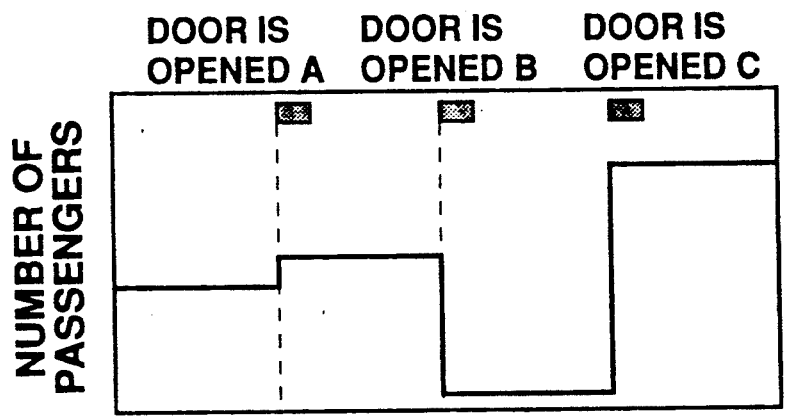
FIGS. 62(A) to 62(C) show the concept of the controlling operation of an air conditioner according to the present invention carried out when a load changes.
Figure 62:
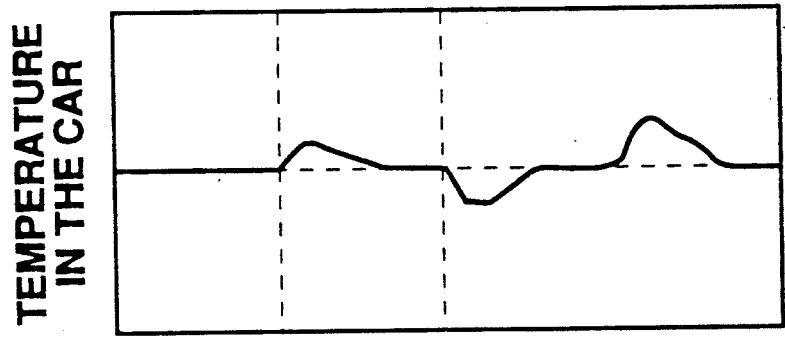
Figure 62:
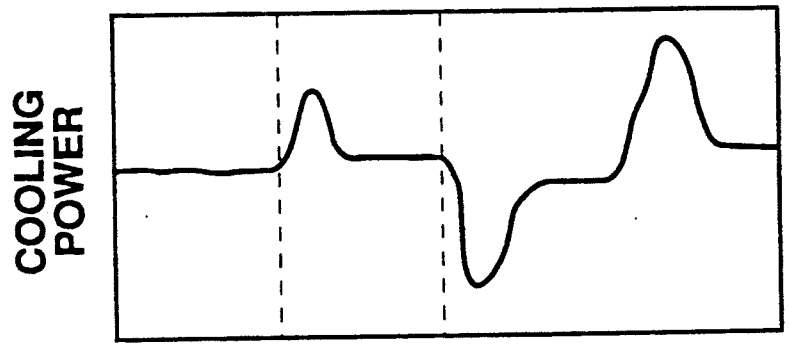
Figure 63:
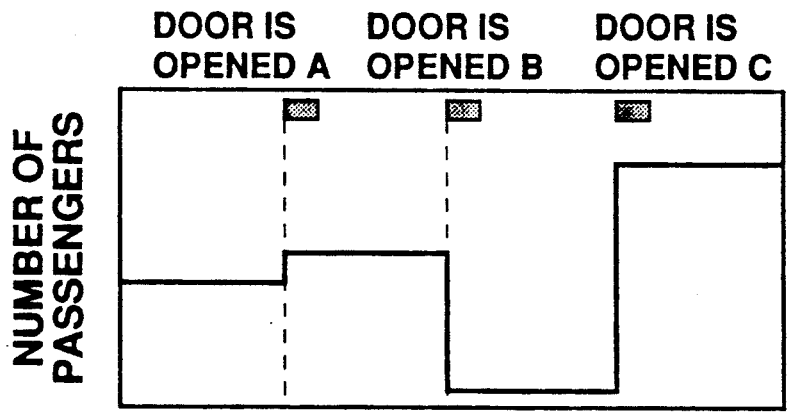
FIGS. 63(A) to 63(C) show the concept of the controlling operation of a conventional air conditioner carried out when the load in FIGS. 62(A) to 62(C) changes.
Figure 63:
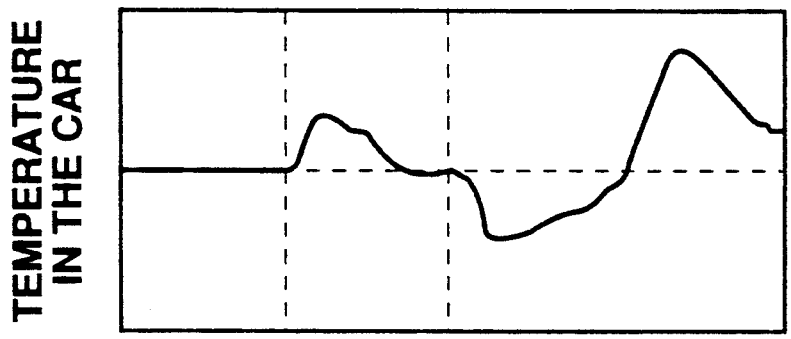
Figure 63:
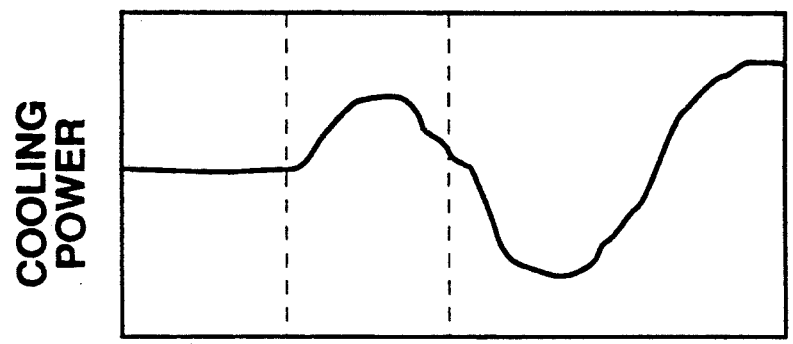
Figure 64:
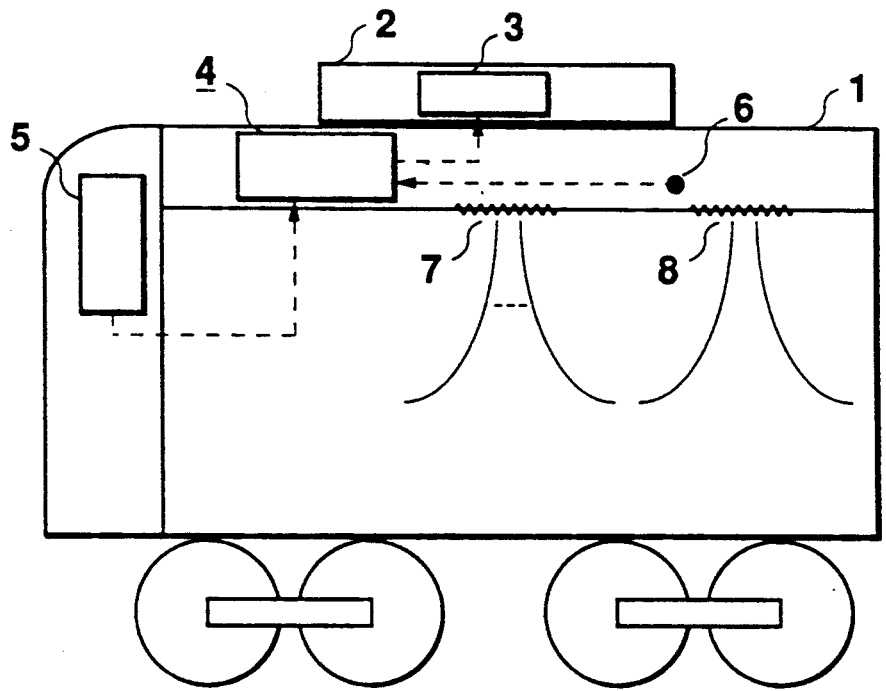
FIG. 64 schematically shows an example of a conventional air conditioner for railway vehicles.
Figure 65:
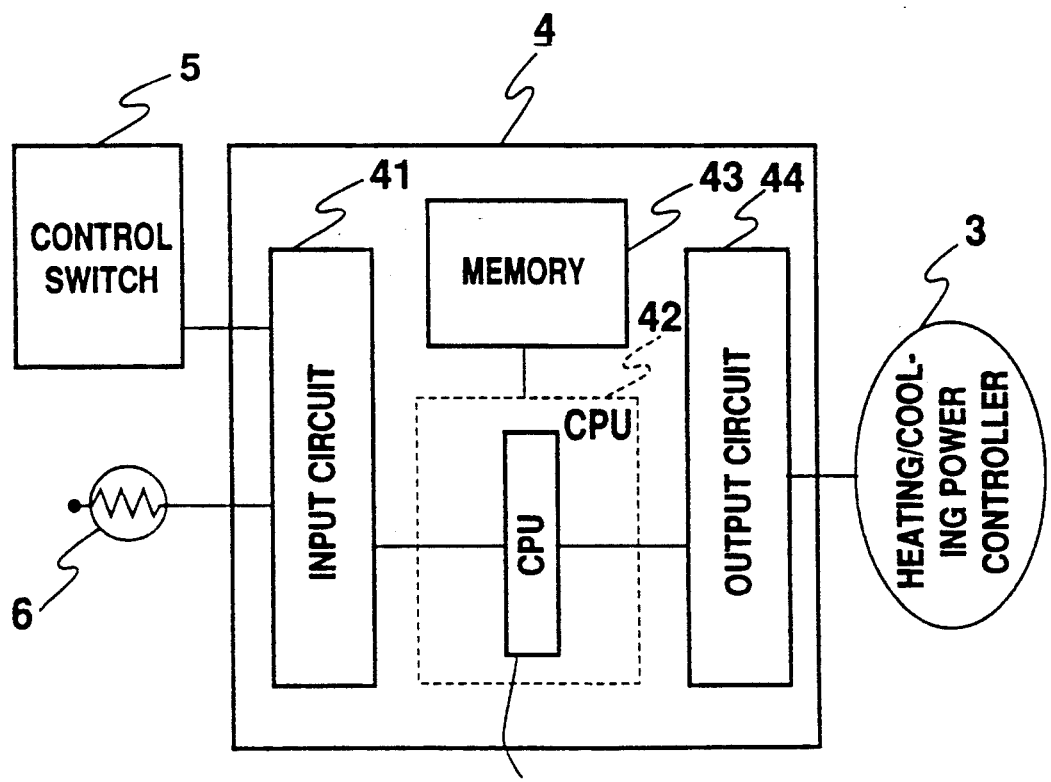
FIG. 65 is a block diagram of an example of control unit of a conventional air conditioner for railway vehicles.
Figure 66:
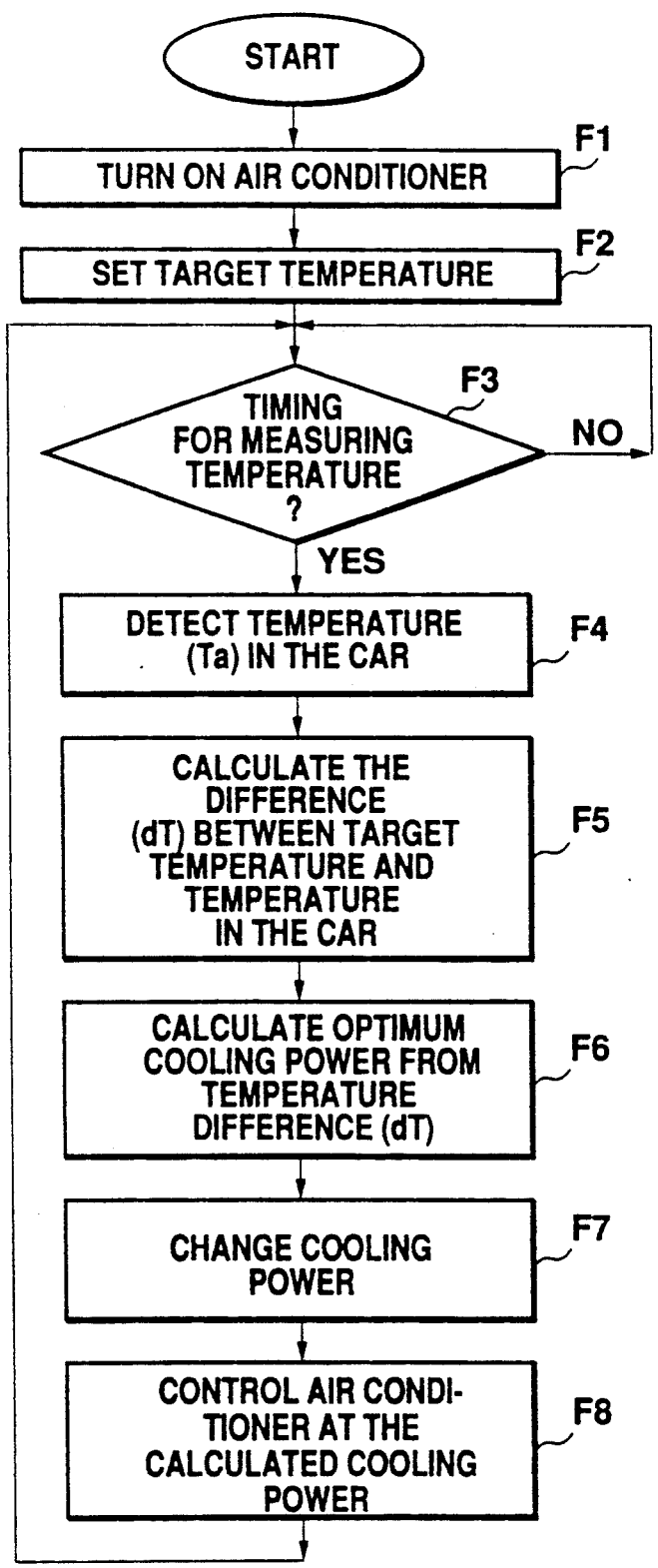
FIG. 66 is a flowchart of an example of the controlling operation of a conventional air conditioner for railway vehicles.
Figure 67:
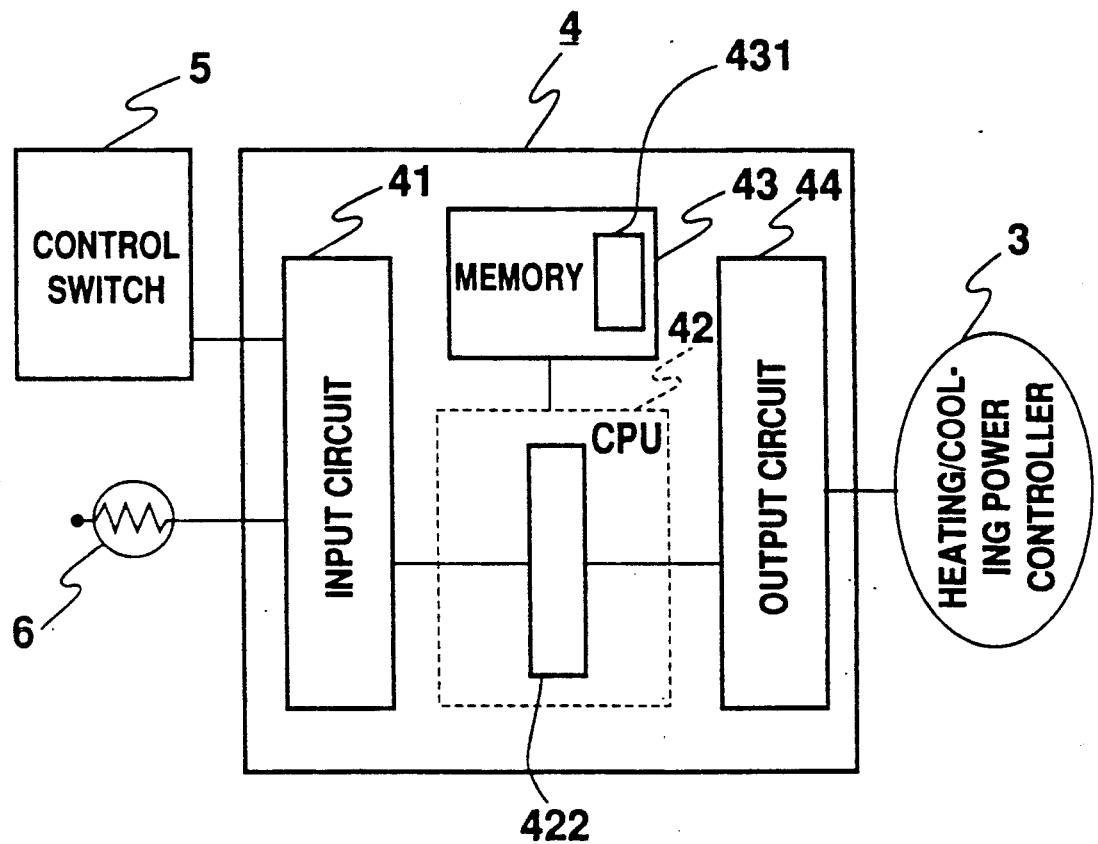
FIG. 67 is a block diagram of another example of control unit of a conventional air conditioner for railway vehicles.
Figure 68:
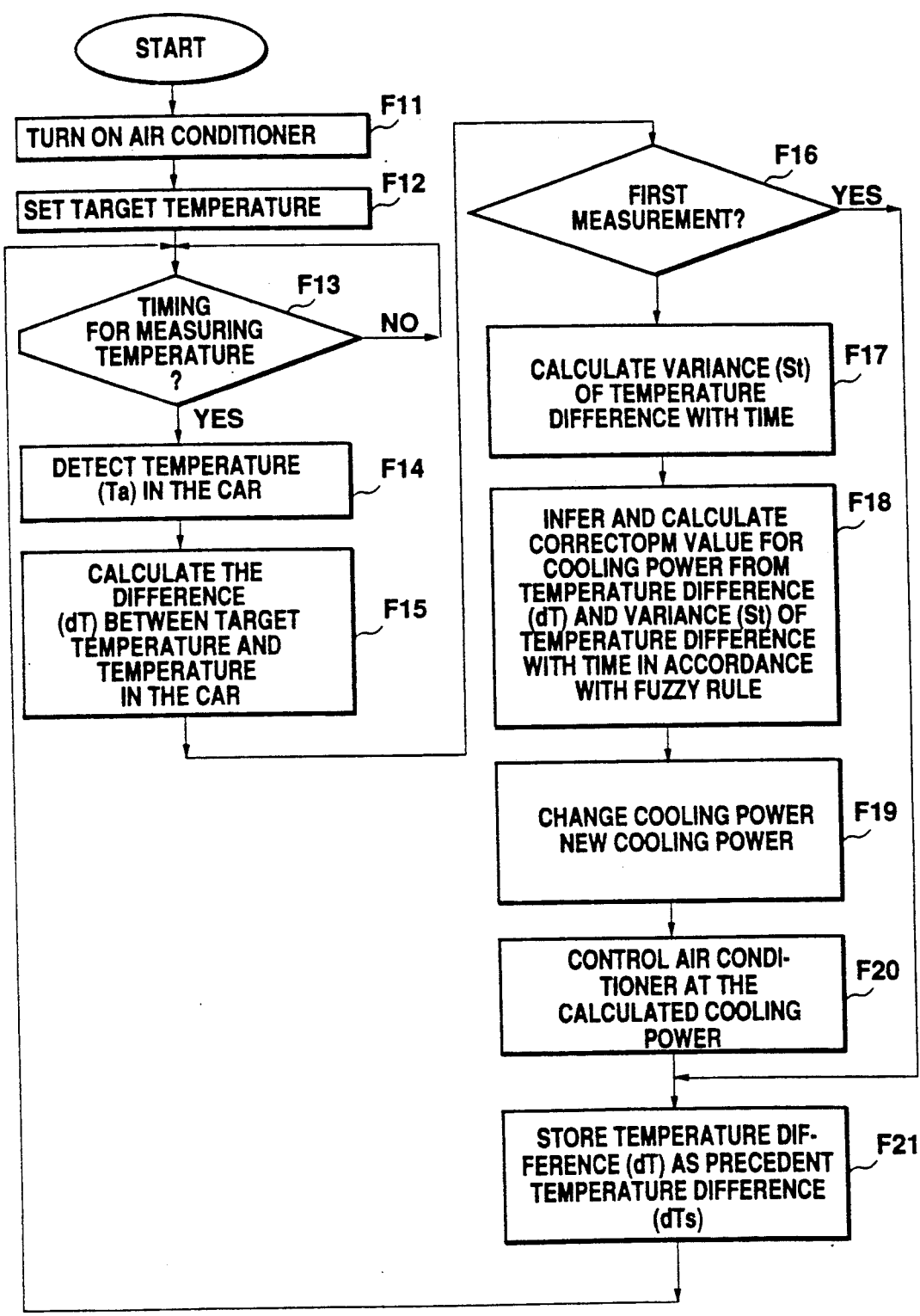
FIG. 68 is a flowchart of another example of the controlling operation of a conventional air conditioner for railway vehicles.
Figure 69:
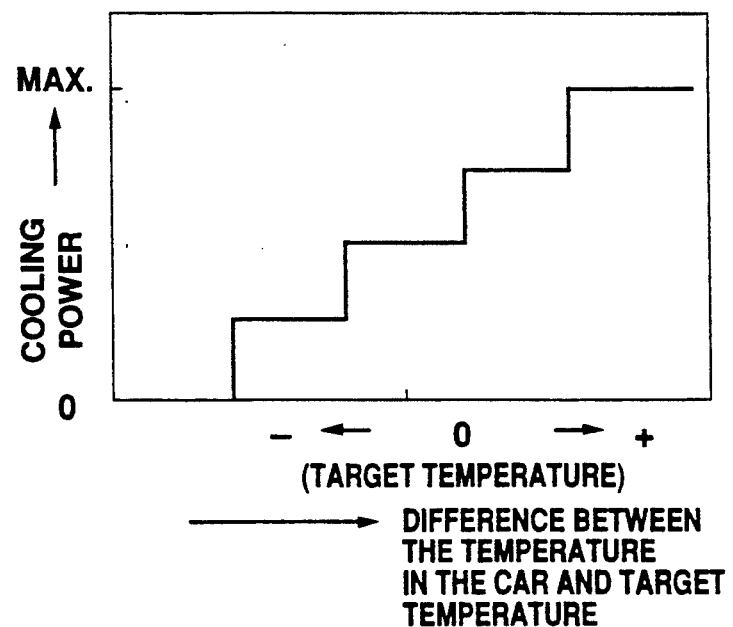
FIG. 69 shows the concept of a conventional controlling method.
Figure 70:
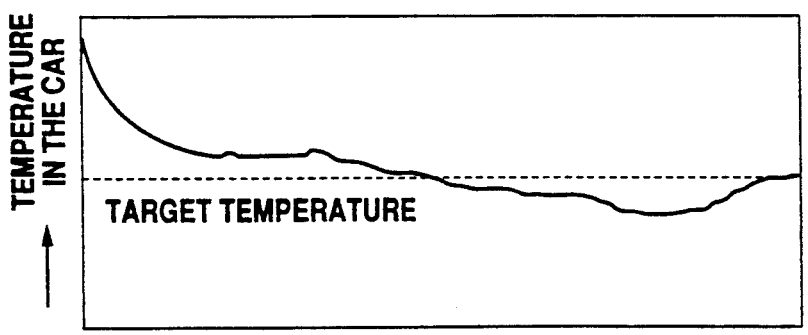
Figure 70:
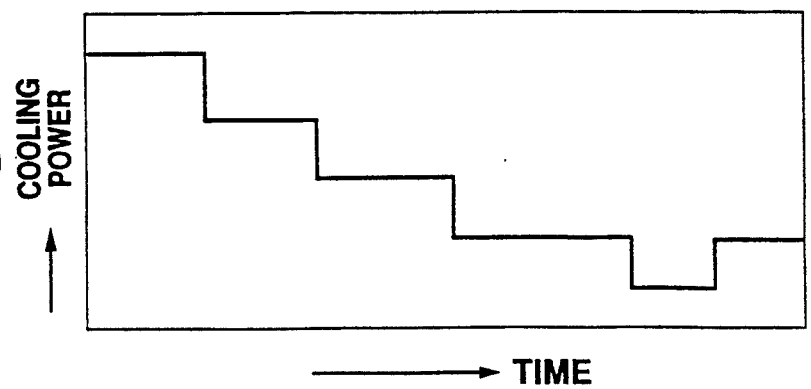
Figure 71:
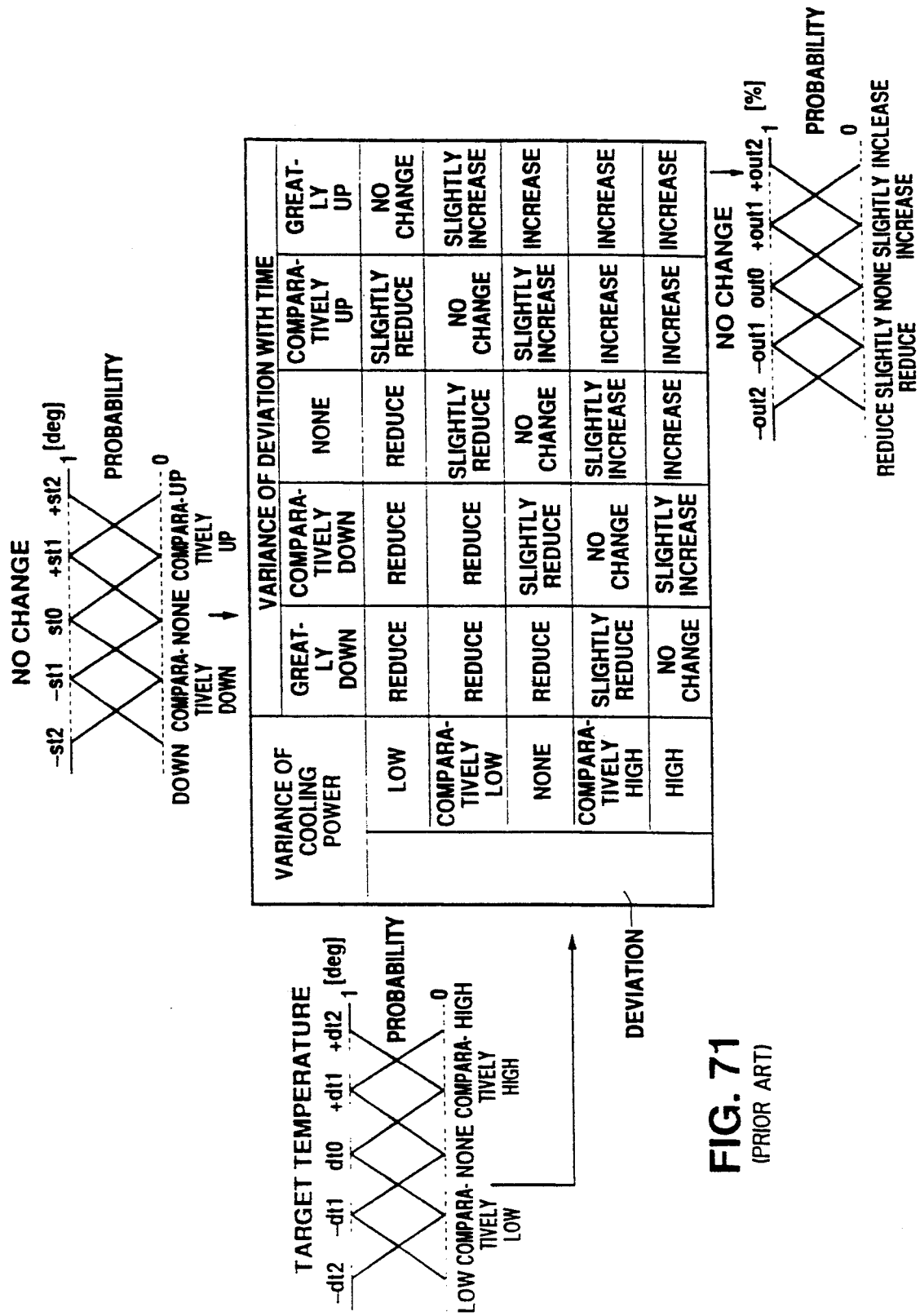
FIG. 71 shows the concept of a fuzzy rule for obtaining the correction value of the heating/cooling power in another conventional air conditioner for railway vehicles.
Figure 72:
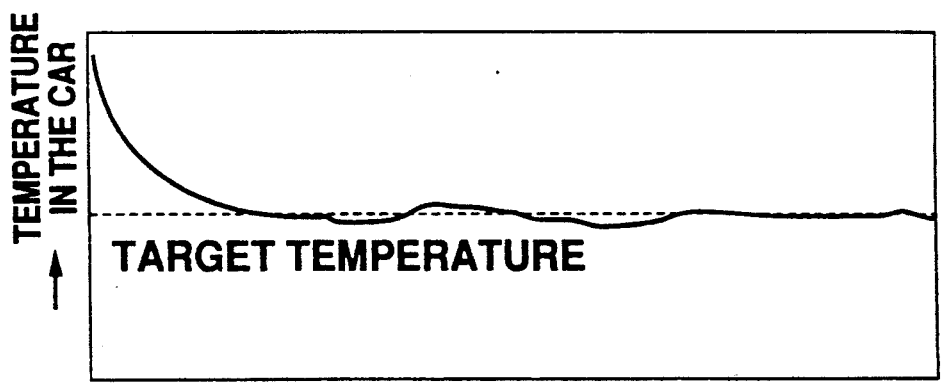
FIGS. 72A, 72B show the concept of the controlling operation of the conventional air conditioner for railway vehicles shown in FIG. 71.
Figure 72:
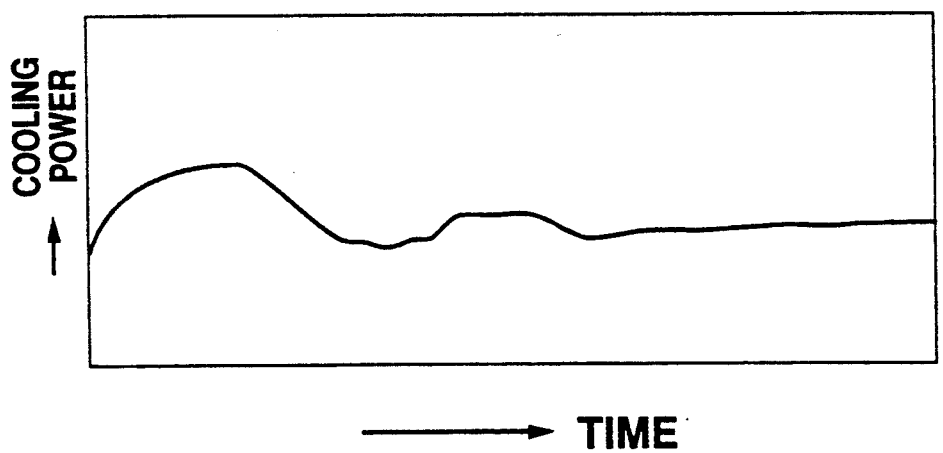

A twentieth embodiment of the present invention will be explained with reference to FIGS. 35 schematically showing a train car, a circuit diagram in FIG. 60, a flowchart in FIG. 61, FIG. 38 showing the concept of a door coefficient, and FIGS. 62 and 63 showing the concept of the controlling operation. FIG. 35 schematically shows the structure of a train car and the flow of data. In FIG. 35, the reference numeral 5 represents a control switch portion by which a train operator turns ON/OFF the air conditioner, 15 a door switch portion for opening and closing the doors, and 4 a control unit for controlling the air conditioner including a heating-/cooling power correcting means. The data on ON/-OFF of the air conditioner and the opening of the doors are supplied to the control unit 4.

FIG. 60 is a circuit diagram of the control unit 4. The electric circuit of the control unit 4 is composed of an input circuit 41, a CPU 42, a memory 43 and an output circuit 44. The CPU 42 is provided with an optimum heating/cooling power calculator 422 and a heating-/cooling power correcting means 423. The memory 43 has a region 431 for storing a precedently calculated temperature difference between the target temperature and the temperature of the air in the car. The operation program of the heating/cooling power correcting means is stored in the memory 43 and calculated by the CPU 42. The output of the control switch portion 5 provided in a train operator's compartment and the output of a temperature detector 6 are input to the input circuit 41. A heating/cooling power controller 3 controls the power of the compressor in accordance with the output of the output circuit 44.

The operation of the air conditioner will now be explained with reference to the flowchart in FIG. 61. At step S291, the air conditioner of the train is first turned ON by a train operator or the like, and the target temperature is set at step S292. At step S293, the timing for measuring the temperature is waited, and the temperature Ta of the air in the car, the temperature Tg of the outside air and the number Tp of passengers are detected at step S294. At step S295, the temperature difference dT between the target temperature and the temperature of the air in the car is obtained. At step S296, judgement is made as to whether or not the current measurement is a first measurement. If this is a first measurement, this temperature difference is stored in the memory 43 as a precedent temperature difference dTs at step 302. On the other hand, if this is judged to be a second or later measurement at step S296, the variance St of temperature difference with time, which is the difference between the precedent temperature difference dTs and the current temperature difference dT, is obtained at step S297.

From the variance of temperature difference with time, whether the temperature in the car is stable or it has changed in a short time is grasped and the correction value for the cooling power is obtained.

The correction value for the heating/cooling power is then inferred from the temperature difference dT between the target temperature and the variance St of temperature difference with time in accordance with a fuzzy rule so that the temperature of the air in the car is equal to the target temperature, and the optimum cooling power is calculated at step 298. For example, if the temperature in the car is lower than the target temperature and than the precedently measured temperature, it is judged that the air-cooling is excessive, and the cooling power is reduced. On the other hand, if the temperature in the car is higher than the target temperature and than the precedently measured temperature, it is judged that the air-cooling is insufficient, and the cooling power is increased. If there is no temperature difference between the temperature of the air in the car and the target temperature and there is no difference in the current temperature change and the precedent temperature change, it is judged that the temperature of the air in the car is maintained in a good state and the cooling power is maintained as it is. At the next step 299, a door coefficient is obtained from the time elapsed from the opening operation of the doors in accordance with the concept of a door coefficient shown in FIG. 38. The correction value is multiplied by the door coefficient so as to obtain a new correction value. At step S300, the heating/cooling power is corrected again by the door coefficient obtained. In this case, however, if a predetermined time (Ts) has elapsed from the opening operation of the doors, the door coefficient is set at "1" and the correction value is not changed. At step S301, the cooling operation is continued at the newly corrected cooling power. At step 302, the temperature difference dT between the target temperature and the temperature of the air is stored in the memory 43 as a precedent temperature difference dTs and the next timing for measuring the temperature is waited.

The result of this control is shown in FIGS. 62(A) to 62(C) in comparison with FIGS. 63(A) to 63(C), which show the concept of controlling operation without correction of the heating/cooling power in accordance with the present invention. In a conventional control method shown in FIGS. 63(A) to 64(C), when the doors are opened at the point (a) of time (FIG. 63(A)), the temperature of the air in the car rises due to the increase in the number of passengers and the influence of the temperature of the outside air (FIG. 63(B)). Accordingly, the cooling power is increased (FIG. 63(C)), and the temperature of the air in the car returns to the target temperature soon. When the doors are opened at the point (b) of time, the number of passengers greatly reduces, so that the temperature of the air in the car lowers. Accordingly, the cooling power is decreased and the air temperature in the car begins to rise. When the doors are opened at the point (c) of time, a large number of passengers get on, and the air temperature in the car rapidly rises. Although the cooling power is increased, since the load is large, it takes a long time for the air temperature in the car to return to the target temperature. In contrast, if the heating/cooling power is corrected in accordance with the present invention, as shown in FIGS. 62(A) to 62(C), since it is possible to change the cooling power to a great extent immediately after the doors are opened, it is possible to suppress the difference between the temperature of the air in the car and the target temperature to the minimum. In addition, it is possible to return the temperature of the air in the car to the target temperature in a short time. When the influence of the opening of the doors become negligible, the door coefficient becomes "1" and no correction is carried out. Thus, stable cooling operation is enabled.

In this way, the correction value for the heating/cooling power is corrected when data indicates that the doors are opened.

In the above embodiments, the air conditioner for railway vehicles is controlled in accordance with the data on the temperature of the air in the car and data on at least one selected from the group consisting of underfoot temperature, radiant heat, air flow, humidity, outside air temperature, number of passengers and door opening operation. The present invention, however, is not restricted to these embodiments and, for example, it is possible to control an air conditioner in accordance with the temperature of the outside air, data on the door opening operation, radiant heat and the temperature of the air in the car. That is, it is possible to select any number of items of data from the above-described data, as desired.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An air conditioner for railway vehicles for controlling the temperature of a car to a preset target temperature, the air conditioner comprising:
   (a) a warm/cool air current generator for generating a warm air current during a heating operation and a cool air current during a cooling operation;
   (b) a car temperature detector provided in the vicinity of a ceiling in the car for detecting an air temperature in the car;
   (c) an underfoot temperature detector provided in the vicinity of a floor of the car for detecting an air temperature in the vicinity of the floor;
   (d) a target temperature correcting means for inferring the thermesthesia of passengers in the car on the basis of an output of the car temperature detector and an output of the underfoot temperature detector and correcting the target temperature in accordance with the result of the inference;
   (e) an optimum heating/cooling power calculator for calculating the optimum heating/cooling power on the basis of a difference between the corrected target temperature and the temperature of the air in the car;
   (f) a heating/cooling power controller for controlling the warm/cool air current generator in accordance with an output of the optimum heating/cooling power calculator; and
   (g) a radiant heat quantity detector provided at an appropriate location in the car for detecting a quantity of radiant heat;
   wherein the target temperature correcting means infers the thermesthesia of the passengers from the detected quantity of radiant heat.

2. An air conditioner for railway vehicles according to claim 1, further comprising a hygrometer provided at an appropriate location in the car so as to detect the reltaive humidity in the car;
   wherein the target temperature correcting means infers the thermesthesia of the passengers from the detected relative humidity.

3. An air conditioner for railway vehicles for controlling the temperature of a car to a preset target temperature, the air conditioner comprising:
   (a) a warm/cool air current generator for generating a warm air current wind during a heating operation and a cool air current during a cooling operation;
   (b) a car temperature detector provided in the vicinity of a ceiling in a car for detecting an air temperature in the car;
   (c) an underfoot temperature detector provided in the vicinity of a floor of the car for detecting an air temperature in the vicinity of the floor;
   (d) a target temperature correcting means for inferring the thermesthesia of passengers in the car on the basis of an output of the car temperature detector and an output of the underfoot temperature detector and correcting the target temperature in accordance with the results of the inference;
   (e) an optimum heating/cooling power calculator for calculating the optimum heating/cooling power on the basis of a difference between the corrected target temperature and the temperature of the air in the car;
   (f) a heating/cooling power controller for controlling the warm/cool air current generator in accordance with an output of the optimum heating/cooling power calculator; and
   (g) an anemometer provided at an appropriate location in the car for detecting a velocity of an air current in the car;
   wherein the target temperature correcting means infers the thermesthesia of the passengers from the detected velocity of the air current.

4. An air conditioner for railway vehicles according to claim 3, further comprising a hygrometer provided at an appropriate location in the car so as to detect the reltaive humidity in the car;
   wherein the target temperature correcting means infers the thermesthesia of the passengers from the detected relative humidity.

5. An air conditioner for railway vehicles for controlling the temperature of a car to a preset target temperature, the air conditioner comprising:
   (a) a warm/cool air current generator for generating a warm air current wind during a heating operation and a cool air current during a cooling operation;
   (b) a car temperature detector provided in the vicinity of a ceiling in a car for detecting the temperature of the air in the car;
   (c) a heating/cooling power correction value data detector, including a radiant heat quantity detector for detecting a quantity of radiant heat in said car, said heating/cooling power correction value data detector being provided at a predetermined location in the car;

(d) an optimum heating/cooling power calculator for calculating the optimum heating/cooling power on the basis of a difference between the temperature of the air in the car and the target temperature;

(e) a heating/cooling power correcting means for correcting the heating/cooling power on the basis of an output of the heating/cooling power correction value data detector; and (f) a warm/cool current generator controller for controlling the warm/cool air current generator in accordance with an output of the optimum heating/cooling power calculator.

6. An air conditioner for railway vehicles for controlling the temperature of a car to a preset target temperature, the air condition comprising:

(a) a warm/cool air current generator for generating a warm air current wind during a heating operation and a cool air current during a cooling operation;

(b) a car temperature detector provided in the vicinity of a ceiling in the car for detecting the temperature of the air in the car;

(c) a heating/cooling power correction value data detector provided at a predetermined location in the car;

(d) an optimum heating/cooling power calculator for calculating the optimum heating/cooling power on the basis of a difference between the temperature of the air in the car and the target temperature;

(e) a heating/cooling power correcting means for correcting the heating/cooling power on the basis of an output of the heating/cooling power correction value data detector; and (f) a warm/cool current generator controller for controlling the warm/cool air current generator in accordance with an output of the optimum heating/cooling power calculator;

wherein the heating/cooling power correction value data detector is a door opening information detector for detecting that a door is open and a time period for which the door is open.

7. An air conditioner for railway vehicles for controlling the temperature of a car to a preset target temperature, the air conditioner comprising:

(a) a warm/cool air current generator for generating a warm air current wind during a heating operation and a cool air current during a cooling operation;

(b) a car temperature detector provided in the vicinity of a ceiling in a car for detecting the temperature of the air in the car;

(c) a heating/cooling power correction value data detector, including an atmospheric temperature sensor for detecting an atmospheric temperature, said heating/cooling power correction value data detector being provided at a predetermined location in the car;

(d) an optimum heating/cooling power calculator for calculating the optimum heating/cooling power on the basis of a difference between the temperature of the air in the car and the target temperature;

(e) a heating/cooling power correcting means for correcting the heating/cooling power on the basis of an output of the heating/cooling power correction value data detector; and (f) a warm/cool current generator controller for controlling the warm/cool air current generator in accordance with an output of the optimum heating/cooling power calculator.

8. An air conditioner for railway vehicles for controlling the temperature of a car to a preset target temperature, the air conditioner comprising:

(a) a warm/cool air current generator for generating a warm air current wind during a heating operation and a cool air current during a cooling operation;

(b) a car temperature detector provided in the vicinity of a ceiling in a car for detecting the temperature of the air in the car;

(c) a heating/cooling power correction value data detector, including a counter for counting the number of passengers in the car based on a load applied to an axle of the car, said heating/cooling power correction value data detector being provided at a predetermined location in the car;

(d) an optimum heating/cooling power calculator for calculating the optimum heating/cooling power on the basis of a difference between the temperature of the air in the car and the target temperature;

(e) a heating/cooling power correcting means for correcting the heating/cooling power on the basis of an output of the heating/cooling power correction value data detector; and (f) a warm/cool current generator controller for controlling the warm/cool air current generator in accordance with an output of the optimum heating/cooling power calculator.

* * * * *